United States Patent
Nguyen et al.

(10) Patent No.: US 9,603,437 B2
(45) Date of Patent: Mar. 28, 2017

(54) IMAGE PROCESSING DEVICE, IMAGE PROCESSING METHOD, AND PROGRAM, CAPABLE OF VIRTUAL REPRODUCTION OF MAKEUP APPLICATION STATE

(71) Applicant: Panasonic Intellectual Property Corporation of America, Torrance, CA (US)

(72) Inventors: Phu Nguyen, Fukuoka (JP); Hiroto Tomita, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 209 days.

(21) Appl. No.: 14/405,169

(22) PCT Filed: Apr. 7, 2014

(86) PCT No.: PCT/JP2014/001991
§ 371 (c)(1),
(2) Date: Dec. 3, 2014

(87) PCT Pub. No.: WO2014/167831
PCT Pub. Date: Oct. 16, 2014

(65) Prior Publication Data
US 2015/0145882 A1 May 28, 2015

(30) Foreign Application Priority Data
Apr. 8, 2013 (JP) .................................. 2013-080090

(51) Int. Cl.
*G09G 5/02* (2006.01)
*A45D 44/00* (2006.01)
(Continued)

(52) U.S. Cl.
CPC ............ *A45D 44/005* (2013.01); *G06T 11/00* (2013.01); *G06T 11/60* (2013.01); *G06T 19/006* (2013.01);
(Continued)

(58) Field of Classification Search
CPC ....... A45D 44/005; G06T 11/00; G06T 11/60; G06T 19/006; G06T 19/20
See application file for complete search history.

(56) References Cited

U.S. PATENT DOCUMENTS 5,974,189 A * 10/1999 Nicponski ............... G06T 11/60
382/254
6,937,755 B2 * 8/2005 Orpaz .................. A45D 44/005
345/592

(Continued)

FOREIGN PATENT DOCUMENTS

| JP | 2000-011145 | 1/2000 |
| JP | 3723349 | 12/2005 |

(Continued)

OTHER PUBLICATIONS

International Search Report issued Jul. 8, 2014 in International (PCT) Application No. PCT/JP2014/001991.

*Primary Examiner* — Charles Tseng
(74) *Attorney, Agent, or Firm* — Wenderoth, Lind & Ponack, L.L.P.

(57) ABSTRACT

An image processing device generates a make-up image when a make-up coating material is applied to a part of a subject appearing in a source image by processing the source image. A color range of pixels forming a coating material application layer is obtained by expanding a color range of pixels composing the part of the subject by a ratio of a color representing pixels composing the subject to a color of the make-up coating material. Values of pixels of the coating
(Continued)

material application layer are obtained by mapping values of pixels of the source image to the color range of the coating material application layer.

14 Claims, 32 Drawing Sheets

(51) Int. Cl.
| | | |
|---|---|---|
| *G06T 19/00* | (2011.01) | |
| *G06T 19/20* | (2011.01) | |
| *H04N 1/46* | (2006.01) | |
| *H04N 1/60* | (2006.01) | |
| *H04N 1/62* | (2006.01) | |
| *G06T 11/60* | (2006.01) | |
| *G06T 11/00* | (2006.01) | |

(52) U.S. Cl.
CPC ............. *G06T 19/20* (2013.01); *G09G 5/026* (2013.01); *H04N 1/46* (2013.01); *H04N 1/60* (2013.01); *H04N 1/622* (2013.01)

(56) References Cited

U.S. PATENT DOCUMENTS

| | | | |
|---|---|---|---|
| 2009/0231356 A1* | 9/2009 | Barnes | G06F 3/0482 |
| | | | 345/594 |
| 2013/0258118 A1* | 10/2013 | Felt | A45D 44/005 |
| | | | 348/207.1 |
| 2013/0271485 A1 | 10/2013 | Aoki | |

FOREIGN PATENT DOCUMENTS

| | | |
|---|---|---|
| JP | 2010-211497 | 9/2010 |
| WO | 2012/056743 | 5/2012 |
| WO | 2012/120697 | 9/2012 |

* cited by examiner

FIG. 30A
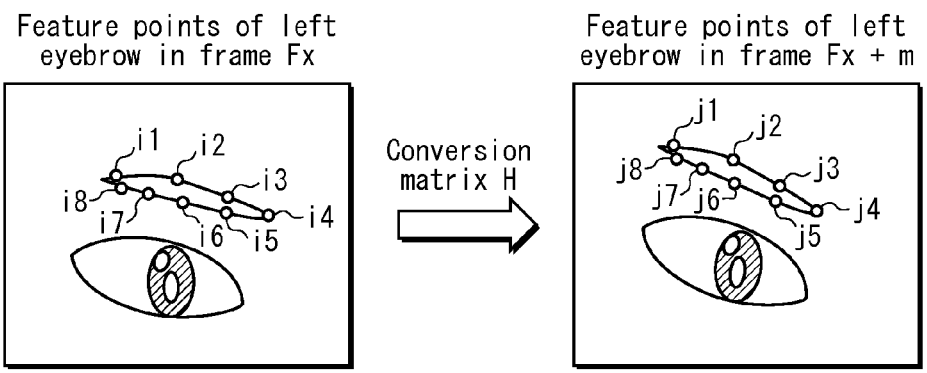
FIG. 30B
$$\begin{bmatrix} j1 \\ j2 \\ j3 \\ j4 \\ \cdot \\ \cdot \\ \cdot \\ j8 \end{bmatrix} = H \begin{bmatrix} i1 \\ i2 \\ i3 \\ i4 \\ \cdot \\ \cdot \\ \cdot \\ i8 \end{bmatrix}$$ ← Calculate conversion matrix H satisfying this relationship, and map hand-painted image drawn on frame Fx to frame Fx + m
FIG. 30C
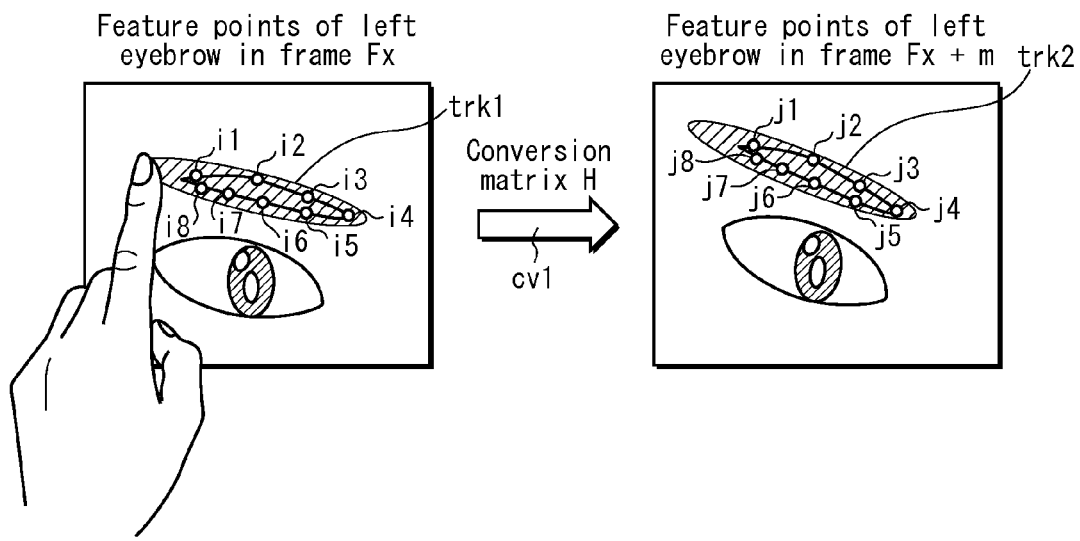

IMAGE PROCESSING DEVICE, IMAGE PROCESSING METHOD, AND PROGRAM, CAPABLE OF VIRTUAL REPRODUCTION OF MAKEUP APPLICATION STATE

TECHNICAL FIELD

The present invention belongs to the technical field of image processing technology.

BACKGROUND ART

Image processing technology performs processing of an image by extracting a region image corresponding to a desired region from image data captured by a camera, etc., rewriting pixel bit values that compose the region image, and compositing the re-written region image and the source image. A make-up simulator that generates a repainted image in which cosmetics or paint are applied to an image is one well-known application of such image processing technology.

In a make-up simulator, cosmetics or paint are applied to a face image by image processing of the face image in a computer, virtually implementing a face after application of the cosmetics or paint. Image processing for a make-up simulator may include methods such as replacing an original color of a subject region with a target application color, blending a target application color with the subject region, etc.

CITATION LIST

Patent Literature

Patent Literature 1
Japanese Patent No. 3723349

SUMMARY OF INVENTION

Technical Problem

A make-up simulator may be implemented as promotional equipment for cosmetics or stand-alone amusement equipment such as a photo sticker booth. When a business that markets or sells such equipment is developed, how realistically such equipment can reproduce make-up application is key to success.

However, in recent years technical innovation in the cosmetics industry has been remarkable, and new products with various optical properties have appeared in the market. When a user's face is illuminated by ambient light, such cosmetics often have effects such as highlighting texture of the lips or bringing out a unique contrast. However, conventional techniques such as blending or replacing application colors are not able to emphasize texture and contrast, and therefore conventional make-up simulators are left behind by the progress of cosmetics.

When the gap is large between an image representing cosmetic application and an image taken after actually applying the cosmetics, the make-up simulator is unsuitable as promotional equipment for cosmetics and cannot gain the trust of cosmetics manufacturers. The technical problem presented above makes an assumption that a coating material that is a subject of a marketing promotion is a cosmetic. However, the assumption is merely used as a familiar subject for describing the above technical problem. The technical problem addressed by the present application is not limited to the example case described above. The above technical problem may naturally occur when applying application materials having various optical properties to an object of some kind. In the near future, a person having ordinary skill in the technical field of the present application will certainly face a technical barrier due to the above technical problem when trying to commercialize the above technology.

An aim of the present invention is to provide an image processing device that more realistically reproduces a state in which make-up having various optical properties is applied to a subject illuminated by ambient light.

Solution to Problem

The above problem is solved by: a specification unit that specifies a part of the subject to which the make-up coating material is to be applied; a generation unit that generates a coating material application layer for the specified part, the coating material application layer being composed from a plurality of pixels having a color range represented by a sample color of the make-up coating material; and a compositing unit that composites the coating material application layer and the specified part of the source image.

The problem is solved because the color range of the pixels of the coating material application layer is obtained by expanding a color range of a plurality of pixels composing the specified part according to a ratio of a value of the sample color to a representative value of the pixels composing the specified part, and the generation unit obtains values of the pixels of the coating material application layer by mapping values of pixels composing the source image to the color range of the coating material application layer.

Advantageous Effects of Invention

Because the color range of the coating material application layer is obtained by expanding the color range of the original image, the part of the subject is expressed in the coating material application layer in richer shades. Further, pixel bit values of the coating material application layer are obtained by mapping pixel bit values of the original image to the expanded color range, and therefore inherent surface beauty of the part is more emphasized and contrast caused by illumination by ambient light is reproduced. When the part is lips, the sense of volume of the lips is further complemented by application of lipstick, and therefore the function of the coating material application layer will further appeal to a user.

Because the solution makes a realistic make-up simulator that can keep up with development of coating materials such as cosmetics, the solution can be strongly trusted by cosmetic manufacturers, and the application of the make-up simulator can be greatly expanded.

BRIEF DESCRIPTION OF DRAWINGS

FIG. 30A illustrates feature points in the frame image Fx and the frame image Fx+m. FIG. 30B illustrates an example of a conversion matrix. FIG. 30C illustrates a state in which a hand-painted image is being drawn with respect to the still image.

DESCRIPTION OF PREFERRED EMBODIMENTS

Embodiment Introduction

The inventors faced various technical barriers when implementing the present invention. The following describes progress until the technical barriers were overcome.

In lipstick containing diffractive pigments, viewers are attracted by dazzling contrast from highlights that shine as if sparkling when illuminated by ambient lighting, through areas where lipstick appears smoothly spread to depressions where luminance drops off.

However, reproduction of face make-up using image processing technology is typically a technique of rewriting a pixel bit value at a region to be processed with another pixel bit value, and reproducing a state that brings out the beauty of the original region with such a technique is difficult due to the optical effects described above. In order to overcome the barriers to implementation, the inventors selected the background art disclosed in Patent Literature 1 as a basis for research and development.

The lipstick color converting system disclosed in Patent Literature 1 generates an image of a region of lips appearing in an image after application of lipstick. Specifically, a lip region is extracted from pixels composing a source face image and a repainting difference is added to pixel values of pixels composing the lip region, obtaining the image after application of the lipstick to the lips. In the image processing, a face image that is an image processing subject undergoes RGB to HSV conversion that converts from RGB color space to HSV color space and a face image that has undergone the image processing undergoes HSV to RGB conversion that converts from HSV color space to RGB color space.

Figure 1A:
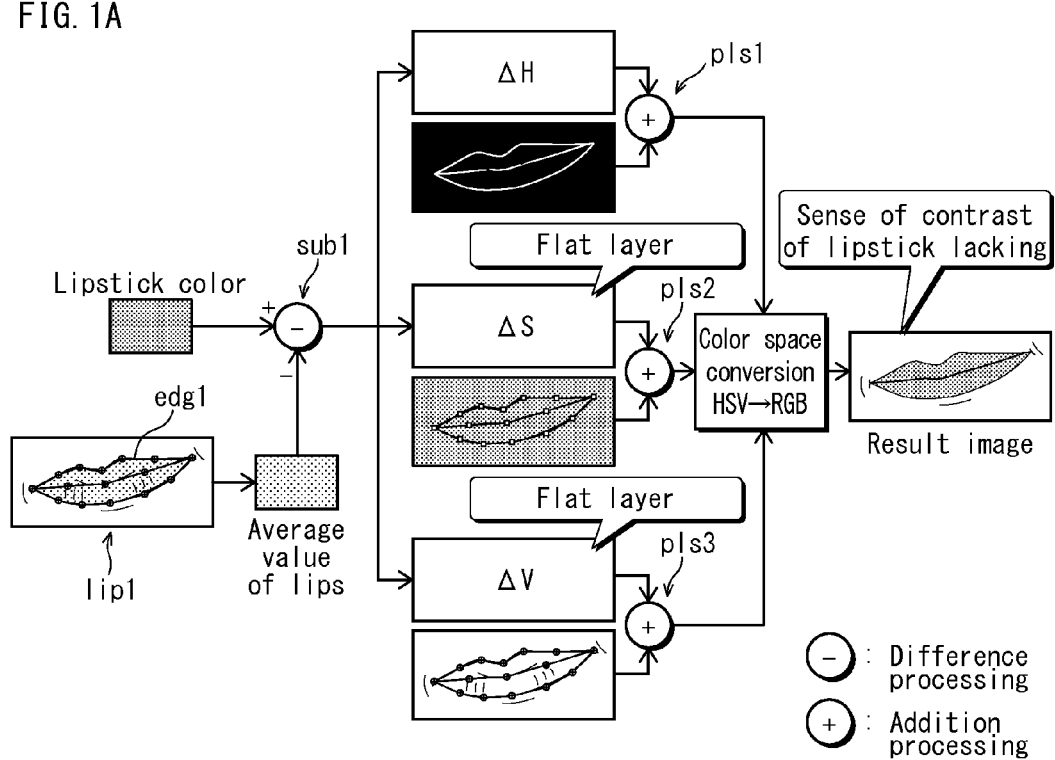
FIG. 1A mathematically illustrates image processing when a difference added to each channel image of pixel components of an HSV image is a flat difference.

The repainting difference is obtained by calculating an average color of the lips and using an average value so calculated as a representative color of the lips, then calculating a difference between the representative color of the lips and a color of a target lipstick. Areas of highlights and shadows in the source lip image stop addition of the repainting difference in saturation (S) and brightness (V) channels in the HSV color space. By implementing addition only in a hue (H) channel, the feel of the source contrast is expressed. In the same way, in regions having a color close to skin color, addition of the difference between the lipstick and the lips is stopped. FIG. 1A illustrates mathematically the image processing based on Patent Literature 1.

FIG. 1A illustrates mathematically the image processing when the difference added to each pixel component of HSV channels is a flat difference. Mathematical expressions of FIG. 1A follow the following rules. A square in FIG. 1A is an operand, illustrating an image or layer that is a subject of an operation according to a formula. Small rectangles outline fixed values and illustrate pixel bit values of color used in operations according to formulas. Circle symbols are operators in the formulas, illustrating types of operation to be performed on the pixel bit values of individual pixels constituting the image or layer. Here, a "layer" is an image in which all pixels or some pixels are transparent or semi-transparent and are composited with another image. According to these rules, a device configuration in FIG. 1A defines an operation according to a formula composed of a subtraction (1) of an average value of a lip region from a color of a lipstick and addition (2) of differences of an H channel, an S channel, and a V channel that compose an image of the lip region.

In FIG. 1A, lip1 illustrates a portion of a face image that is specified as the lip region. An outline edg1 in the face image is composed of anchors (round marks) and interpolated lines that connect between the anchors, surrounding only the lips from the face image. The H channel in the illustration is an image obtained by extracting an H component from pixel components of an HSV composition of the lips. In the same way, the S channel and V channel are images obtained by extracting an S component and a V component, respectively, from pixel components of the HSV composition of the lips.

A difference operation sub1 is a subtraction of the average value of the lip region from the color of the lipstick for each of the H channel, the S channel, and the V channel.

Addition operations pls1, 2, and 3 are an addition of $\Delta H$, $\Delta S$, and $\Delta V$ to the H channel, S channel, and V channel of the lips in the face image, respectively, where $\Delta H$, $\Delta S$, and $\Delta V$ are differences of the H channel, S channel, and V channel obtained by the subtraction.

In FIG. 1A, the difference is flat in the entire image. The same value is added to a pixel that has a highest pixel bit value as to a pixel having a lowest bit value, and therefore a color range of the entire image is equal to a color range of the source image. Thus, production of a sense of contrast from application of the lipstick is not achieved and this is unsatisfactory as a function of a make-up simulator that virtually applies make-up.

Further, according to the background art disclosed in Patent Literature 1, by stopping addition of the repainting difference of brightness and saturation in regions in which highlights and shadows are present in the source image, discontinuity occurs at a boundary between a portion where addition to three channels, hue, saturation, and brightness occurs and a portion where addition to only the hue channel occurs. Thus, an unnatural impression stands out as a barrier to implementation of the background art disclosed in Patent Literature 1.

Figure 1B:
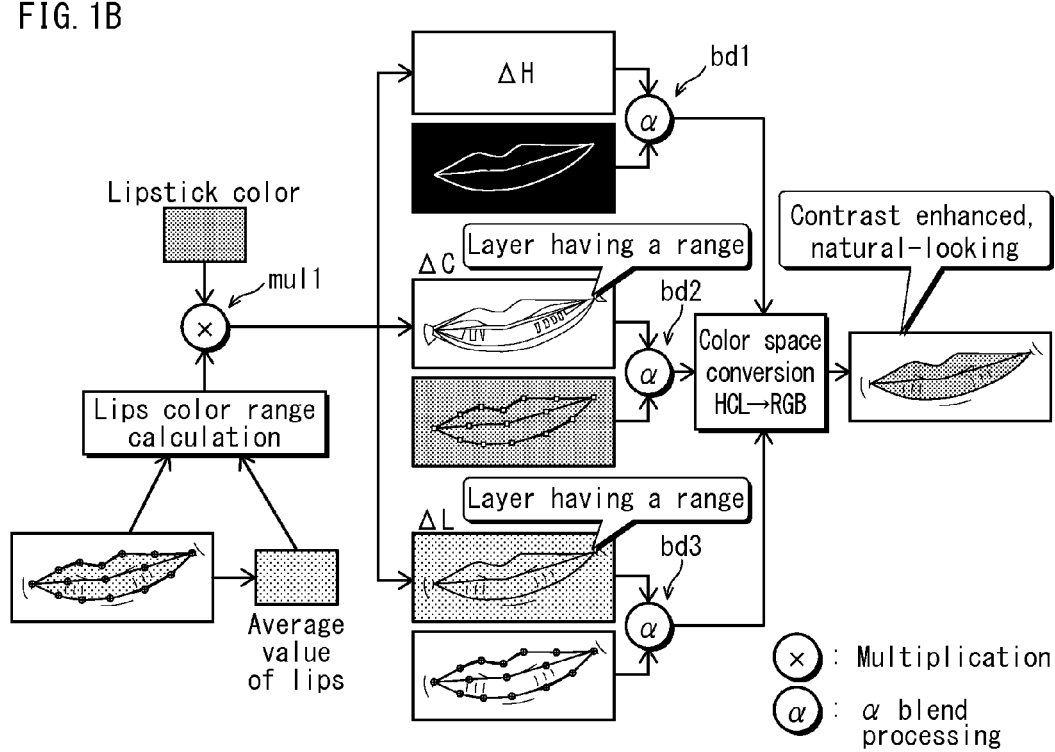
FIG. 1B mathematically illustrates image processing when a difference added to each channel image of pixel components has a range.

The following is a description of an approach to overcoming this barrier to implementation. FIG. 1B illustrates a mathematical expression of the image processing newly proposed in the present application for generating a lip image in which lipstick is applied.

FIG. 1B mathematically illustrates image processing when a difference added to each channel image of pixel components has a range. The equation in FIG. 1B defines an operation composed of a multiplication (1) of a color of a lipstick and a color range of the lip region and a blending (2) of differences of a hue (H) channel, a chroma (C) channel, and a luminance (L) channel that compose an image of the lip region. The L channel in FIG. 1B is an image obtained by extracting the L component from pixel components of an HCL composition of the lips. In the same way, the H channel and C channel are images obtained by extracting the H component and C component, respectively, from pixel components of the HCL composition of the lips. The point of calculating a difference from the lipstick for each channel included in the image and summing the difference for each channel is a point in common with the device configuration of FIG. 1A. Points of difference are as follows.

First, difference calculation is different. The difference in difference calculation is as follows: In the device of FIG. 1A, the difference summed for each of the H channel, S channel, and V channel is obtained by subtracting the color of the lips from the color of the lipstick, whereas in a device of FIG. 1B the difference summed for each of the H channel, C channel, and L channel is obtained by multiplying the color of the lips by a layer associated with a range obtained from the lip region and the average value of the lips. The multiplication operation mull in FIG. 1B is a multiplication of the color of the lips by the layer associated with the range. In FIG. 1B, the layer associated with the range of $\Delta L$ represents the face and lips in monotone. The layer linked to the range of $\Delta C$ is a face image in which the entire face is gray and the lips are a negative image that is white. Whether the layer of the H channel has a range or not is optional, and the layer may be "flat". Accordingly, in FIG. 1B, the layer of the H channel is a flat layer.

Second, content of the difference is different. The difference in the device of FIG. 1A is calculated by subtraction and therefore will be a flat difference, constant in the entire image plane. In contrast, the difference in the device of FIG. 1B is a layer associated with the range obtained from the lip region and the average value of the lips, in which a value of each pixel differs within a certain numerical range according to plane location.

Third, layer compositing is different. Compositing in the device in FIG. 1A is addition of the values of the flat layer to each of the H channel, S channel, and V channel that compose the image of the lip region. In contrast, compositing in FIG. 1B is a result of compositing operations that include a blending of the C channel and L channel of the face image and the layers having the ranges of the C channel and L channel. The a blending bd1, bd2, and bd3 in the illustration are examples of such compositing operations in which the C channel and L channel of the face image are multiplied by the a value, and the C channel and L channel of the layer are multiplied by an inverse value of $\alpha$ ($1-\alpha$), and the results are added together. The layer of pixel components of each HCL channel that is a subject for the a blending has a color range and therefore an image after make-up application clearly shows texture of the lips.

Embodiment 1

The present embodiment discloses an embodiment of a make-up simulator that performs, in an HCL color space, image processing with respect to an L channel image composed of the L component out of the H component, C component, and L component that compose each pixel. The make-up simulator is implemented by using hardware resources of a tablet terminal as elements of the image processing device.

Figure 2B:
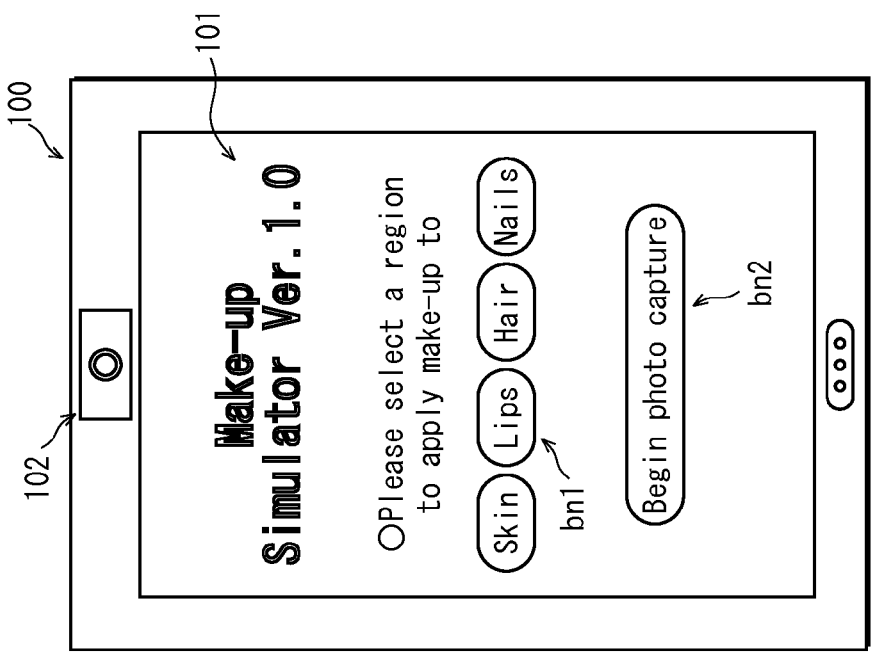
FIG. 2B illustrates an initial screen when processing as a make-up simulator is initiated.
Figure 2A:
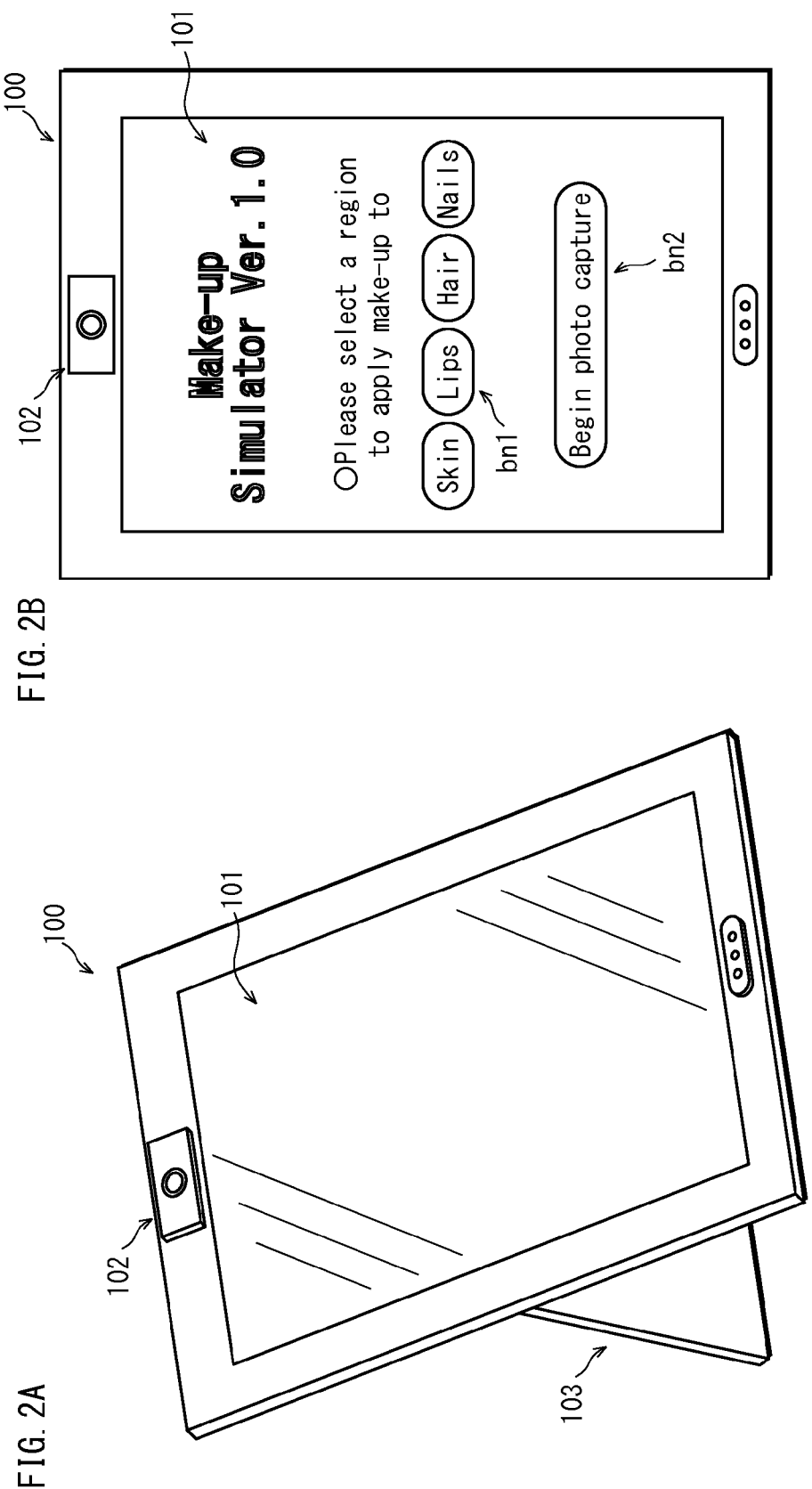
FIG. 2A illustrates appearance of a tablet terminal.

FIG. 2A illustrates appearance of the tablet terminal. The tablet terminal has a touch panel display 101 on a surface facing a user and a camera 102 at an upper end of the touch panel display that takes self-portraits.

Taking self-portraits means capturing an image of a user operating the tablet terminal, and via the tablet terminal, a self-portrait of the user is captured. In the make-up simulator, the self-portrait is displayed on the touch panel display, and virtual make-up is implemented via reception of operations performed by the user with respect to the self-portrait. The self-portrait that is a subject for make-up includes still image data captured by a still image mode of the camera, and a plurality of frame image data that comprises a moving image captured by a moving image mode of the camera.

Because a self-portrait before and after make-up application is displayed on a touch panel 5 in front of a user, the tablet terminal becomes a digital mirror having a make-up function. The user can see their own face as if reflected in a mirror and check their own face after make-up simulation. Here, "digital mirror" means a function of performing image processing with respect to an image of a person captured by the camera and thereby implementing make-up according to an environment in which the user and the tablet terminal are located. For example, when the tablet terminal is located outside, image processing is performed with respect to the self-portrait in accordance with the environment and therefore make-up application is implemented on the self-portrait in accordance with an outside environment. Thus, when the user and the tablet terminal are bathed in evening sunlight, the user can see how they look after make-up application in such an environment, and when the tablet terminal and the user are illuminated by light from street lamps in the streets at night, the user can visually check how they look after make-up application in such an environment.

FIG. 2B illustrates an initial screen on the touch panel 5 when processing as the make-up simulator is initiated. The initial screen includes a button bn1 that receives a selection of a region as a subject for the make-up simulator and a button bn2 for starting image capture of the user by the camera 102.

Figure 3:
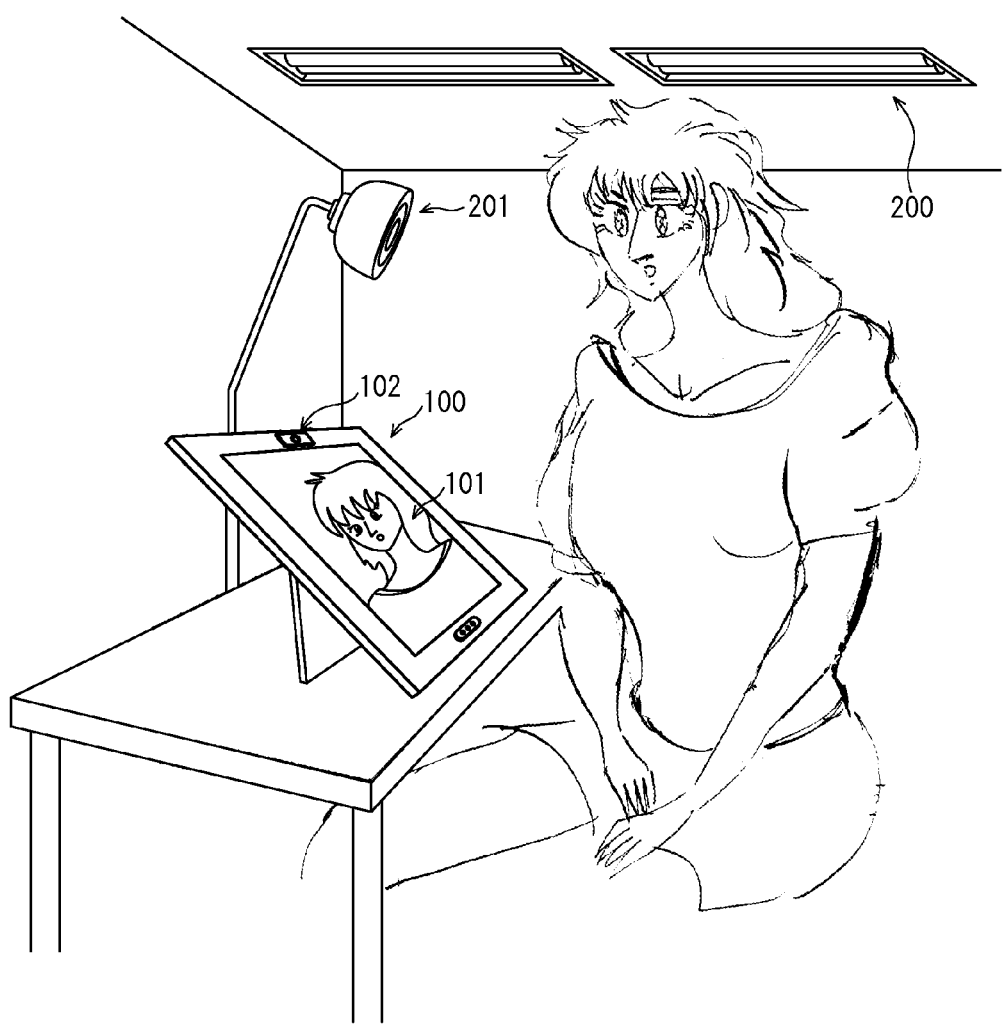
FIG. 3 illustrates a situation in which a user is capturing a self-portrait using a camera 102 in a tablet terminal 100.

FIG. 3 illustrates a situation in which the user is capturing the self-portrait using the camera 102 in the tablet terminal 100. In FIG. 2B, in the interior in which the tablet terminal 100 and the user are located, an interior lighting 200 and a spotlight 201 are present, creating an environment illuminated by the interior lighting 200 and the spotlight 201. An image of the user illuminated in the environment becomes the subject for the make-up simulator.

When the make-up simulator is initiated, cosmetic items such as lipstick, blusher, etc., and sample colors are displayed on the touch panel along with the self-portrait and recommended make-up information. Cosmetic items can be selected by touching and dragging performed with respect to the self-portrait displayed on the touch panel. Here, the cosmetic items are cosmetics that can be used virtually in the make-up simulator, and are defined by RGB values of a single sample color pixel, HCL values obtained by converting the RGB values, and wavelength parameters. The wavelength parameters specify physical properties and optical properties of make-up (cosmetics) according to wavelength. When using the wavelength parameters, the image processing device performs predefined operations using RGB values or HCL values that compose pixels of a source lip image, and the wavelength parameters, and thereby obtains RGB values or HCL values that indicate a pixel state after lipstick application. The following processing is performed using RGB values and HCL values obtained in this way.

In the make-up simulator of the present embodiment, cosmetic items including lipstick are modeled as single color samples and representative color data files corresponding to cosmetic items are stored as single color RGB values and HCL values, thereby defining what kind of cosmetic items can be used to apply make-up. By defining which cosmetics correspond to which cosmetic items via RGB values and HCL values of single sample color pixels, what make-up can be applied to the user is defined. The value of the L component of the sample color pixel in a lipstick application layer generated to be applied to the lips is a value representative of the color range for the lipstick application layer. The lipstick application layer is generated by using the L component of the sample color pixel as a representative value of the cosmetic item, and by creating a shape of the lips from a plurality of pixels that have values within a certain numerical range based on the representative value.

Figure 4B:
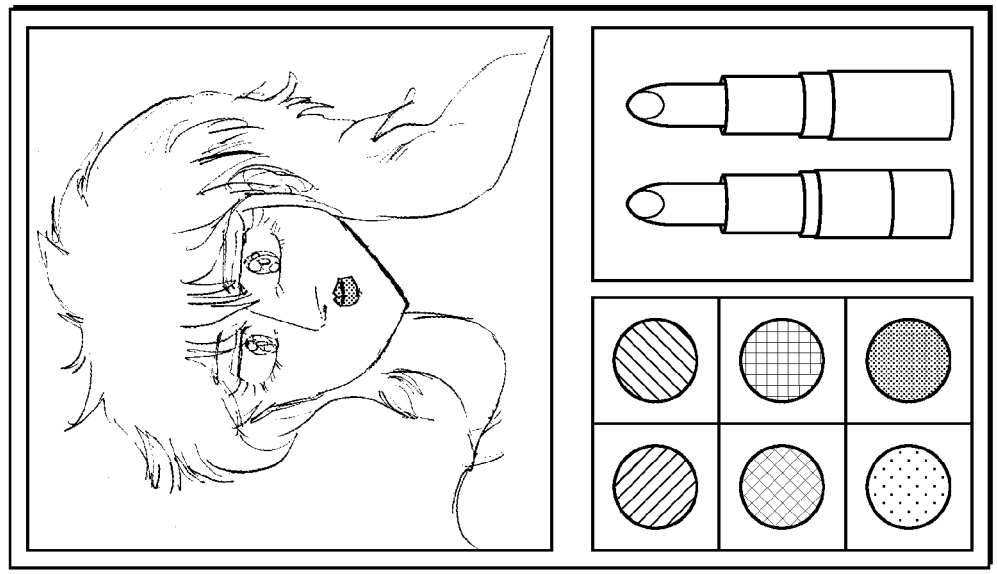
FIG. 4A illustrates a self-portrait of a user prior to applying make-up and FIG. 4B illustrates a self-portrait of the user after applying make-up.
Figure 4A:
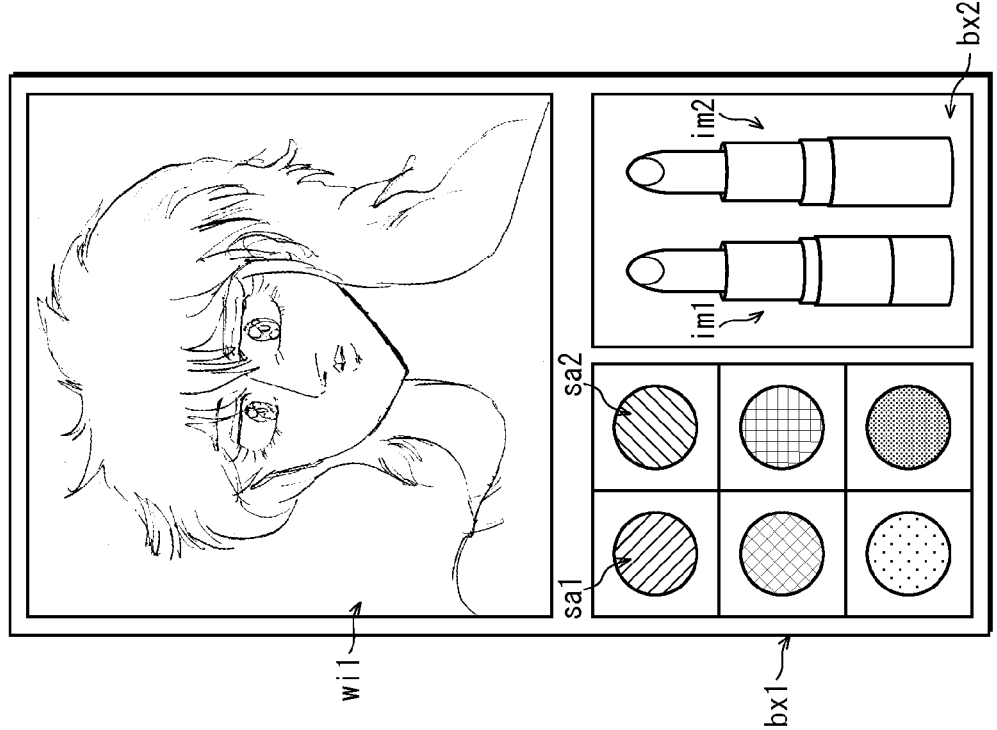

FIG. 4A illustrates a self-portrait of a user prior to applying make-up. FIG. 4B illustrates a self-portrait of the user after applying make-up. The GUI in FIG. 4A and FIG. 4B has the same display layout. In this display layout, there is a window for display of a self-portrait in an upper portion, there is a tool for selecting a cosmetic item in the lower right, and there is a toolbox for selecting coloring in the lower left. In the toolbox, a list of lipsticks are displayed as cosmetic items, and the user can select a cosmetic item that they wish to test as make-up by touching any displayed product. Further, in the tablet terminal, a list of color samples for coloring are displayed. In the lip region after lipstick is applied, a coating color in the lip region is a color representative of color distribution in the lip region. Thus, color of lipstick is treated as a representative color in the lip region after lipstick application.

FIG. 4B illustrates a face image after make-up is applied by executing selection of lipstick and selection of replacement color.

A self-portrait after applying such make-up is composited by specifying a lip region from a face image in a source self-portrait, applying a selected lipstick item to the lip region, and compositing the lip region with the source face image. For such processing, the image processing device extracts feature points of the lip region from the face image that is a self-portrait when lipstick is selected, thereby specifying a region using an outline, generates a lipstick application layer indicating a lip region in which lipstick is applied using the selected cosmetic item, and composites the lipstick application layer with a human image. Here, a "face image" is a self-portrait in which face feature points are detected as characterizing face components at a level equal to or greater than a predefined value. A self-portrait in which hand feature points are detected as characterizing human hand components at a level equal to or greater than a predefined value is referred to as a "hand image". A self-portrait that does not only have facial feature points characterizing face components, in which feature points are detected as characterizing a hand, leg, torso, etc., at a level equal to or greater than a predefined value is referred to as a "fully body image".

The image processing device performs make-up processing depending on a selection of site to which a cosmetic item selected by a user is to be applied, and displays a processing result on the screen of the touch panel 5. Because results of make-up selected by a user can be reflected in real time, the user can easily check make-up simulation results, and cosmetics can easily be tried out.

Figure 5A:
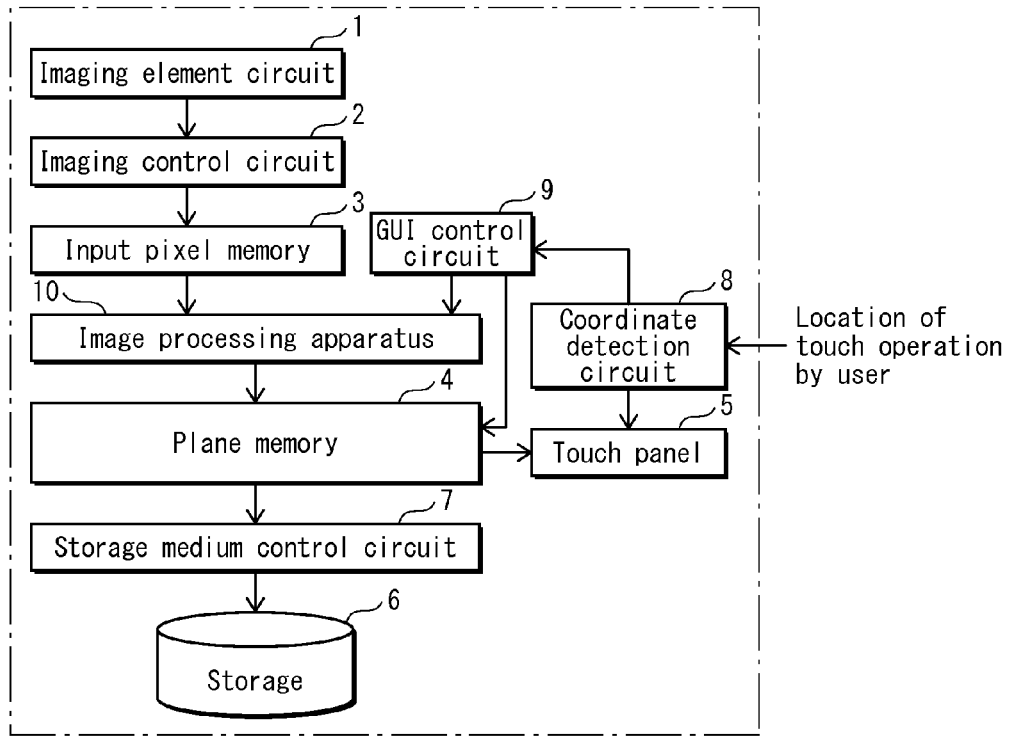
FIG. 5A illustrates hardware resources of the tablet terminal used by the image processing device.

The above is a description of external configuration and usage of the image processing device. Next is description focusing on configuration of the image processing device, providing specific examples of usage of the image processing device. FIG. 5A illustrates hardware resources of the tablet terminal used by the image processing device. Hardware of the tablet terminal is configured to process a captured image acquired via a camera.

The hardware of the tablet terminal is composed of an imaging element circuit 1, an imaging control circuit 2, an input pixel memory 3, a plane memory 4, the touch panel 5, a storage 6, a storage medium control circuit 7, a coordinate detection circuit 8, a GUI control circuit 9, and an image processing device 10. The imaging element circuit 1 outputs a video signal by performing photoelectric conversion on a subject image formed by an imaging optical system of the camera 102. The imaging control circuit 2 performs exposure control using a focus lens, zoom lens, and shutter aperture, which are the imaging optical system of the camera 102. The input pixel memory 3 stores self-portrait data that is a processing subject.

The plane memory 4 stores an image as a result of a make-up process in connection with the self-portrait data stored in the input pixel memory 3. The touch panel 5 is composed of an LCD, PDP, and organic EL elements, and displays a source self-portrait or a self-portrait after make-up application. The storage 6 is composed of a non-volatile memory or built-in disk. The medium control circuit 7 is for writing image data stored in the plane memory to the storage 6, and reading the image data stored from the storage 6 when required. The coordinate detection circuit 8 detects coordinates pertaining to an operation when a touch operation or flick operation is performed. The GUI control circuit 9 outputs an event according to the coordinates detected by the coordinate detection circuit 8, and updates the GUI. The image processing device 10 executes image processing for make-up application.

The GUI of the tablet terminal is composed of various widgets such as a window, scroll bar, radio button, text box, pull-down menu, etc. To change states of such widgets, the event control circuit 9 outputs an event to a touch coordinate when a screen touch is performed by a user, thereby changing a state of a widget. Such a change of state of a widget provides the user with an interactive operating environment using the GUI.

Figure 5B:
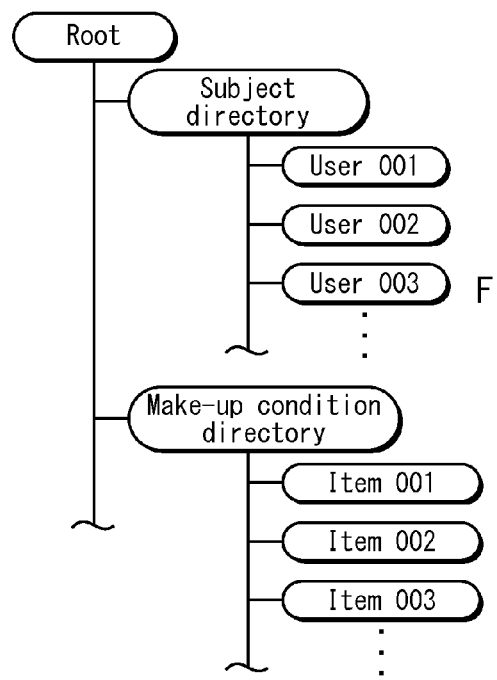
FIG. 5B illustrates storage content of a storage 6.

FIG. 5B illustrates storage content of the storage 6. As illustrated in the present figure, in the storage 6, a subject directory and a make-up condition directory are under a root directory. Under the subject directory, a unique directory exists for each individual user (user 001 directory, user 002 directory, user 003 directory). The make-up condition directory is a directory defining conditions for make-up that has a plurality of item directories (item 001 directory, item 002 directory, item 003 directory) corresponding to a plurality of cosmetic items to be used in make-up application. By specifying any of the item directories under the make-up condition directory, conditions of make-up are attached.

Figure 5C:
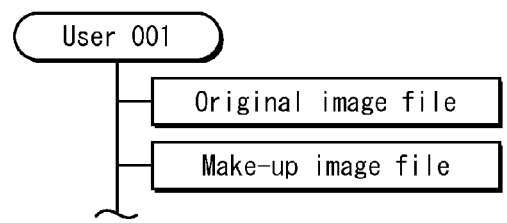
FIG. 5C illustrates a user 001 directory and FIG. 5D illustrates an item 001 directory.
Figure 5D:
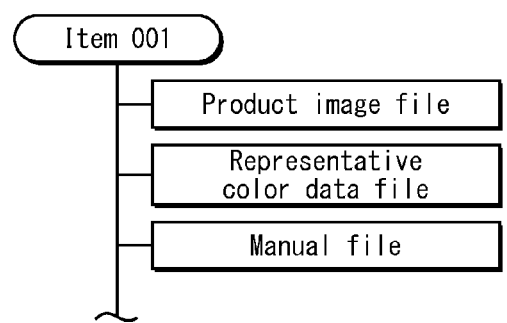

FIG. 5C illustrates a configuration of the user 001 directory and FIG. 5D illustrates a configuration of the item 001 directory. The user 001 directory is a directory corresponding to a user 001 among a plurality of directories that exist on a one-to-one basis for each user in the user directories. As illustrated in FIG. 5C, in the user 001 directory are stored an original image file storing self-portrait data originally obtained by image capture by the camera 102 and a make-up image file storing make-up image data obtained by performing make-up application with respect to a self-portrait via the image processing device. The item 001 directory is a directory corresponding to a product item 001 among a plurality of directories that exist on a one-to-one basis for each product item in the make-up condition directory. In the item 001 directory are stored: a product image file storing a product photo and commercial video of a cosmetic item such as lipstick; a representative color data file indicating an RGB value of color to be applied by a product item; and a manual file indicating use of the product item.

Figure 6:
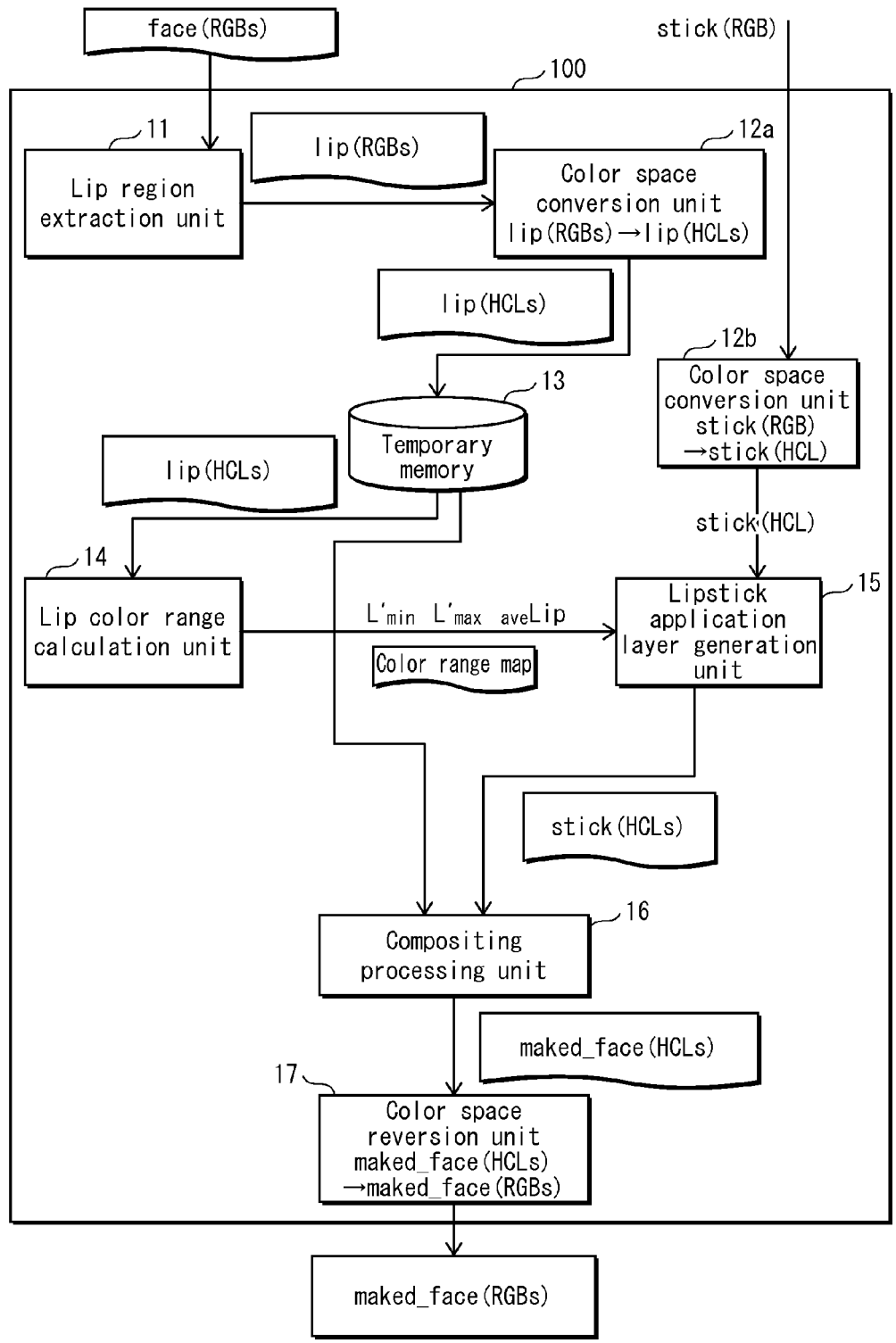
FIG. 6 illustrates hardware and software elements of the image processing device, plus data flow between the elements.

FIG. 6 illustrates hardware and software elements of the image processing device, plus data flow between the elements. As illustrated, the image processing device is composed of a lip region extraction unit 11, color space conversion units 12a and 12b, a temporary memory 13, a lip color range calculation unit 14, a lipstick application image layer generation unit 15, a compositing processing unit 16, and a color space reversion unit 17. Input to the image processing device is a face image in an RGB color space and RGB values of a target application color, and output is an RGB image on which the target application color is applied to the lip region of the face image.

Subjects of image processing for make-up application include both lips without make-up and lips on which make-up has been applied. When subjects of image processing are lips on which make-up has been applied, optical properties due to the lipstick are also reflected in the face image on which make-up has been applied, and therefore make-up application can also be realistically implemented in such a case.

The following describes main processing elements and process flow.

The lip region extraction unit 11 detects feature points of a face according to face detection and face part detection from a self-portrait inputted to the lip region extraction unit 11. The lip region extraction unit 11 also extracts feature points that define the lip region, generates an outline connecting the feature points, and outputs lip (RGBs), which is a face image in which a region of the lip region is specified by the outline. As examples of methods of extracting the feature points that define the lip region, various methods can be adopted such as segmentation by color, edge extraction, part detection by face modeling, etc. In the image processing device pertaining to embodiment 1, lip region detection by face part detection is used as one example. Mask data is created in which, matching the specified region of the lip region, a region surrounded by the feature points of the lips is a valid region in a mask.

The color space conversion unit 12 converts a color space (RGB, YUV, etc.) of lip (RGBs) to a processing color space, and stores a converted result to the temporary memory 13. The processing color space may be an HCL color space expressing hue (H), chroma (C), and luminance (L).

The lip color range calculation unit 14 calculates a lowest value, a highest value, and an average value of a range of an L component that is a pixel component specified from lip (HCLs), which is a face image in which a region of the lip region is specified, and specifies a color range in the L component from the lowest value, the highest value, and the average value. The lip color range calculation unit 14 outputs the average value so calculated and a range map indicating a ratio of each pixel in the L channel linked to pixel regions.

The lipstick application layer generation unit 15 generates a lipstick application layer as a layer to be composited with the lip region for which the region is specified in the original self-portrait. The lipstick application layer generation unit 15, upon generation of the lipstick application layer, calculates a representative color of lipstick that is a target coating color converted to HCL color space and calculates an appropriate average value, minimum value, and maximum value of the lips on which the lipstick is applied from the minimum value, maximum value, and average value of the lips outputted by the lip color range calculation unit 14. Thus, the lipstick application layer is obtained from the maximum value, minimum value, and average value of the lips on which the lipstick is applied and the range map of the lips.

The compositing processing unit 16 composites the L channel of the lipstick application layer generated by the lipstick application layer generation unit 15 and the L channel of lip (HCLs) stored in the temporary memory, and outputs maked_face (HCLs), which is a face image in which the lipstick is applied. Compositing processing includes, for example, a blending, multiplication, addition, soft light, etc. The compositing processing uses a mask so that compositing is only valid in the lip region to implement coating with higher accuracy. The mask limits pixels that are subjects for compositing.

The color space reversion unit 17 reverts the processing color space of the maked_face (HCLs) to the color space that can be displayed on devices (RGB, YUV, etc.), thereby obtaining maked_face (RGBs).

Having described the internal configuration of the image processing device, the following is description focusing on image data to be processed by the image processing device.

Figure 7A:
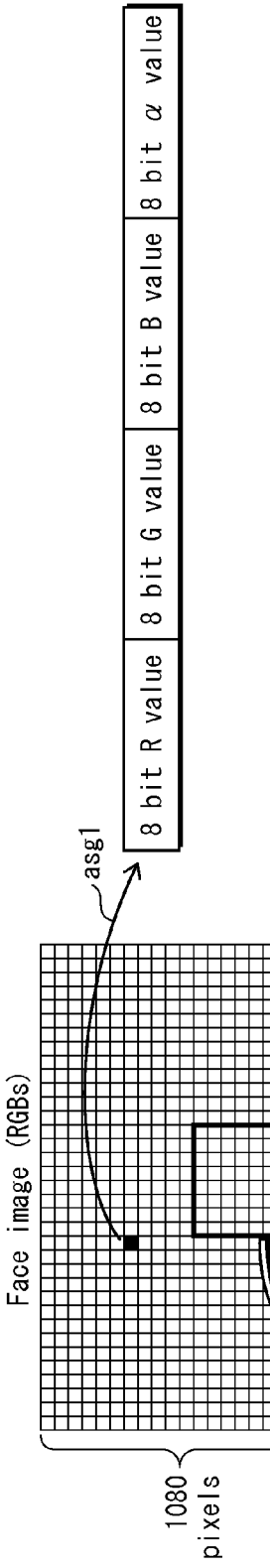
FIG. 7A illustrates a composition of a face image face (RGBs) and bit assignment.

FIG. 7A illustrates face (RGBs), which is a face image. As illustrated, the face (RGBs) is, for example, an image having a resolution of SD image quality (640×480), 1K FullHD image quality (1920×1080), 4K image quality (7680×4320), etc. In the case of FullHD image quality, the face (RGBs) is composed from pixel data of 1920 horizontal pixels by 1080 vertical pixels.

In the illustration, asg1 indicates bit assignment in a single pixel bit value. As illustrated, bit length of data for a single pixel is 32 bits: 8 bits of gradation bits of a red (R) component, 8 bits of gradation bits of a green (G) component, 8 bits of gradation bits of a blue (B) component, and 8 bits of gradation bits of a transparency (a) component. In the illustration, ext1 indicates extraction of the lip image, which is a rectangular pixel group including the lips in the specified region. Such a rectangular pixel group is composed of N vertical pixels by M horizontal pixels. Here, M and N are a horizontal pixel number and a vertical pixel number of a smallest rectangle that contains the lips, and are variable numbers. In the illustration, asg2 indicates a pixel bit value of a single pixel that is part of the lip image (RGBs). Such a pixel bit value is also composed of 8 bits of gradation bits of a red (R) component, 8 bits of gradation bits of a green (G) component, 8 bits of gradation bits of a blue (B) component, and 8 bits of gradation bits of a transparency (a) component.

Figure 7B:
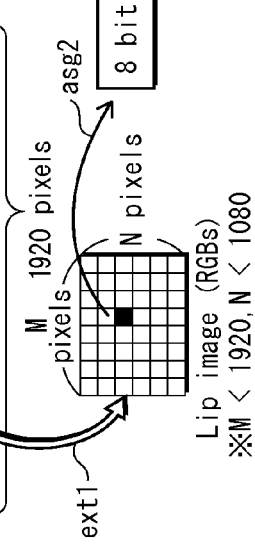
FIG. 7B illustrates a composition of a lip image (HCLs) from FIG. 7A and bit assignment.

FIG. 7B illustrates a lip image (HCLs) obtained by converting pixel bit values of the image (RGBs) of the lip region in FIG. 7A from RGB format to HCL format. Arrow asg3 indicates a bit assignment of data of a single pixel of the lip image (HCLs). As illustrated, bit length of data for a single pixel is 32 bits: 8 bits of a hue (H) component, 8 bits of a chroma (C) component, 8 bits of a luminance (L) component and 8 bits of a transparency (a) component.

Figure 7C:
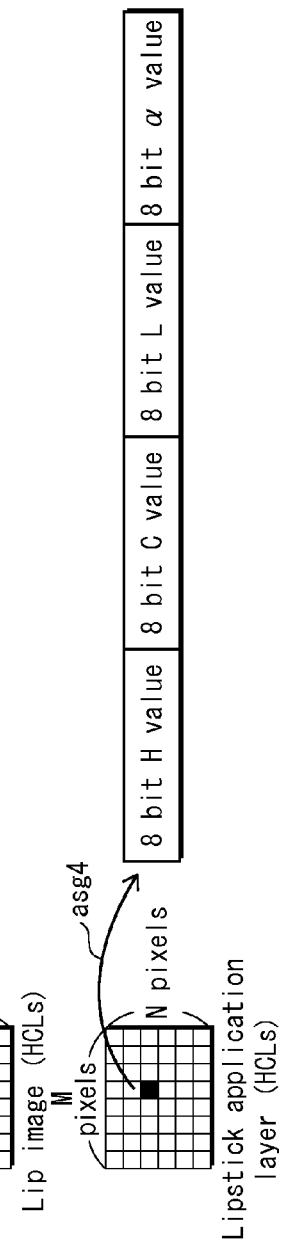
FIG. 7C illustrates a composition of a lipstick application layer (HCLs) and bit assignment.

FIG. 7C illustrates a lipstick application layer (HCLs) to be superimposed on the lip image (HCLs). Arrow asg4 indicates a bit assignment of data of a single pixel of the lipstick application layer (HCLs). As illustrated, bit length of data for a single pixel is 32 bits: 8 bits of a hue (H) component, 8 bits of a chroma (C) component, 8 bits of a luminance (L) component and 8 bits of a transparency (a) component.

Figure 8:
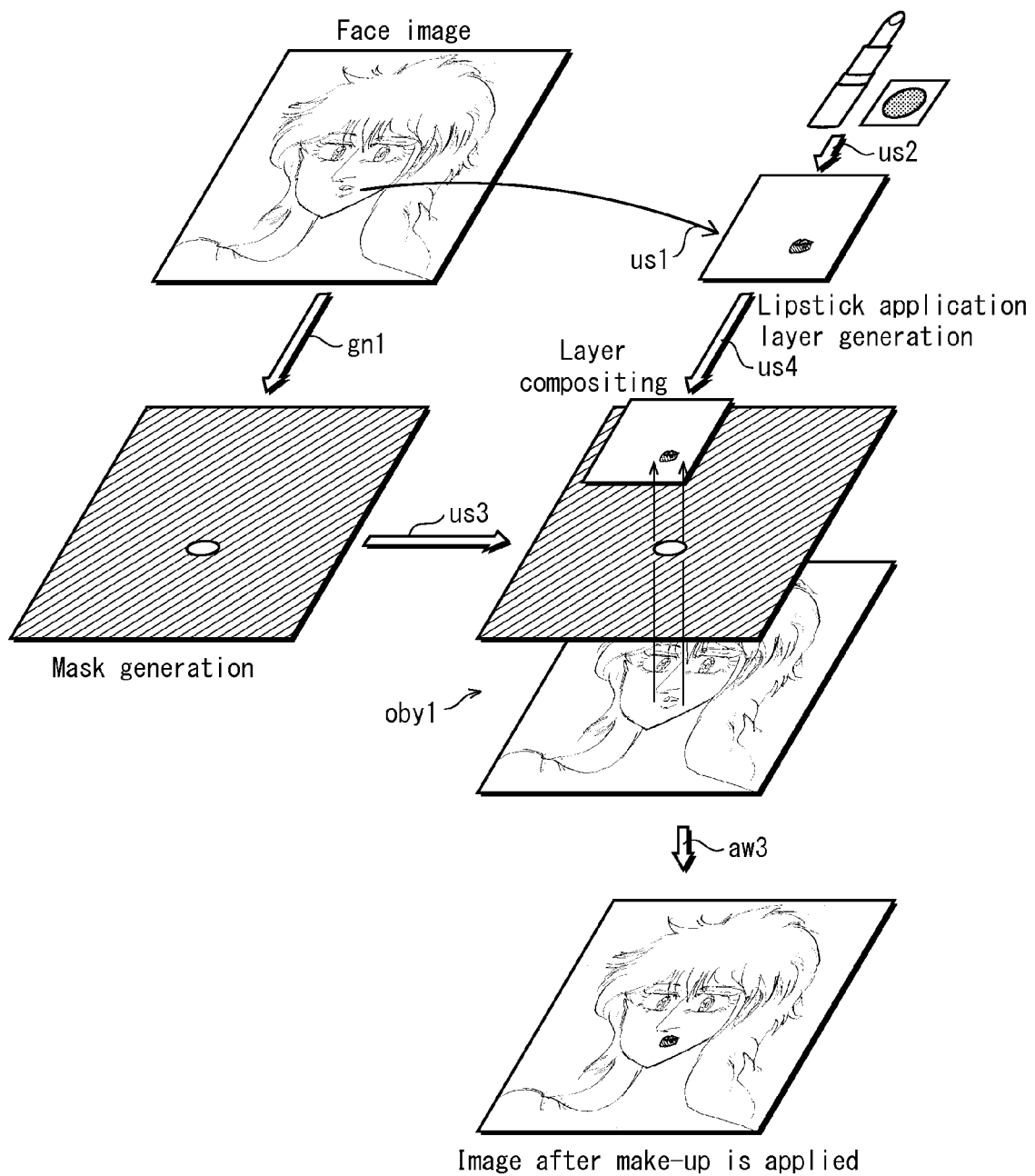
FIG. 8 is a diagram illustrating image processing by the image processing device.

FIG. 8 is a diagram illustrating image processing by the image processing device. In the illustration, gn1 indicates generation of mask data with face (HCLs) as a subject. In this mask data lip portions are white, and other portions are black. In the illustration, us1 illustrates use of the lip region of the face image upon generating the lipstick application layer. In the illustration, us2 illustrates use of the lipstick upon generating the lipstick application layer. An arrow oby1 indicates a process of compositing the lipstick application layer, the mask data, and the lips. An arrow us3 indicates extraction of the mask data when compositing, and us4 indicates extraction of the lipstick application layer when compositing. Completion of a final make-up image after such compositing is indicated by aw3.

In order that a generated lipstick image gives a sense to the human eye of similarity to the color of the original image, a relationship between aveStick, which is the representative color of the inputted lipstick, and rangeL', which is the color range of the lipstick, maintains as much as possible a relationship between aveLip, which is the representative color of the original lips, and rangeL, which is the color range of the lips. In other words: a distance a between aveLip and a maximum value Lmax and a distance b between aveLip and a minimum value Lmin is a ratio a/b; a distance a' between aveStick and a maximum value L'max and a distance b' between aveStick and a minimum value L'min is a ratio a'/b'; and a relationship a/b=a'/b' is maintained.

Specifics of calculation are clarified in the following formula description.

As illustrated in Math 1, a color range adjustment coefficient $\beta$ is provided for contrast adjustment and hue adjustment of replacement color. In the present embodiment, an example is provided in which a relationship between a replacement color and the original color is used as the color range adjustment coefficient, but the color range adjustment coefficient $\beta$ may be assigned from an external source.

Math 1

$$\beta = \frac{aveStick}{aveLip}$$

Math 2 is a formula of rangeL, which is the color range of the original color. A difference between the minimum value Lmin and the maximum value Lmax of the original color is rangeL.

$$rangeL = Lmax - Lmin \qquad \text{Math 2}$$

Math 3 is a formula of a ratio of ka=a/rangeL to kb=b/rangeL, which are the distance a and the distance b normalized by rangeL.

Math 3

$$a = L\text{max} - aveLip \qquad \text{Math 3-1}$$

$$b = aveLip - L\text{min} \qquad \text{Math 3-2}$$

$$ka = \frac{a}{rangeL} = \frac{L\text{max} - aveLip}{rangeL} \qquad \text{Math 3-3}$$

$$ka = \frac{b}{rangeL} = 1.0 - ka \qquad \text{Math 3-4}$$

Math 4 is a formula of rangeL', the minimum value L'min, and the maximum value L'max of a target lipstick satisfying the above conditions a/b=a'/b'.

Math 4

$$rangeL' = rangeL \times \beta \qquad \text{Math 4-1}$$

$$L'\text{max} = rangeL' \times ka + aveStick \qquad \text{Math 4-2}$$

$$L'\text{min} = L'\text{max} - rangeL' \qquad \text{Math 4-3}$$

In the image processing device, processing is performed by scanning pixels that compose an image line-by-line. When scanning line-by-line, an i-th pixel to be processed is referred to as pixel[i], and the H component, C component, and L component of the pixel[i] are referred to as H[i], C[i], and L[i], respectively.

When normalizing a range, a pixel value L'[i] of an i-th pixel of lipstick application image is, as shown in Math 5, calculated from rmap[i], which is range map data of current pixels, rangeL', and L'min.

$$L'[i] = L'\text{min} + rmap[i] \times rangeL' \qquad \text{Math 5}$$

When a lip image is not normalized by a range map, each pixel value of the lips can be calculated by the formula of Math 6.

$$L'[i] = aveLip + (L[i] - aveLip) \times \beta \qquad \text{Math 6}$$

Figure 9A:
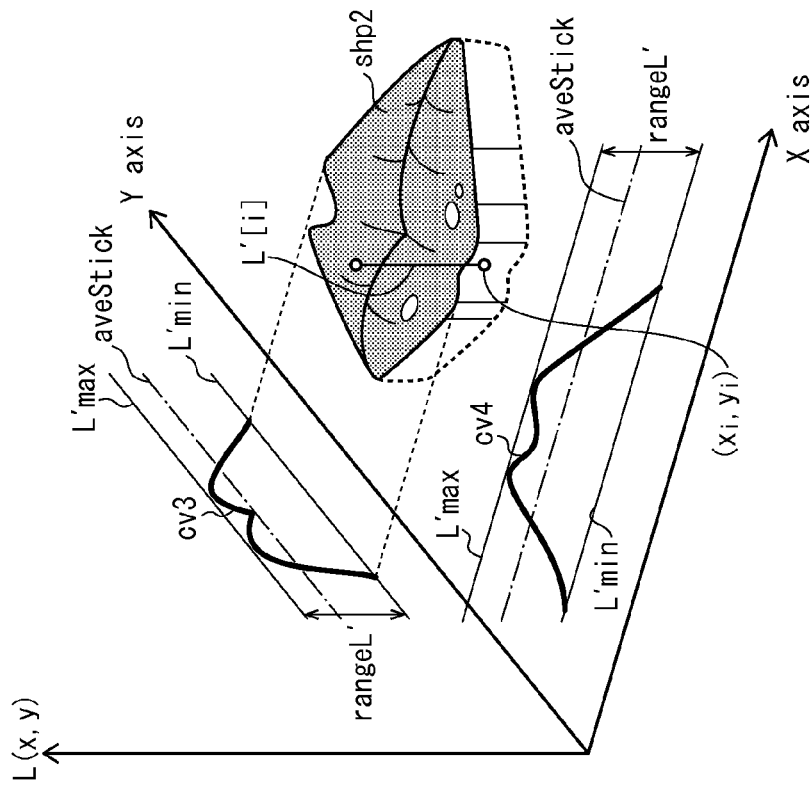
FIG. 9A illustrates distribution of an L component of a lip region that is a subject region and FIG. 9B illustrates distribution of an L component of the lip region that is the subject region in the lipstick application layer.
Figure 9B:
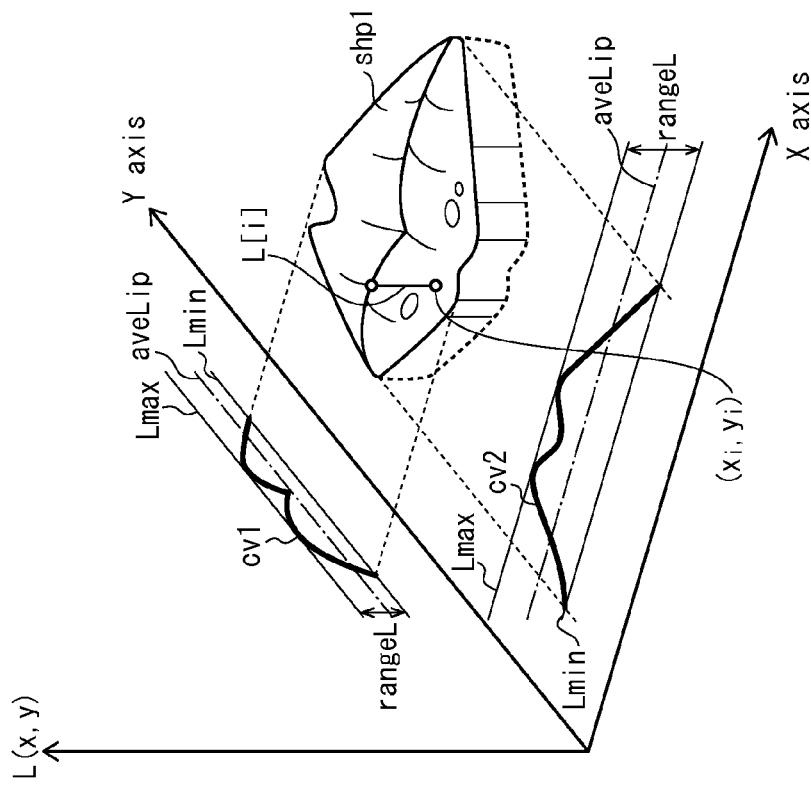

FIGS. 9A and 9B illustrate a comparison between distribution of the L component of the lip region that is a subject region and distribution of the L component of the lip region that is the subject region in the lipstick application layer. The X axis and Y axis in FIG. 9A are horizontal and vertical directions of the image, and the height direction indicates size of the L component of each pixel. In the illustration, distribution curves cv1 and cv2 are curves obtained by mapping the L components that are z coordinates of the subject to a Y-Z plane and an X-Z plane. A minimum value of the curves is Lmin, a maximum value is Lmax, and Lmin and Lmax define a distribution range of the L component of the lip region prior to repainting. In the illustration, (xi, yi) are xy coordinates at an i-th region among pixels making up the lip region. The L component of xi, yi on the Z axis is L[i]. In the illustration, shp1, which is a three-dimensional shape of the lip region, is formed by plotting values of the L component of pixels of the lip region on the Z axis. When an average value of the L component of pixels is aveLip, a straight line indicating aveLip crosses the distribution curve at a region of a middle portion in the height direction.

The X axis and Y axis in FIG. 9B are horizontal and vertical directions of the image, and the height direction indicates size of the L component of each pixel. In the illustration, distribution curves cv3 and cv4 are curves obtained by mapping the L components that are z coordinates of the object to a Y-Z plane and an X-Z plane. A minimum value of the curves is L'min, a maximum value is L'max, and L'min and L'max define a distribution range of the luminance component of the lip region after repainting. In the illustration, (xi, yi) are xy coordinates at an i-th location among pixels making up the lip region. The L component of xi, yi on the Z axis is L'[i]. In the illustration, shp2, which is a three-dimensional shape of the lip region, is formed by plotting values of the L component of pixels of the lip region on the Z axis. When an average value of the L component of pixels is aveStick, a straight line indicating aveStick crosses the distribution curve at any location in the height direction.

When comparing FIG. 9B to FIG. 9A it can be seen that a range of the distribution curve is greater in FIG. 9B. This indicates that texture and contrast of the lips are expressed, due to a larger numerical range of the L component.

Figure 10A:
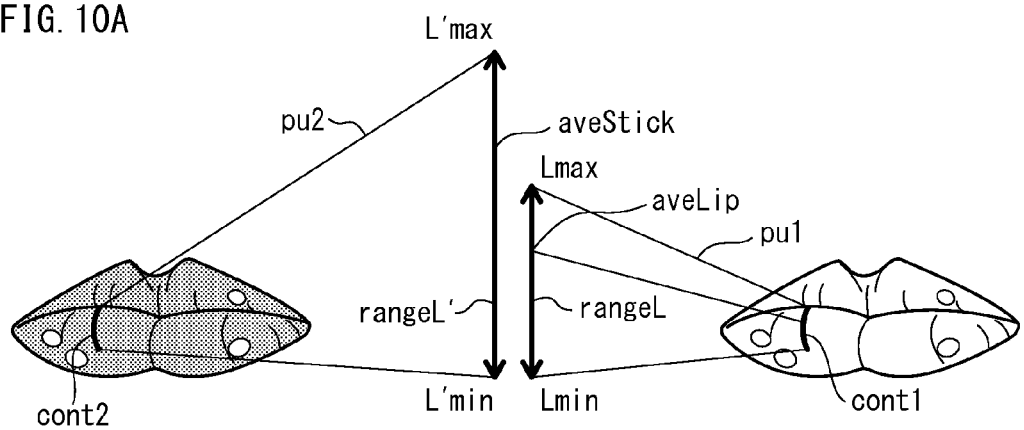
FIGS. 10A and 10B are diagrams schematically showing a concept of color range expansion of color by the image processing device.
Figure 10B:
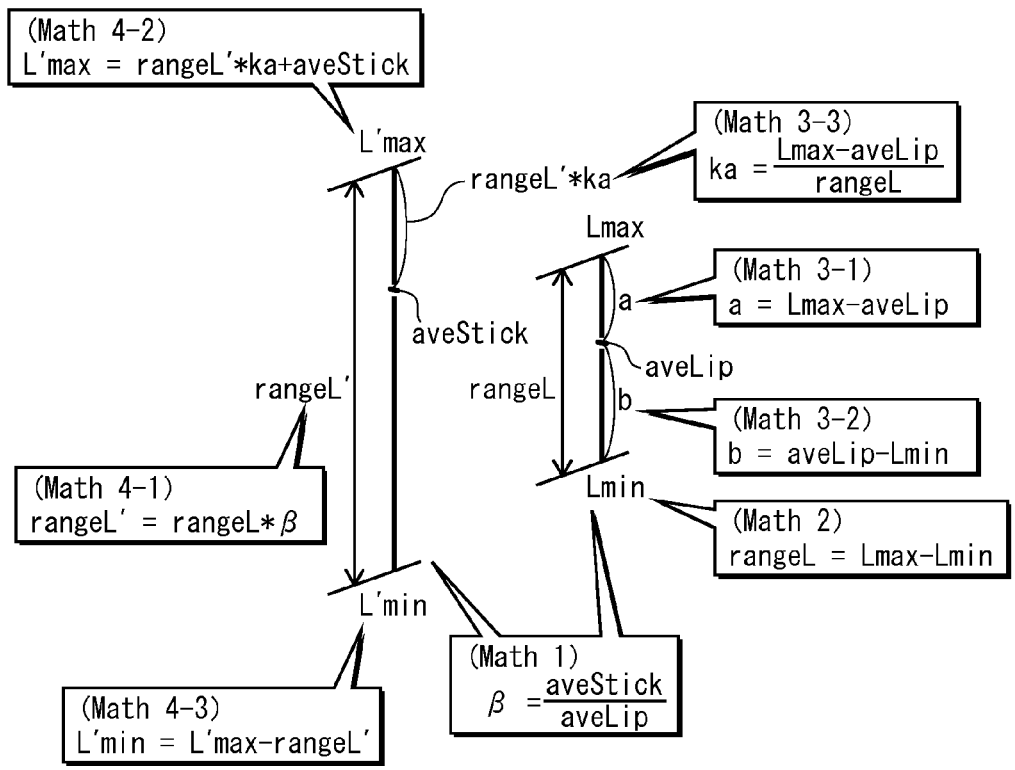

FIGS. 10A and 10B are diagrams schematically showing a concept of color range expansion of color by the image processing device. In FIG. 10A, cont1 is contrast of a lower lip of a user in an original image. A value cont2 is in a face image after make-up application. The value cont1 is a color range of rangeL from Lmin to Lmax, as indicated by a leader line pu1. In contrast, cont2 is a color range of rangeL' from L'min to L'max, as indicated by a leader line pu2. It can be seen that because color ranges of the same region of the lower lip increase, the lips after lipstick application are expressed by the L components having a wide range. The color range of the lip region prior to expansion, rangeL, and the color range after expansion, rangeL', are on the Z axis. When comparing the original lip region and the lipstick application layer, aveStick of the lipstick application layer is at a higher position than aveLip of the original lip region.

FIG. 10B is a diagram of the color range of the original face image and the color range of the face image to which make-up has been applied as illustrated in FIG. 10A, annotated with the formulas of Math 1 to Math 4. β of Math 1 expresses a ratio of the color ranges, Math 2 indicates length of the color range of the original face image, and Math 3-1 and Math 3-2 indicate distance from Lmax to Lave and distance from Lave to Lmin, respectively. Math 4-1 to Math 4-3 indicate an upper limit, lower limit, and length of a color range.

As illustrated in FIG. 10B, difference between L'max and aveStick is the difference between Lmax and aveLip multiplied by β. rangeL' is rangeL multiplied by β. β is a ratio of aveStick to aveLip, and therefore it can be seen that rangeL', or the difference between aveStick and L'max, is rangeL, or the difference between aveLip and Lmax, expanded by the ratio of aveStick to aveLip. Further, because L'min is obtained by subtracting rangeL' from L'max, L'min depends on a ratio of aveStick to aveLip.

The following is a description of mapping the L components of pixels from the face image to the lipstick application layer. In the mapping of pixels in rangeL to rangeL', a value of L[i] of a pixel that is the maximum value Lmax of rangeL becomes L'max. A value of L[i] of a pixel that is the minimum value Lmin of rangeL becomes L'min.

In this way, highlighted and shadowed portions of the original lips become highlighted and shadowed portions after lipstick application. Remaining pixels are mapped maintaining in rangeL' the proportions of rangeL in the source image.

Figures 11A, 11B:
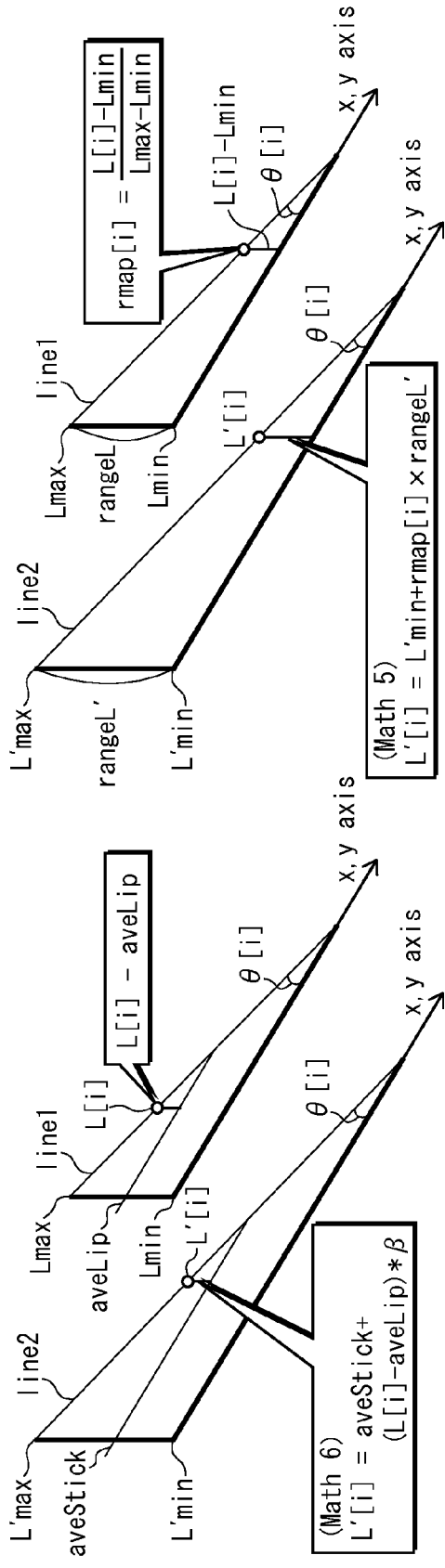
FIG. 11A illustrates a process of transformation of an i-th pixel in the lip region and FIG. 11B illustrates a process of transformation using rmap[i] of an i-th pixel in the lip region after make-up application.

FIGS. 11A and 11B illustrate processing of mapping of a pixel at the i-th location in the source lip region from the color range of the source lip region to the color range of the lip region after lipstick application.

Guidance for determining a pixel value common to both FIGS. 11A and 11B is as follows. L'[i] is defined by a right-angled triangle formed by a straight line passing through L'[i] and L'max as one side, and the X axis and Y axis as two other sides, in a similar shape to a triangle formed by a line passing through L[i] and Lmax, the Z axis, and θ[i].

The front side of FIG. 11A illustrates a relationship between L[i] and L'[i]. A straight line line1 passes through Lmax and L[i]. A straight line line2 passes through L'max and L'[i].

An incline of line1, θ, indicates an amount of change of L[i] with respect to the X axis or Y axis. line2 is the same. L'[i] is at a location aveStick+(L[i]−aveLip)×β, and therefore an incline of line2, which passes through aveStick and L'[i], is the same as the incline of line1, which passes through aveLip and L[i]. aveStick is aveLip multiplied by β, and therefore the difference between L'[i] and aveStick is equal to the difference between L[i] and aveLip multiplied by β.

The difference between L[i] and L'[i] is only the difference from aveLip becoming β, and therefore even when L[i] is mapped to the color range of the lipstick application layer, the location of L'[i] in the color range of the lipstick color is no different from the color range in the lip region.

By repeating the above determination, L'[i] is determined for each pixel composing the lipstick application layer. In this way, values of the Z coordinates of the lipstick application layer vary depending on the XY coordinates and the lipstick application layer is defined as a "layer with a range" having a range in the Z axis direction. By compositing the lipstick application layer and the original face image, plumpness and contrast of the lips in the self-portrait of the user are reproduced.

Because the incline of line1 and the incline of line2 are equal, a ratio in the color range of the L component of each pixel after repainting is equal to a ratio of the L component in the color range prior to the repainting. This relationship is established for all pixels in the lip region after the repainting, and therefore subtleties of skin expressed in each pixel in the lip region are expressed in the lips after make-up application in the rich L component.

A far side of FIG. 11B illustrates implications of rmap[i]. As illustrated, rmap[i] expresses a ratio of a difference L[i]−Lmin to a difference Lmax−Lmin. On the other hand, the front side illustrates implications of Math 6. Here, L'[i] is calculated as rangeL' multiplied by rmap[i], which indicates the above ratio, plus Lmin. Because L'[i] is rmap[i], which is a ratio of L[i] in the color range of the source lip region, multiplied by rangeL', plus Lmin, which is an offset, an amount of change of L'[i] with respect to Xi or Yi is equal to an amount of change of L[i] with respect to Xi or Yi. In FIG. 11B, an incline of a straight line passing through Lmax and L[i] is equal to an incline of a straight line passing through L'max and L'[i]. This relationship is established in all pixels that compose the lip region. This relationship is established for all pixels in the lip region after the repainting, and therefore subtleties of skin expressed in each pixel in the lip region are expressed in the self-portrait after make-up application in the rich L component.

Now that the calculations of rangeL', L'max, and Lmax in the present embodiment have been described, the following is a description of how the calculations in the present embodiment excel when compared to calculations of the lipstick application layer disclosed in Patent Literature 1. The lipstick application disclosed in Patent Literature 1 adds a flat layer to lips, the value of the layer calculated by subtraction of the L component of the lipstick from the L component of the lips, and therefore a difference to be added to the L component is ΔL=aveLip−aveStick. When ΔL is added to the values of each pixel that composes the lips, L'max of the lipstick application layer is Lmax+ΔL and L'min is Lmin+ΔL, making the color range of L'max and L'min of the lipstick application layer Lmax and Lmin of the source lips simply increased by ΔL. Because the minimum value and the maximum value of the color range of the lips uniformly becomes higher, a feeling of volume is lost when compared to the original image. Further, because ΔL is added to Lmin, shadowed portions of the lips become brighter by ΔL.

In Patent Literature 1, in order to avoid shadows becoming brighter, rewriting the L component of shadowed portions and highlights of lips is stopped, but, as mentioned in the introduction of the embodiment, continuity of color is lost and a problem of overexposure occurs. In contrast, in the present embodiment, L'min is calculated by L'max−rangeL, and therefore the minimum value of the color range does not increase. In a make-up image, contrast of the lips in the original image is maintained or, alternatively, emphasized. Further, inconsistency between shadowed portions of the lips and not-shadowed portions does not occur. Further, in the present embodiment, L'[i] of the image after make-up application is obtained from L[i] of the source image, transformed by Math 1 to Math 5. In the process, because a distance in color space between L[i] of the source image and L'[i] of the image after make-up application is contained within a range of 0 to 255, the color range of L'[i] is adjusted so overexposure does not occur. Note that matt finish lipstick cosmetics are also appearing (as with cosmetics for the elderly, cosmetics giving an appearance of powdered skin). Math 1 to Math 5 may be altered to result in a narrower rangeL' for cosmetics resulting in a matt finish.

As described above, processing of elements of the image processing device can be generalized as processing with respect to hardware resources according to internal parameters of various external events and device. Such generalized processing is illustrated in the flowcharts of FIGS. 12-16.

Figure 12:
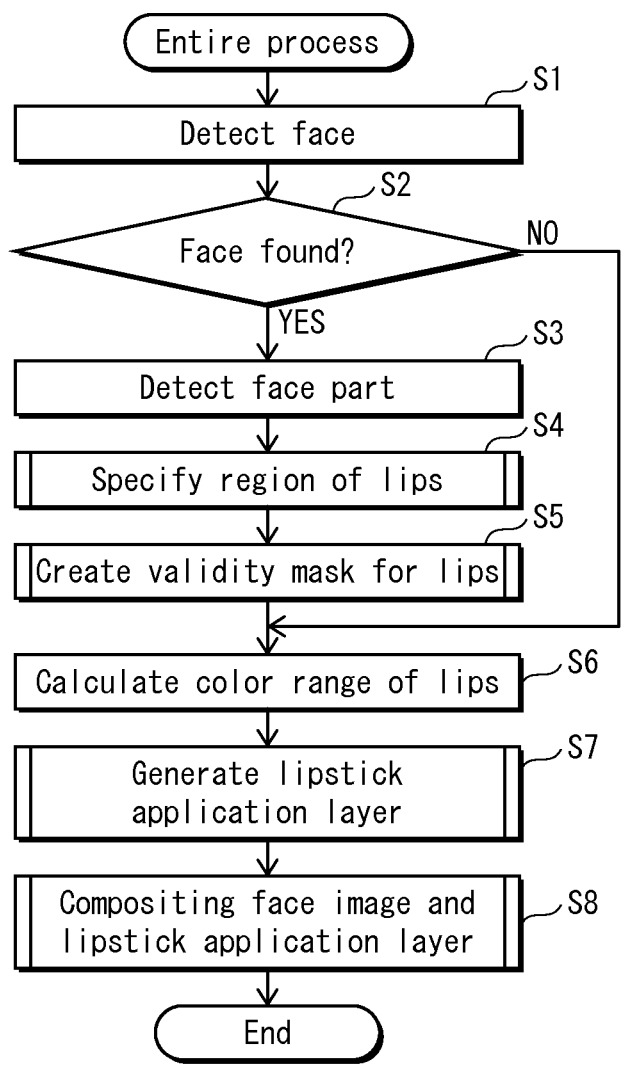
FIG. 12 is a flowchart showing a process in embodiment 1.

FIG. 12 is a flowchart of extraction of feature points of the lip region in embodiment 1. The flowchart in FIG. 12 is top-level processing, i.e. corresponding to a main routine, and the flowcharts in FIGS. 13A to 16 are lower-level flowcharts of the present flowchart. First, in step S1, face detection is performed with respect to an inputted image. Step S2 is determining whether or not a face is found. When a face is found, more detailed detection of face parts is performed in step S3, and feature points of each face part are outputted. In step S4, in order to specify a general region for processing, region specification of lips is performed by generating a lip outline. In step S5, mask data is created. The mask data masks portions that are not lips, for example skin and teeth, with a value of zero. On the other hand, when a face is not found, steps S3 to S5 are skipped and processing advances to step S6.

In step S6, the color range of the lips in the original self-portrait and the color range of lipstick from the representative color of inputted lipstick are generated. In step S7, the lipstick application layer is generated from the color range of the lipstick and the color range map of the lips. In step S8, the lipstick application layer is composited with the face image.

Figure 13A:
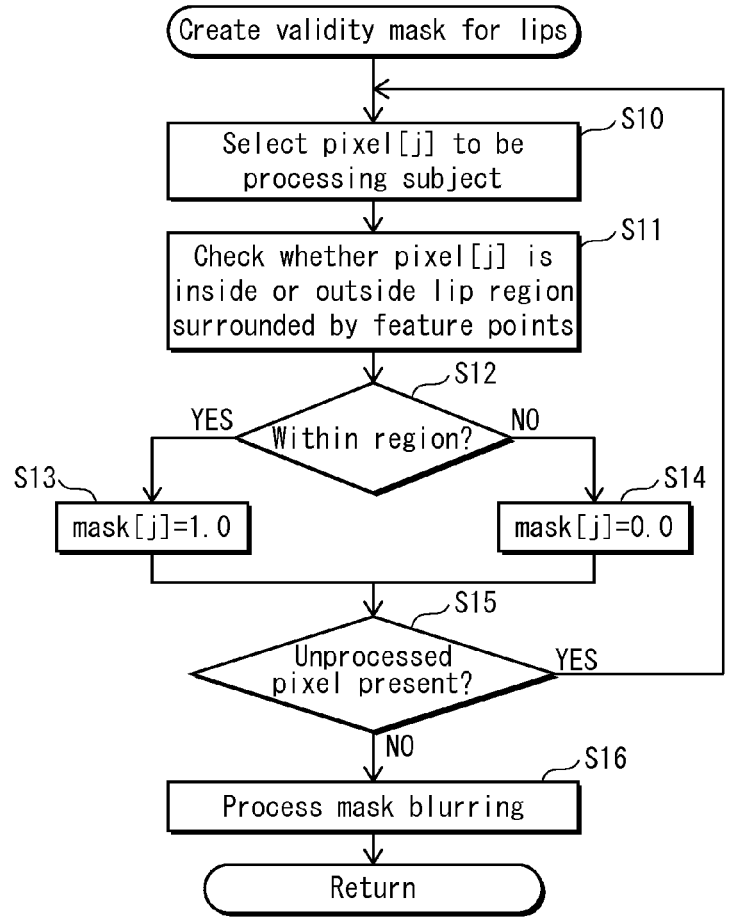
FIG. 13A is a flow illustrating details of a process of creating a validity mask of lips.

FIG. 13A is a flow illustrating details of a process of creating a validity mask of the lips, as above. The process shown in the flowchart is illustrated as a subroutine. When the subroutine is called and upon accepting parameters of specification of the face image, processing shown in the flowchart is executed and subsequently the mask data is returned. In FIG. 13A, a variable j is a variable indicating a processing subject among a plurality of information elements in a data structure. Accordingly, in subsequent steps of the flowchart, a pixel mask that is to be a processing subject in round j of a loop is referred to as mask[j].

In the present flowchart, in step S10, a single pixel[j] is selected as a processing subject and step S11 is executed. In step S11, whether the pixel that is a processing subject is inside or outside the lip region is checked. In step S12, whether or not the pixel that is a processing subject is within the region of the lip region is determined. When in the region (S12: Yes), a mask value (mask[j]) in step S13 is set to 1.0. On the other hand, when outside the region (S12: No), a mask value (mask[j]) in step S14 is set to 0.0. Then, in step S15, whether or not a pixel exists that has yet to be processed is determined, and when such a pixel exists, processing returns to step S10. When processing with respect to all pixels is completed, a mask blurring process is executed (S16) and processing ends.

This process of creating the validity mask has the aims of demarcating lips and not lip portions (teeth, skin, background, etc.), limiting a processing range of the compositing processing unit 16, and ensuring that compositing is only performed in a required region. Further, by determining a region of the lips in fine detail, aveLip, which is a representative color of the lips, can be calculated more accurately.

The following assumes that the region surrounded by the feature points detected by the face part detection is the lip region. In such a case, within the region of the lip region the mask value mask[j] of a pixel is 1.0 and outside the region mask[j] is 0.0. After checking of the entire region, the mask blurring process is executed (step S16). By blurring the validity mask, a boundary between a repainting portion and a not-repainted portion does not stand out, and a smooth connection from a repainted color to the source color is achieved.

Figure 13B:
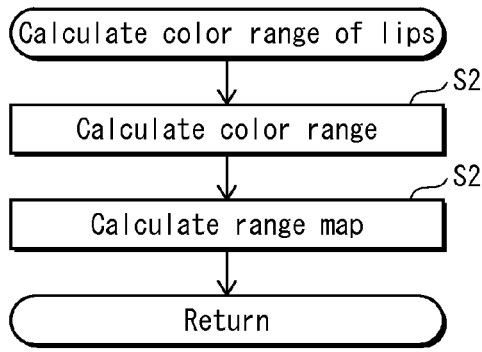
FIG. 13B is a flowchart showing a process of calculating a color range of the lips.

FIG. 13B is an upper-level flowchart of a process of calculation of the color range of the lips. In step S21, with respect to an inputted image of the lips, the color range is obtained by calculating the minimum value, maximum value, and average value of the L channel. In step S22, the color range map indicating distribution of the L channel is calculated.

Figure 13C:
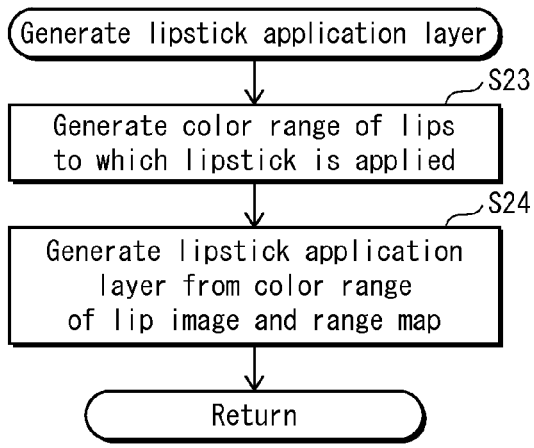
FIG. 13C is a flowchart showing a process of generation of the lipstick application layer.

FIG. 13C is a flowchart showing a process of generation of the lipstick application layer. In step S23, the color range of the lips to which lipstick is applied is generated, and in step S24, the lipstick application layer is generated from the color range of the lips and the range map.

Next, a flowchart of a calculation procedure of the color range of the lips in embodiment 1 is described.

Figure 14A:
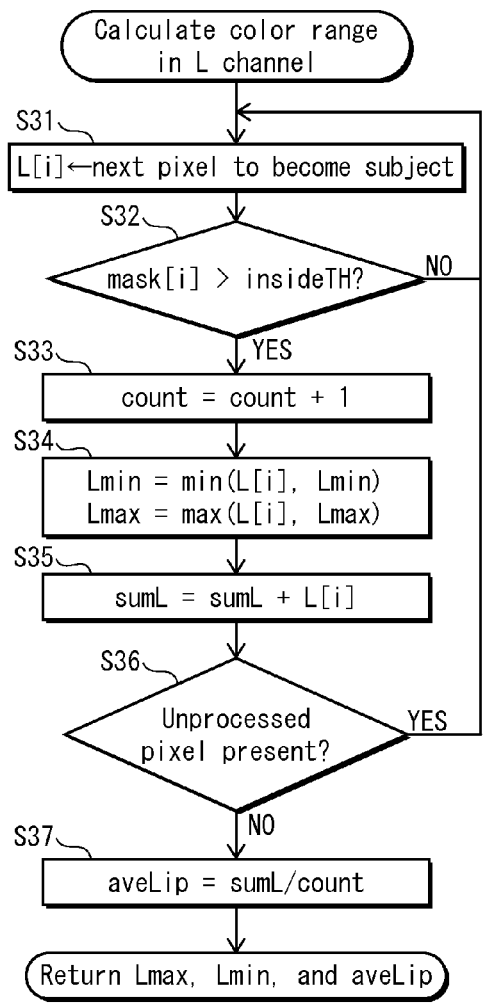
FIG. 14A is a flowchart of specifics of calculation of the color range.
Figure 14B:
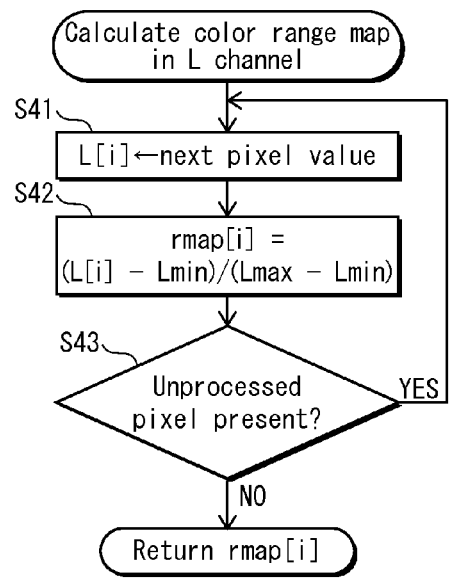
FIG. 14B is a flowchart showing a detailed process of the calculation of a range map.

FIG. 14A is a flowchart of specifics of calculation of the color range. In FIGS. 14A and 14B, a variable i is a variable indicating a processing subject among a plurality of information elements in a data structure. Accordingly, in subsequent steps of the flowcharts, a pixel mask and an L component of a pixel that is to be a processing subject in round i of a loop are referred to as mask[i] and L[i], respectively.

In step S31, the next pixel to be a processing subject is L[i]. In step S32, whether or not the mask value mask[i] of a pixel[i] is greater than a threshold insideTH is determined, thereby checking whether the pixel is a pixel inside the region of the lips or a pixel outside the region of the lips (skin, teeth, etc.). Here, insideTH is a value from 0.0 to 1.0. When mask[i] of the pixel[i] is greater than insideTH, a pixel count inside the region is incremented in step S33, and Lmax and Lmin are updated in step S34. Lmin is updated such that Lmin=min(L[i], Lmin) Here, min( ) is a function returning a lowest parameter out of two values. By executing Lmin=min(L[i], Lmin), the lowest out of L[i] and Lmin is set as Lmin Lmax is updated such that Lmax=max(L[i], Lmax). Here, max( ) is a function returning a highest parameter out of two values. By executing Lmax=max(L[i], Lmax), the highest out of L[i] and Lmax is set as Lmax.

In step S35, sumL is updated by adding L[i] to sumL. In step S36, whether or not processing has been performed in the loop for every pixel is determined. When pixels that have not been processed exist, processing returns to step S31. When there are no pixels that have not been processed, step S36 gives a "No" result, and in step S37, a calculation of sumL/count is performed to obtain aveLip and subsequently Lmax1, Lmin1, and aveLip are returned.

FIG. 14B is a flowchart showing a detailed process of the calculation of the color range map S42. In step S41, the next pixel to be a subject is L[i], and in step S42, a ratio is calculated of L[i]−Lmin to Lmax−Lmin as the range map rmap[i] with respect to the pixel L[i]. In step S43, whether or not the above processing has been performed for every pixel in the region is determined, and when the above processing has been performed for every pixel, rmap[i] is returned. When pixels remain that have not been processed, processing returns to step S41, and calculation of the range map is performed for a pixel that has not yet been processed.

Figure 15B:
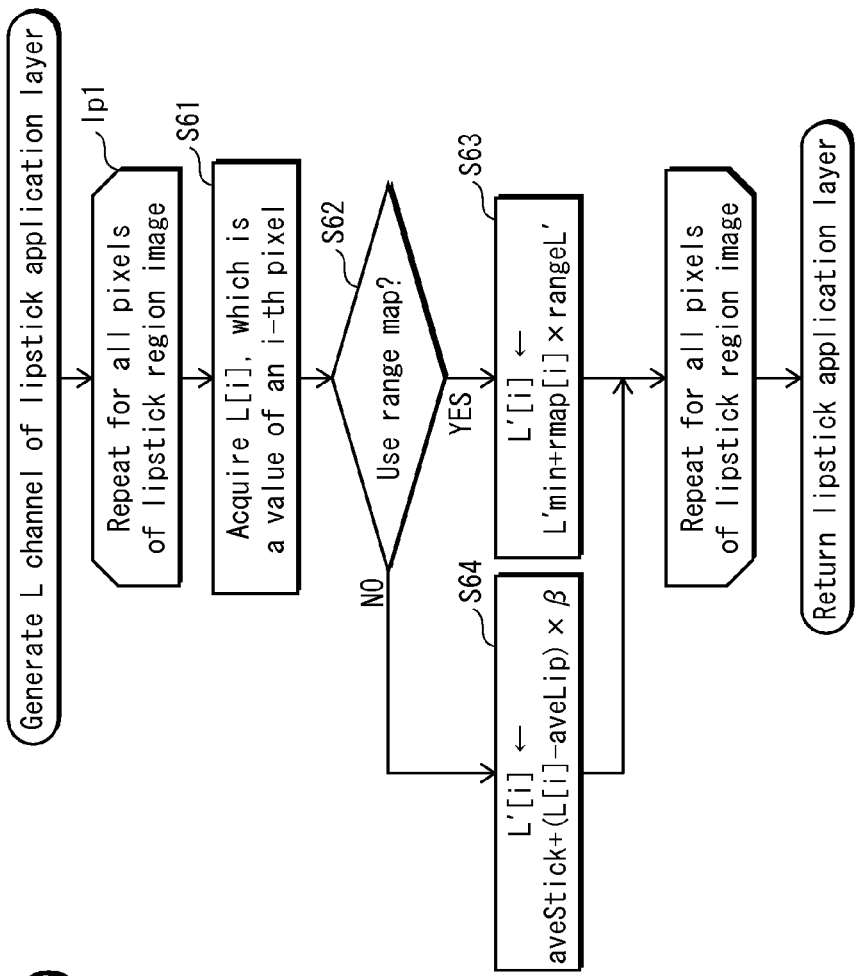
FIG. 15B is a flowchart illustrating a process of generation of the L channel of the lipstick application layer.
Figure 15A:
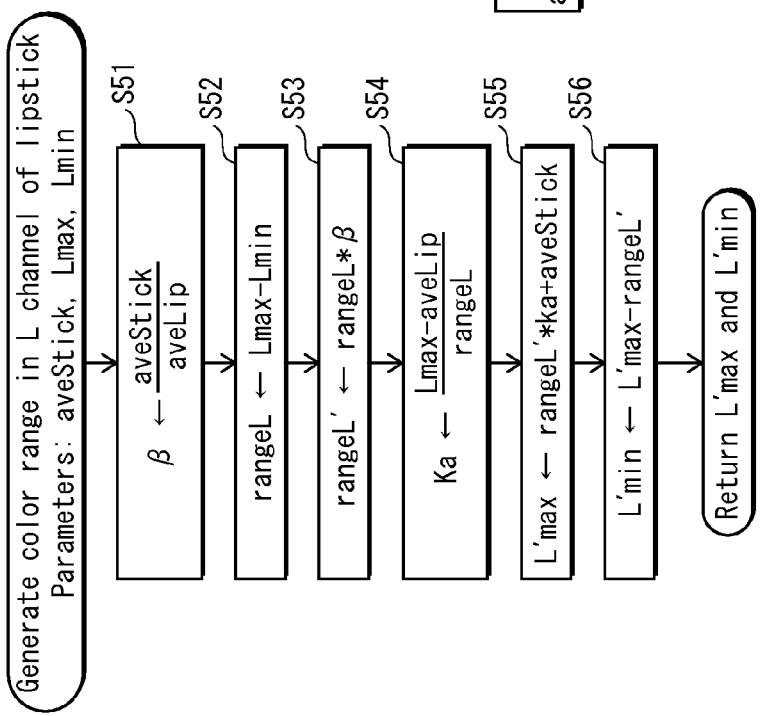
FIG. 15A is a flowchart illustrating a process of generation of a color range in the L channel of the lipstick application layer.

FIG. 15A is a flowchart showing a process of generation of the color range in the luminance component of the lipstick application layer. In step S51, the ratio β is calculated by calculation of aveStick/aveLip, and in step S52, rangeL is obtained by subtracting Lmin from Lmax. In step S53, RangeL' is obtained by multiplying rangeL by β. In step S54, the coefficient ka is calculated from (Lmax−aveLip)/rangeL, and in step S55, L'max is obtained by adding aveStick to a value of RangeL' multiplied by ka. In step S56, L'min is obtained by subtracting RangeL' from L'max. When L'max and L'min are obtained by the above processing, L'max and L'min are returned.

FIG. 15B is a flowchart showing a process of generation of the luminance component of the lipstick application layer. In FIG. 15B, the variable i is a variable indicating a processing subject among a plurality of pixels in the face image. Accordingly, in subsequent steps of the flowcharts, a pixel mask and an L component of a pixel that is to be a processing subject in round i of a loop are referred to as mask[i] and L[i], respectively. The present flowchart is composed of a loop lp1. The loop lp1 is defined as a loop repeating step S61 to step S64 for every variable of the lip region. In step S61, L[i] is obtained, which is a value of the L component of an i-th pixel, and in step S62, whether or not a range map is used is determined. When the range map is used, in step S63, L'[i] is obtained by calculating L'min+rmap[i]×RangeL'.

When the range map is not used, in step S64, L'[i] is obtained by calculating aveStick+(L[i]−aveLip)×β.

Figure 16:
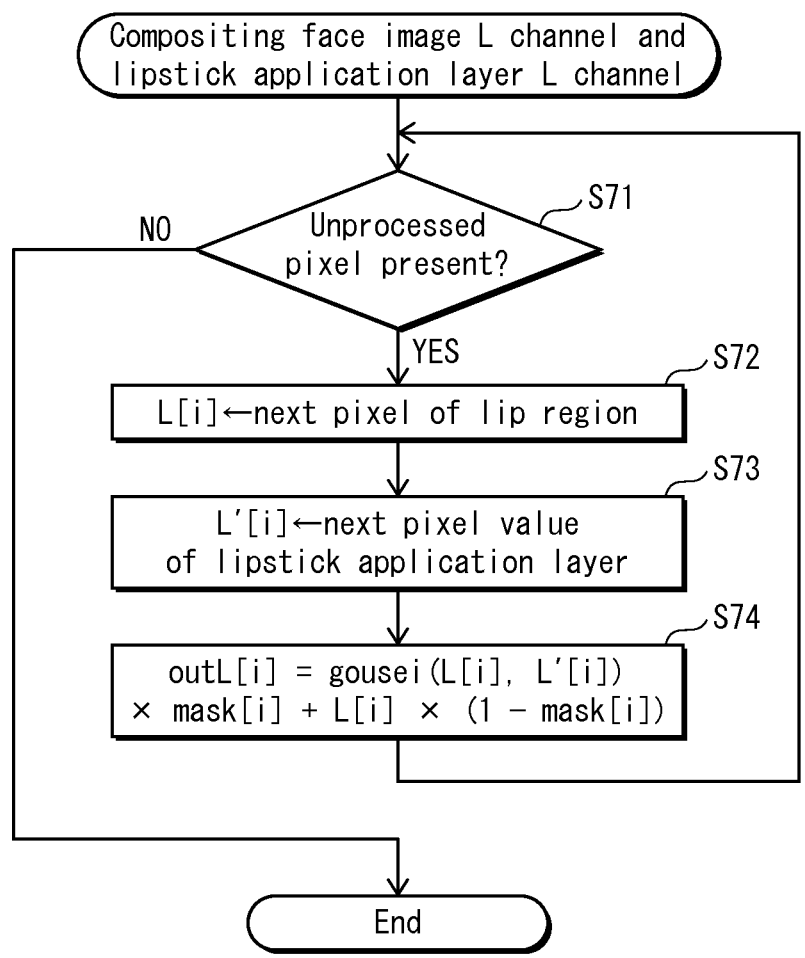
FIG. 16 is a flowchart of compositing processing with regard to the L channel.

FIG. 16 is a flowchart showing a process of compositing in embodiment 1. In FIG. 16, the variable i is a variable indicating a processing subject among a plurality of information elements in a data structure. Accordingly, in subsequent steps of the flowchart, an L component of a pixel to be a processing subject in round i of a loop is L[i], and for pixels of an image after make-up application, a pixel mask and an L component of a pixel that is to be a processing subject in round i of a loop are referred to as mask[i] and L'[i], respectively. Step S71 is a determination of whether or not processing is complete for every pixel in the region. When complete, processing of the flowchart is ended, and returned. When pixels remain that have not been processed, in step S72 the next pixel that composes the lip region is set as L[i], and in step S73 the next pixel that composes the lipstick application layer is set as L'[i]. Subsequently, in step S74, gousei(L[i], L'[i]) is calculated, which is a result of compositing each pixel value of the lip region L[i] and each corresponding pixel value L'[i] of the lipstick. Subsequently, mask processing is performed with respect to gousei(L[i], L'[i]). In the illustration, gousei(L[i], L'[i])×mask[i]+L[i]×(1−mask[i]) is the mask processing in mathematical terms.

The compositing processing gousei can use a blending, multiplication, addition, highlights, etc. When using α blending, the above-mentioned mask processing uses mask [j], which is validity mask data of an existing pixel, as an α value, performs a blending of gousei(L[i], L'[i]), and L[i], which is a pixel value prior to make-up application, and outputs outL[i] as a final result.

By making the validity mask data mask[i] a parameter of a blending, make-up application is stopped at points that are not lips, i.e. points where mask[j]=0.0, and lipstick is only applied to the region of the lips. When the above processing is complete, Lmin, Lmax, aveLip, L'min, L'max, and aveStick, which are calculated by the above processing, are stored as metadata files, and are stored in association with the make-up image file in the directory of the user. Thus a log remains of conditions of make-up application.

According to the embodiment described above, (i) the color range is obtained of the face image to which make-up is applied by expanding the color range of the original lips according to the ratio of the representative color of the face image and the application color of the lipstick, (ii) mapping is performed of the L component of pixels of the lips of the original face image to the color range of the face image to which make-up is applied such that the ratio of the L component of each pixel of the original face image to the color range is maintained, and therefore (iii) the color of the lips is painted the color of the lipstick in a way that does not impair the way in which ambient light illuminates the lips in the environment in which the face image is captured. The state in which lipstick is applied to the lips is reproduced naturally, and therefore shows off the attractiveness of the lipstick as a cosmetic item.

Embodiment 2

Figure 17:
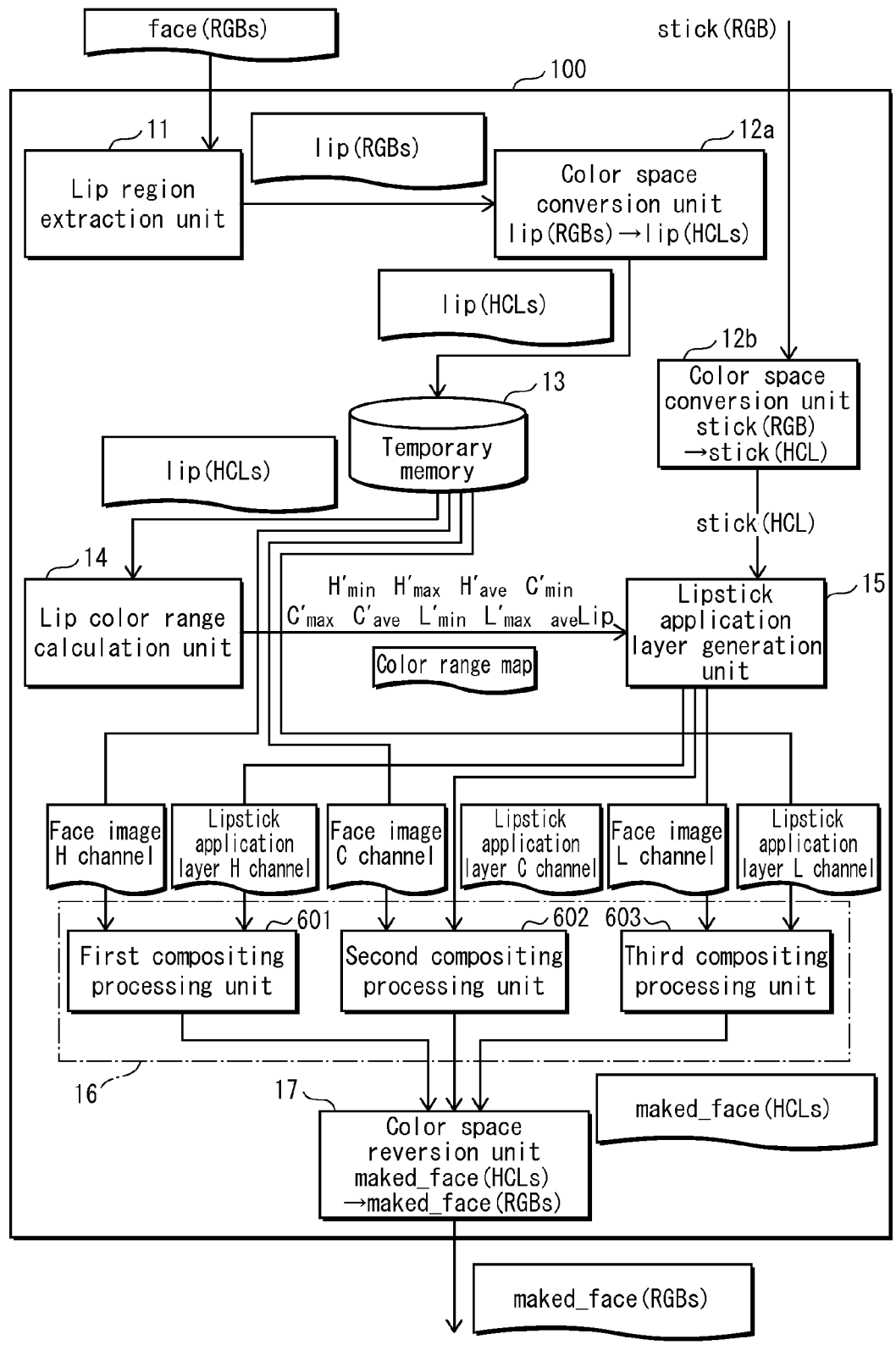
FIG. 17 is a diagram illustrating internal elements of the image processing device in embodiment 2.
Figure 18A:
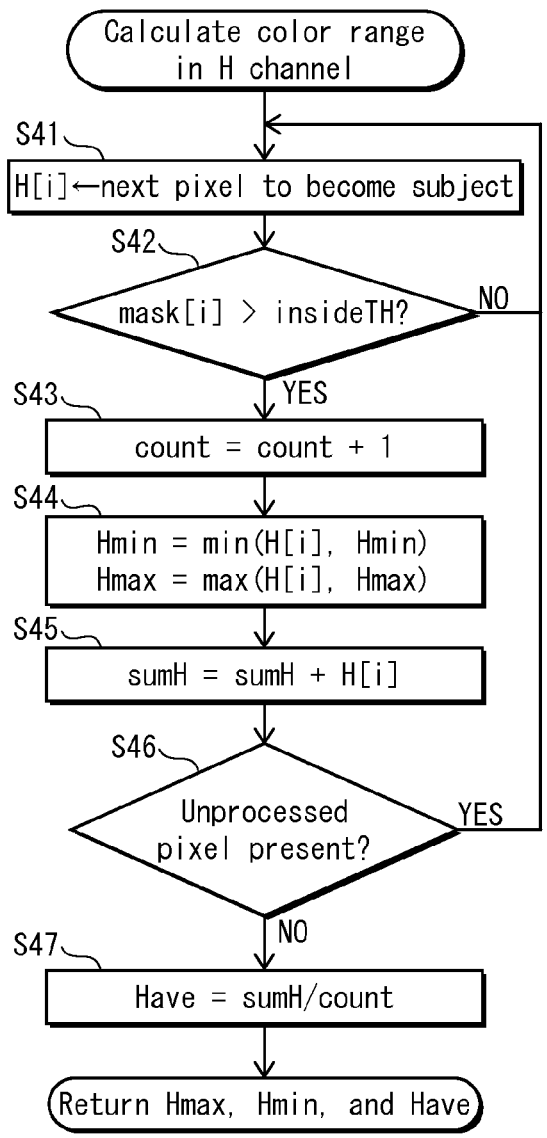
FIG. 18A is a flowchart of specifics of calculation of a color range of an H channel.
Figure 18B:
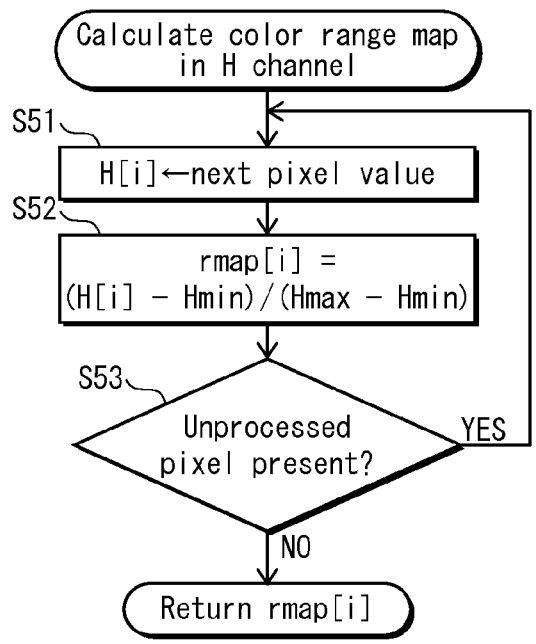
FIG. 18B is a flowchart illustrating a detailed process of the calculation of a color range map.
Figure 19A:
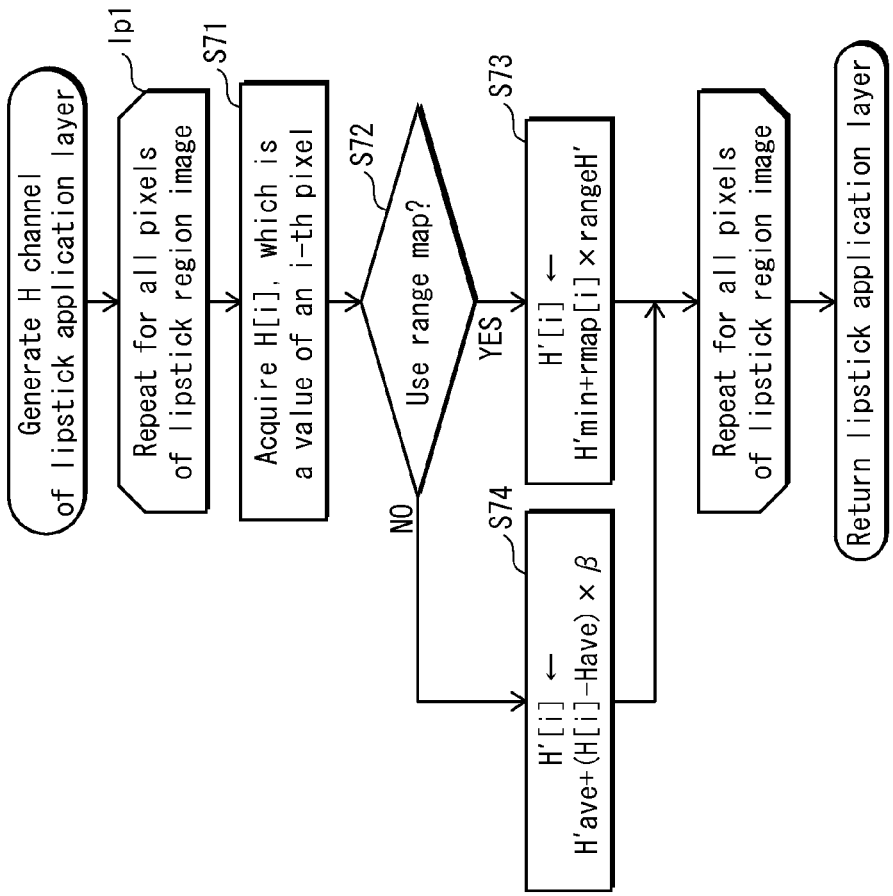
FIG. 19A is a flowchart illustrating a process of generation of a color range of an H channel of the lipstick application layer.
Figure 19B:
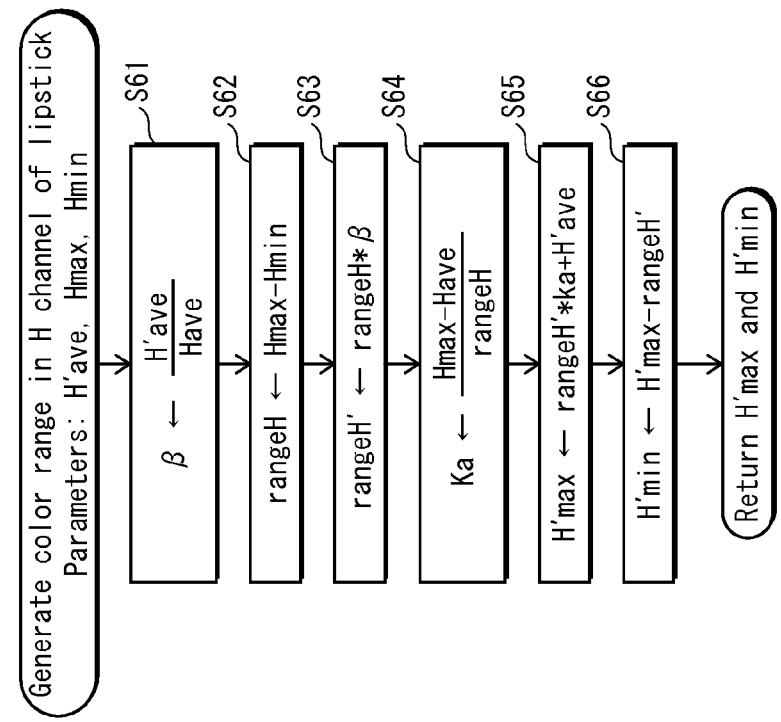
FIG. 19B is a flowchart illustrating a process of generation of the H channel of the lipstick application layer.
Figure 20:
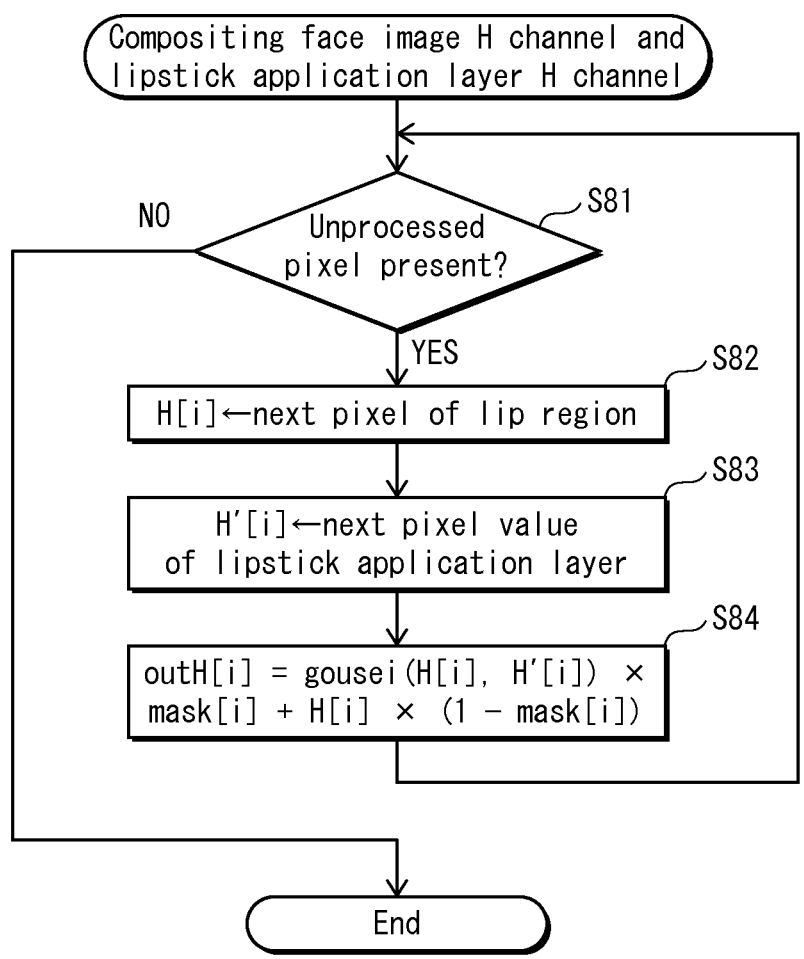
FIG. 20 is a flowchart of compositing processing with regard to the H channel.
Figure 21A:
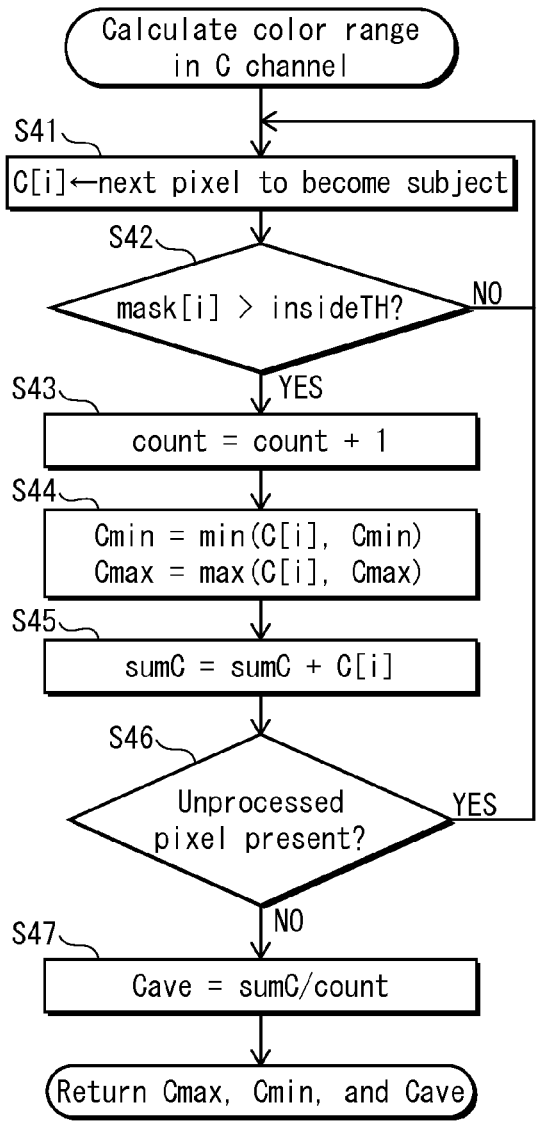
FIG. 21A is a flowchart of specifics of calculation of a color range of a C channel.
Figure 21B:
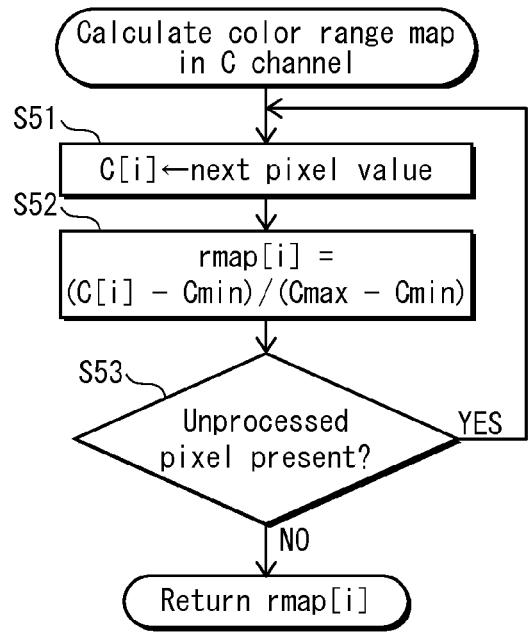
FIG. 21B is a flowchart showing a detailed process of calculation of a color range map S42.
Figure 22B:
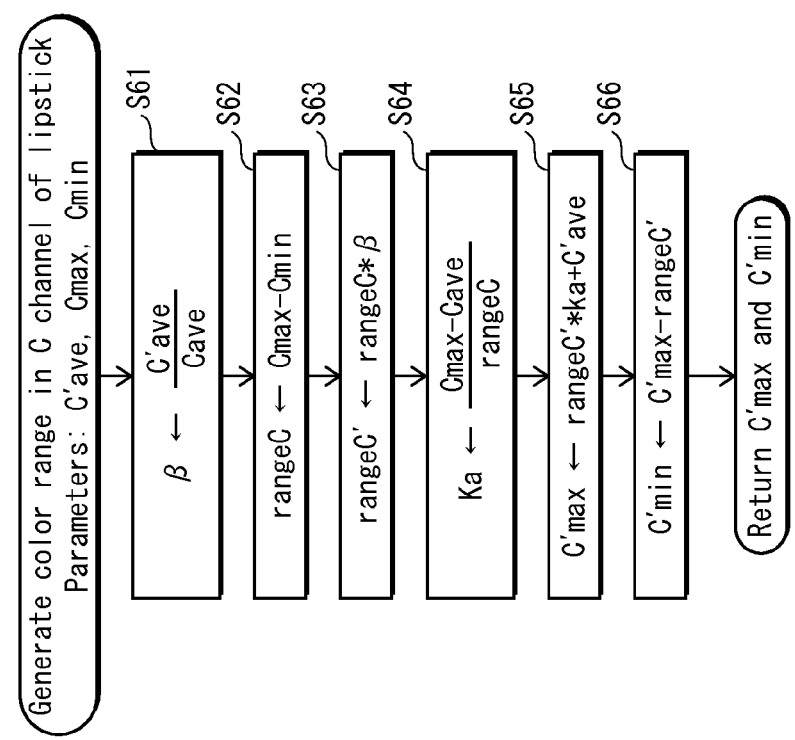
FIG. 22B is a flowchart illustrating a process of generation of the C channel of the lipstick application layer.
Figure 22A:
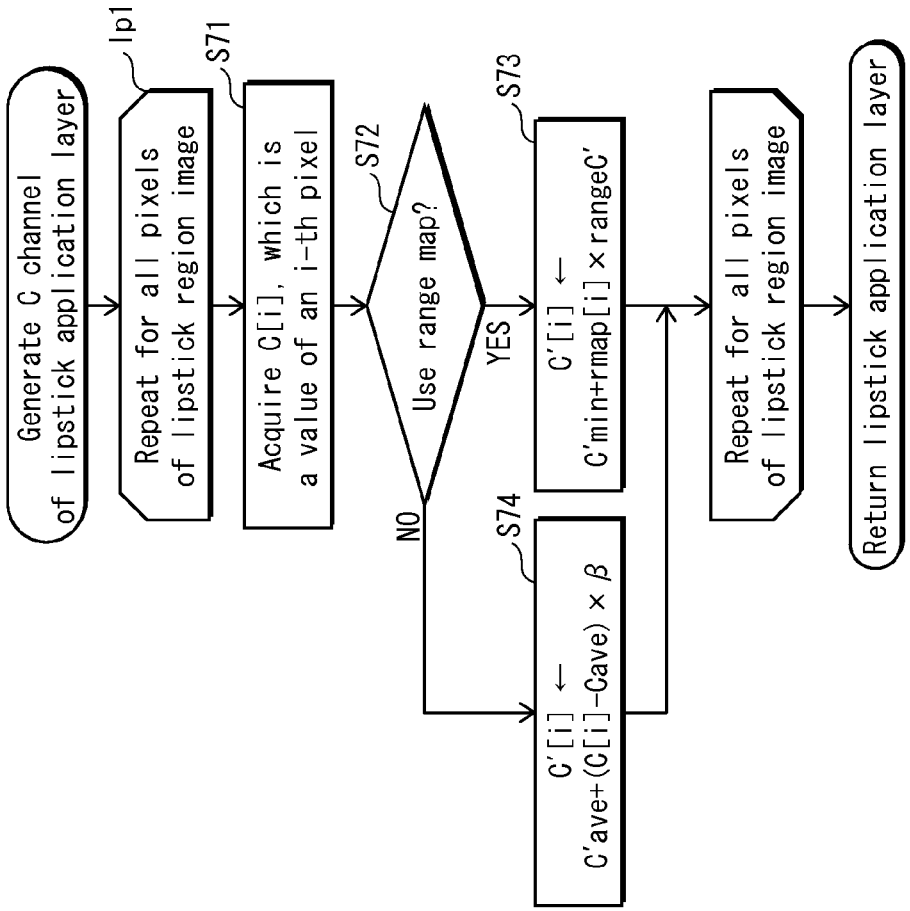
FIG. 22A is a flowchart illustrating a process of generation of a color range in the C channel of the lipstick application layer.
Figure 23:
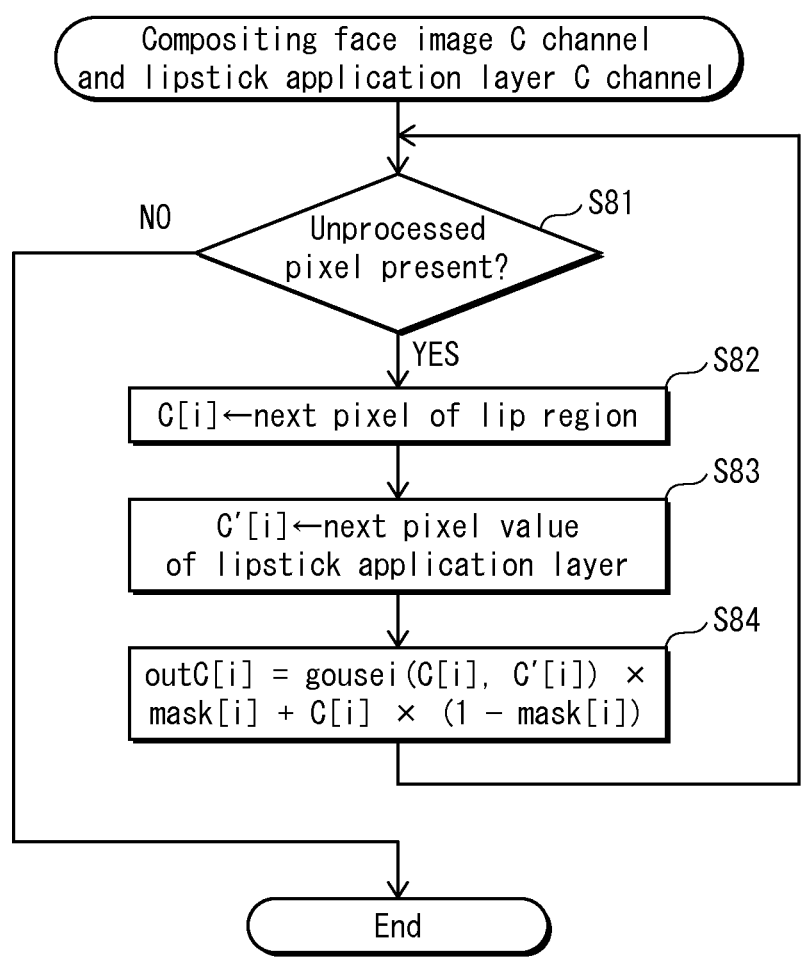
FIG. 23 is a flowchart of compositing processing with regard to the C channel.

In embodiment 1, from among the H, C, and L channels that compose the lips, the L channel is the subject for converting the color range and mapping pixel bit values. However, in the present embodiment, the H channel and the C channel are also subjects for converting the color range and mapping pixel bit values. Configuration of the image processing device for such an improvement is illustrated in FIG. 17. In FIG. 17, elements that are the same as in FIG. 6 use the same signs, and description thereof is omitted here.

When comparing the image processing device of FIG. 17 to the image processing device illustrated in embodiment 1, the following differences exist.

First, output from the lip color range calculation unit 14 is different. The difference in output from the lip color range calculation unit 14 is that, while the lip color range calculation unit 14 in embodiment 1 outputs Lmax, Lmin, and aveLip, the lip color range calculation unit 14 in embodiment 2 outputs Hmax, Hmin, and Have in connection with the H channel, and Cmax, Cmin, and Cave in connection with the C channel, in addition to Lmax, Lmin, and aveLip.

Second, channels of the lipstick application layer generated by the lipstick application layer generation unit 15 are different. The difference in channels of the lipstick application layer is that while the lipstick application layer generation unit 15 in embodiment 1 receives Lmax, Lmin, and aveLip and generates L'max, L'min, and aveStick, the lipstick application layer generation unit 15 in embodiment 2 receives Hmax, Hmin, and Have of the H channel and Cmax, Cmin, and Cave of the C channel in addition to Lmax, Lmin, and aveLip, and generates H'max, H'min, and H'ave of the H channel and C'max, C'min, and C'ave of the C channel in addition to L'max, L'min, and aveStick.

Third, elements performing compositing of the face image are different. The difference in elements performing the compositing is that while compositing in embodiment 1 is primarily performed only by the compositing processing unit 16 that composites the L channel of the lipstick application layer and the L channel of the face image, in embodiment 2, the compositing processing unit 16 is composed of: a first compositing processing unit 61 that performs compositing between the L channel of the lipstick application layer and the face image; a second compositing processing unit 62 that performs compositing between the H channel of the lipstick application layer and the face image; and a third compositing processing unit 63 that performs compositing between the C channel of the lipstick application layer and the face image.

By using the compositing processing units 61, 62, and 63 with respect to the hue, chroma, and L channels, adjustment for each individual channel is possible, and special effects, for example contrast enhancement, vividness adjustment, reversal of hue of repainting color, etc., can be applied to a composited image. The above covers the differences in elements.

The following describes differences in processing.

Differences in processing are that while in embodiment 1 color range calculation, color range map calculation, color range generation, lipstick application layer generation, and compositing of the lipstick application layer and the face image are executed with respect to the L channel (FIGS. 14A to 16), in embodiment 2 color range calculation, color range map calculation, color range generation, lipstick application layer generation, and compositing of the lipstick application layer and the face image are executed with respect to the H channel and the C channel as well as the L channel. FIGS. 18A to 20 are flowcharts illustrating color range calculation processing, color range map calculation processing, color range generation processing, lipstick application layer generation processing, and compositing processing of the lipstick application layer and the face image with regard to the H channel. FIGS. 21A to 23 are flowcharts illustrating color range calculation processing, color range map calculation processing, color range generation processing, lipstick application layer generation processing, and compositing processing of the lipstick application layer and the face image with regard to the C channel. The difference between these flowcharts and the flowcharts in embodiment 1 are just that in embodiment 1 the subject of color range calculation, color range map calculation, color range generation, lipstick application layer generation, and compositing of the lipstick application layer and the face image is the L channel, while in embodiment 2 the subjects of color range calculation, color range map calculation, color range generation, lipstick application layer generation, and compositing of the lipstick application layer and the face image are the H channel and the C channel. Because the difference between the flowcharts is only a difference in subject, the same reference signs are used and description thereof is omitted here.

As mentioned here (and in the introduction to the embodiment), when a value of the H component is added to an H component among the sample colors of cosmetic items that a user can select that has a narrow color range, like yellow, color identity may be lost. As a countermeasure in embodiment 2, for each cosmetic item that can be selected, how much of the color range has the same color identity is stored in advance. Thus, when a user selects a cosmetic item, breadth of the same color identity of the sample color of the selected cosmetic item is determined, and when the color range having the same color identity of the cosmetic item is broad, calculation of Hmin, Hmax, and Have of the H component is performed, and H'min, H'max, and H'ave are calculated, as mentioned above.

When the color range of having the same color identity is narrow, as with yellow, calculation of Hmin, Hmax, Have, H'min, H'max, and H'ave of the H channel is not performed. In this way, by limiting execution of calculation of Hmin, Hmax, Have, H'min, H'max, and H'ave of the H component, quality of the image after make-up application is maintained.

According to the present embodiment, compositing is performed for each of the H channel, the C channel, and the L channel of multiple types of pixels in the original image, and therefore it is possible to repaint the lips of the subject with a rich three-dimensional effect.

Embodiment 3

Embodiment 3 relates to an improvement for imparting highlights and shadows preferred by a user to the face image after make-up application. When comparing the image processing device pertaining to embodiment 3 to the image processing device pertaining to embodiment 1, the following differences exist.

First, a method of acquiring the range map is different. Acquisition of the range map in the first embodiment is creating the range map from the image that is the subject of processing. In contrast, acquisition of the range map in the present embodiment is achieved by accessing a storage medium and reading therefrom a sample file containing a range map corresponding to the cosmetic item.

Second, values of the range map are different. The difference in the range map is that while a value of each pixel in the range map in embodiment 1 is obtained by dividing the difference (L[i]−Lmin) by the color range (Lmax−Lmin) for each pixel, a value of each pixel in the range map in the present embodiment is obtained from a value of each pixel in the range map sample with a weighted value from 0.0 to 1.0.

Third, a method is different of detecting a pixel bit value used in ranges of the face image after make-up application. The pixel bit value L[i] of the i-th pixel in embodiment 1 is calculated by multiplying rmap[i] by rangeL' and adding Lmin. In contrast, the pixel bit value L[i] of the i-th pixel in the present embodiment is calculated by scaling the range map sample to fit the size of the user's lips, multiplying the i-th weighted value in the range map sample after the scaling by rangeL', and adding Lmin.

The following is description of configuration of the image processing device specific to the present embodiment.

Sample files are stored each corresponding to one of a plurality of cosmetic items on the storage medium that the image processing device can access. The sample files are each a sample of how values of pixels are distributed in a plane, and an appropriate sample file is read according to the cosmetic item that is selected.

Figure 24A:
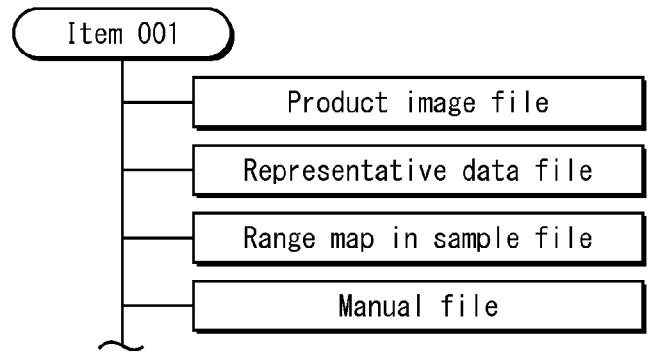
FIG. 24A illustrates a directory structure of the storage 6 in embodiment 3.

The following is a description of improvements in storage in the present embodiment. FIG. 24A illustrates the directory structure of the storage 6 in embodiment 3. The difference in storage is that while in embodiment 1 the product image file, the representative color data file, and the manual file are stored in the directory for each item, in the present embodiment, in addition to the product image file, the representative color data file, and the manual file, the sample file storing the range map sample is stored as one element of the product item. The range map sample stored in the sample file has a customized luminance distribution according to optical properties of the corresponding cosmetic item.

Figure 24B:
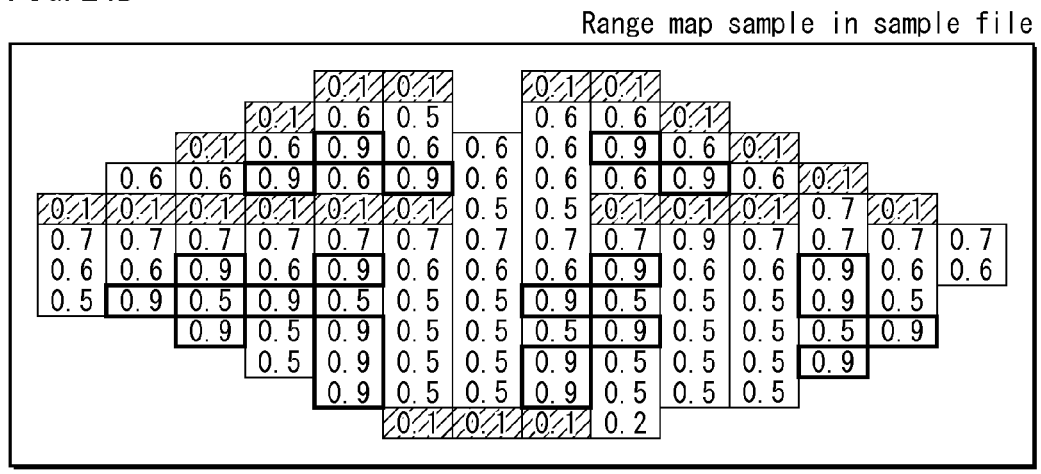
FIG. 24B illustrates an example of a range map sample stored in a sample file.
Figure 24C:
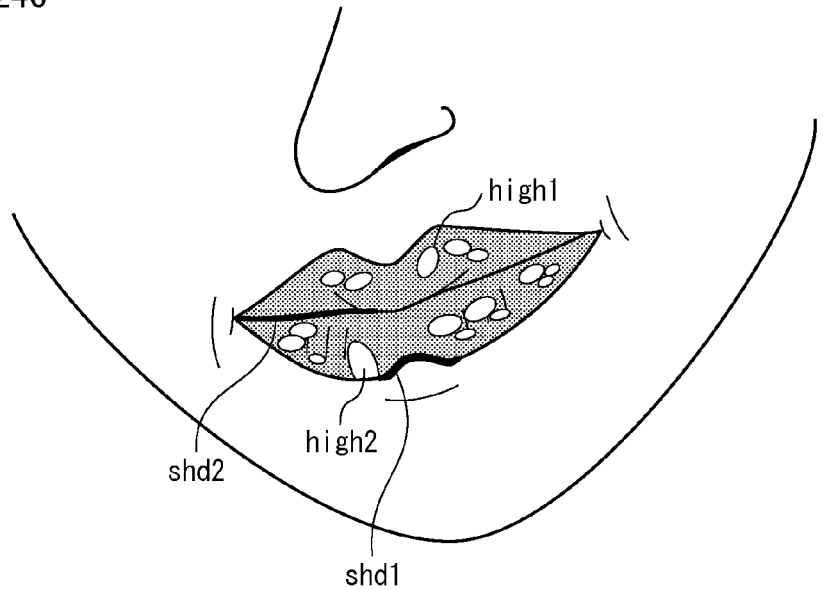
FIG. 24C illustrates highlights and shadows of lips implemented by the sample file.

FIG. 24B illustrates an example of the range map sample stored in the sample file. In the image data in the illustration, a background portion is composed of pixels having a weight of zero, and a foreground portion is composed of pixels having a non-zero weighting factor. Pixels having such a non-zero weight compose a lip shape. Both left and right sides, which are corner portions of the mouth, and boundary portions of the upper and lower lips, have a low value of 0.1. On the other hand, plump portions of the lower and upper lips and portions being illuminated have a high value of 0.9. These portions indicate highlights due to illumination by interior lighting. FIG. 24C illustrates highlights and shadows of the lips implemented by the sample file. In the illustration, highlights high1 and high2 are provided by setting the value 0.9 in the sample file in FIG. 24B. Further, shadows shd1 and shd2 are provided by setting the value 0.1 in the sample file in FIG. 24B.

Significance of introducing the sample file is as follows. As a trend of the cosmetic item industry in recent years, products have appeared having a variety of optical properties.

Lipsticks may contain compositions other than colorants, such as reflective pigments, diffusing pigments, and multilayer interference pigments. Colorants may have sensitivity to external stimuli. Reflective pigments perform metallic reflection. Diffractive pigments contain diffractive pigments in order to produce an effect of diffraction of light or a pearlescent effect. Diffusing pigments cause light by absorption. Multilayer interference pigments cause greater color intensity than color intensity of diffusing pigments by multilayer deposition and reflection indices.

In order to express differences of such optical properties, multiple different sample files are provided containing highlight amounts and locations and shadow amounts and locations, and each sample file is associated with an element of a cosmetic item. A sample file is read depending on selection of a cosmetic item, and differences in optical properties of lips are expressed by performing mapping of pixel bit values.

Figure 25:
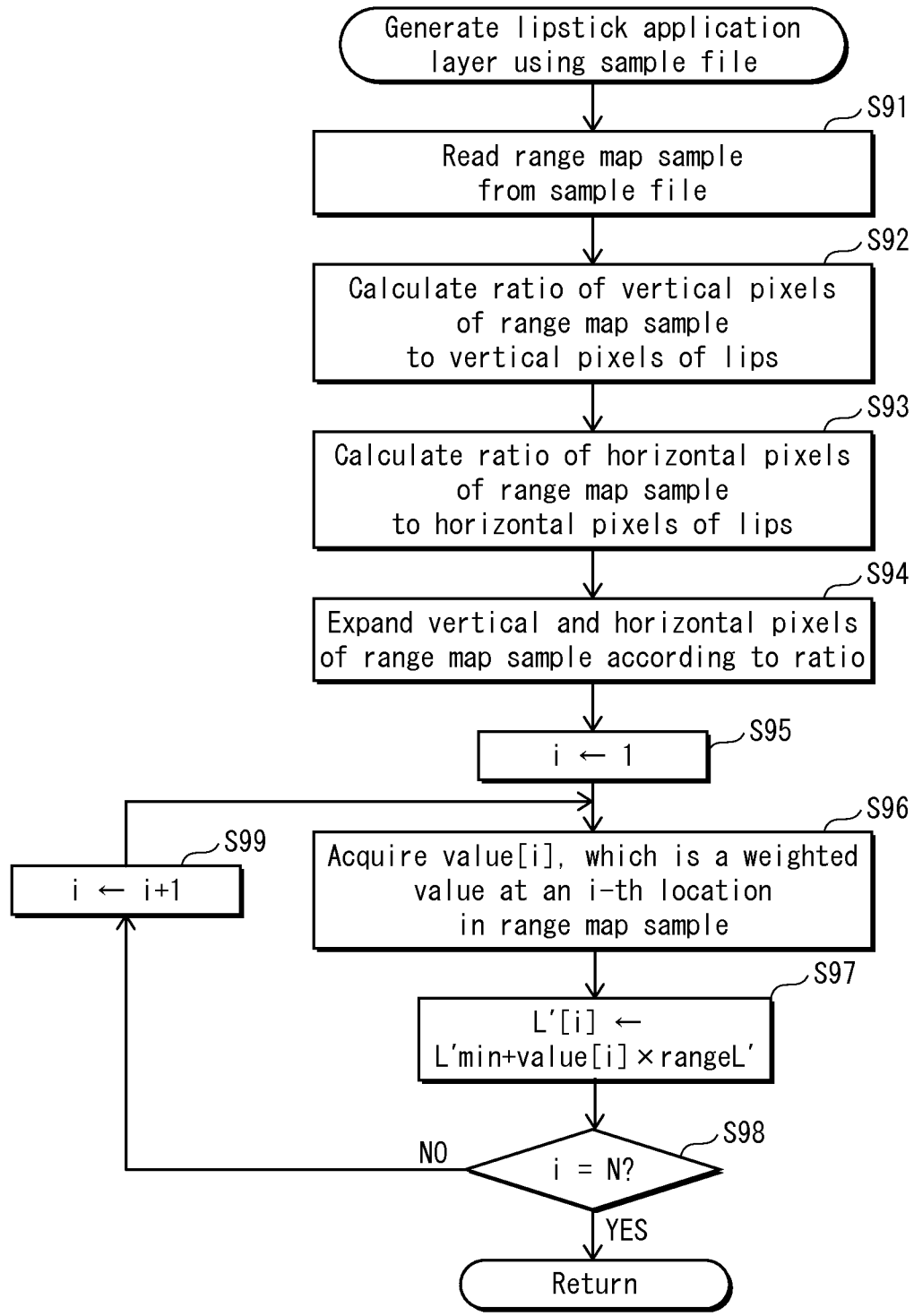
FIG. 25 is a flowchart illustrating a process of generation of the lipstick application layer using the sample file.

FIG. 25 is a flowchart showing a process of generation of a face image after make-up application by using a sample file. In step S91, a range map sample is read from a sample file corresponding to a selected cosmetic item (step S91), a ratio of vertical pixels of the range map sample to vertical pixels of the lips is calculated (step S92), a ratio of horizontal pixels of the range map sample to horizontal pixels of the lips is calculated (step S93), the vertical pixels and horizontal pixels of the range map sample are expanded according to the ratios calculated (step S94), and processing moves to a loop from step S95 to step S99. In the loop, a variable i is initialized as 1 (step S95), a value[i] is acquired, which is a weighted value at an i-th location in the range map sample (step S96), an operation is performed in which value[i] is multiplied by rangeL' and L'min is added (step S97), and whether or not i has reached a maximum number N is determined (step S98). When the variable i has not reached the maximum number, i is incremented (step S99) and processing returns to step S96.

According to the present embodiment as described above, patterns of planar distribution of how pixel values are distributed in a plane are sampled and stored on the storage medium in sample files, and the image processing device reads a sample file according to aspects of desired make-up and thereby a variety of make-up can be enjoyed.

Embodiment 4

The present embodiment is an embodiment of changing the weighted value assigned to each pixel according to the outline of the lips.

Figure 26A:
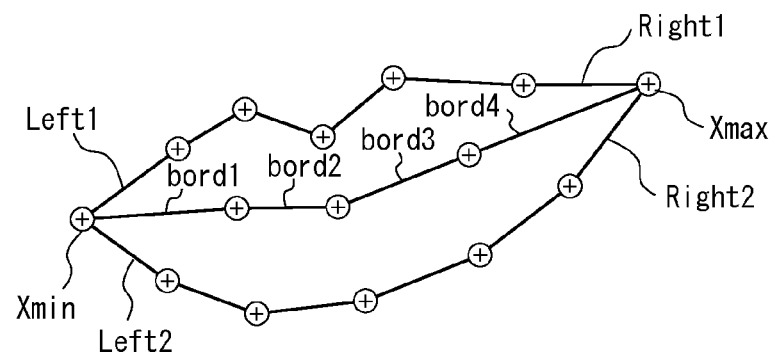
FIG. 26A illustrates an outline of lips, composed of anchor points and interpolation lines.

When compared to embodiment 1, how the weighted values are assigned is different. The difference in how the weighted values are assigned is that while in embodiment 1 the relative value of the pixel bit values of each pixel from aveLip is the weighted value to multiply aveLip by, in the present embodiment, among pixels making up the lips, pixels present in the corner portions of the mouth are assigned low weighted values. The corner portions of the mouth are a joining portion of the upper and lower lips and both sides of the lips. The outline of the lips is composed of anchor points and interpolation lines. FIG. 26A illustrates the outline of the lip region composed of the anchor points and the interpolation lines.

In FIG. 26A, a left-side portion of the corner of the mouth has a lowest X coordinate and a leftmost anchor point Xmin. An interpolation line extending right and up from this anchor point is specified as left1, and an interpolation line extending right and down from this anchor point is specified as left2.

A right-side portion of the corner of the mouth has a highest X coordinate and a rightmost anchor point Xmax. An interpolation line extending left and up from this anchor point is specified as right1, and an interpolation line extending left and down from this anchor point is specified as right2.

A boundary between the upper and lower lips is specified by bord1, bord2, bord3, and bord4, which are interpolation lines in series from Xmin to Xmax.

Figure 26B:
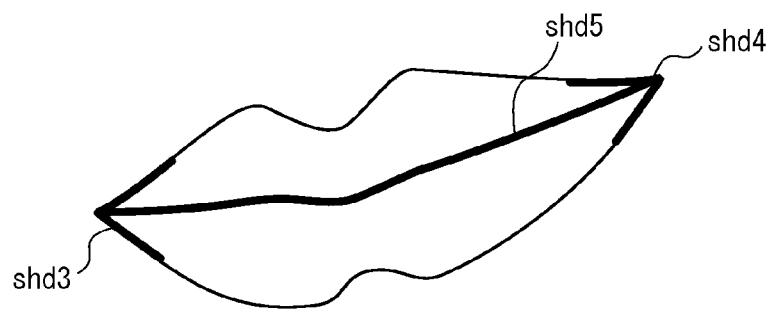
FIG. 26B illustrates shadows of the lips generated by assigning a low weighted factor to pixels present along the interpolation lines.

When multiple interpolation lines forming the left and right sides and boundary between the upper and lower lips are specified, the weighted value of pixels present along the interpolation lines is low. In this way it is possible to appropriately express a silhouette of both sides of the lips and the boundary between the upper and lower lips. FIG. 26B illustrates shadows of the lips generated by assigning a low weighted factor to pixels present along the interpolation lines.

In the present embodiment, pixel bit values along the interpolation lines between anchors are low, and therefore a shape of shadows along the corners of the mouth can be changed according to a shape of the lips.

Figure 26C:
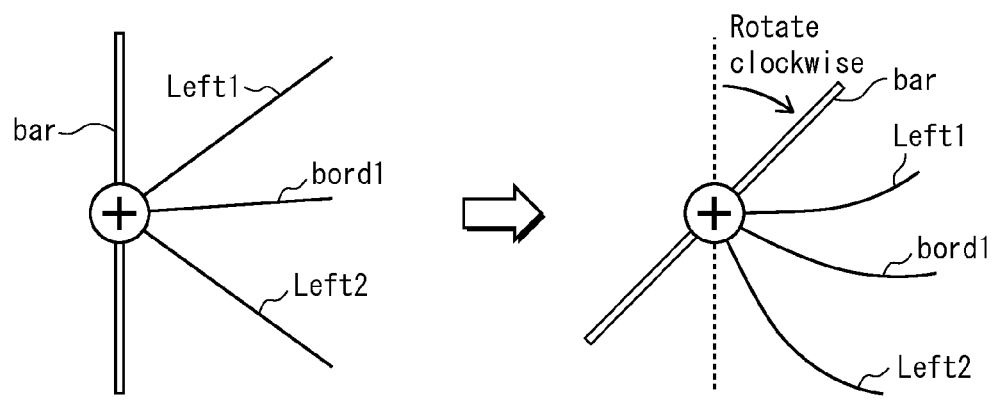
FIG. 26C illustrates a process of changing curvature of the interpolation lines.

FIG. 26C illustrates a process of changing curvature of the interpolation lines. bar in FIG. 26C is an operation bar extended out from the anchor, and can be rotated anticlockwise using the anchor as an axis. A left side of FIG. 26C illustrates a state prior to rotation, and a right side of FIG. 26C illustrates a state after rotation. By causing the bar to rotate clockwise or anticlockwise around the anchor, the interpolation lines are changed to Bezier curves, and by changing curvature of the Bezier curves, shapes of shadows can also be changed.

Figure 27:
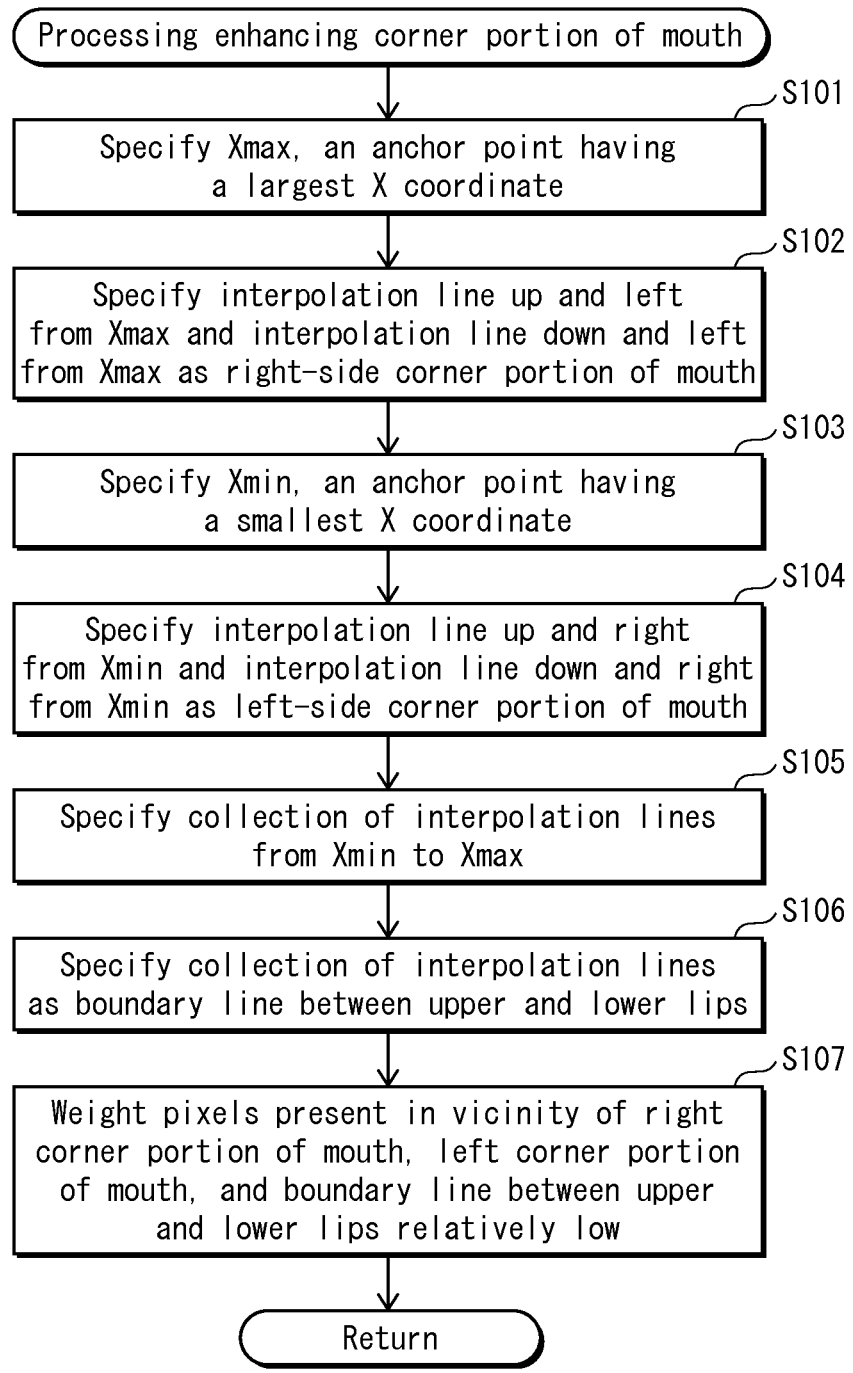
FIG. 27 is a flowchart illustrating a process of enhancing a corner portion of a mouth.

FIG. 27 is a flowchart showing a process of processing enhancing the corner portion of the mouth. An anchor point having a largest X coordinate, Xmax, is specified (step S101), and an interpolation line extending left and up from Xmax and an interpolation line extending left and down from Xmax are specified as a right-side corner portion of the mouth (step S102). Next, an anchor point having a smallest X coordinate, Xmin, is specified (step S103), and an interpolation line extending right and up from Xmin and an interpolation line extending right and down from Xmin are specified as a left-side corner portion of the mouth (step S104). Next a collection of interpolation lines from Xmin to Xmax are specified (step S105), and the collection of interpolation lines so specified are specified as a boundary line between the upper and lower lips (step S106). Pixels present near the right-side corner portion of the mouth, the left-side corner portion of the mouth, and the boundary between the upper and lower lips are weighted relatively low (step S107).

According to the embodiment described above, when extracting feature points defining the outline of the lips, the left-side and right-side of the lips and the boundary between the upper and lower lips are detected from the interpolation lines between the anchors that are used to define the outline of the lips. Further, pixels of the lip region that are located near such locations are assigned low weights, and therefore the lip outline is accentuated and appearance of make-up is improved.

Embodiment 5

The present embodiment is related to an improvement implementing a make-up operation having a moving image as a subject.

The present embodiment and embodiment 1 have a different subject for pixel value conversion. While pixel value conversion in embodiment 1 uses one still image as a subject, pixel value conversion in the present embodiment uses a plurality of frame images constituting a moving image as subjects.

Second, make-up application methods are different. Make-up application in embodiment 1 is a process of changing the color of the lips specified by using feature points, using a lipstick item selected by a user. In contrast, make-up application in the present embodiment is a process of changing a color of a region of any part of a face by performance of hand-painting by a user, using a cosmetic item.

Figure 28:
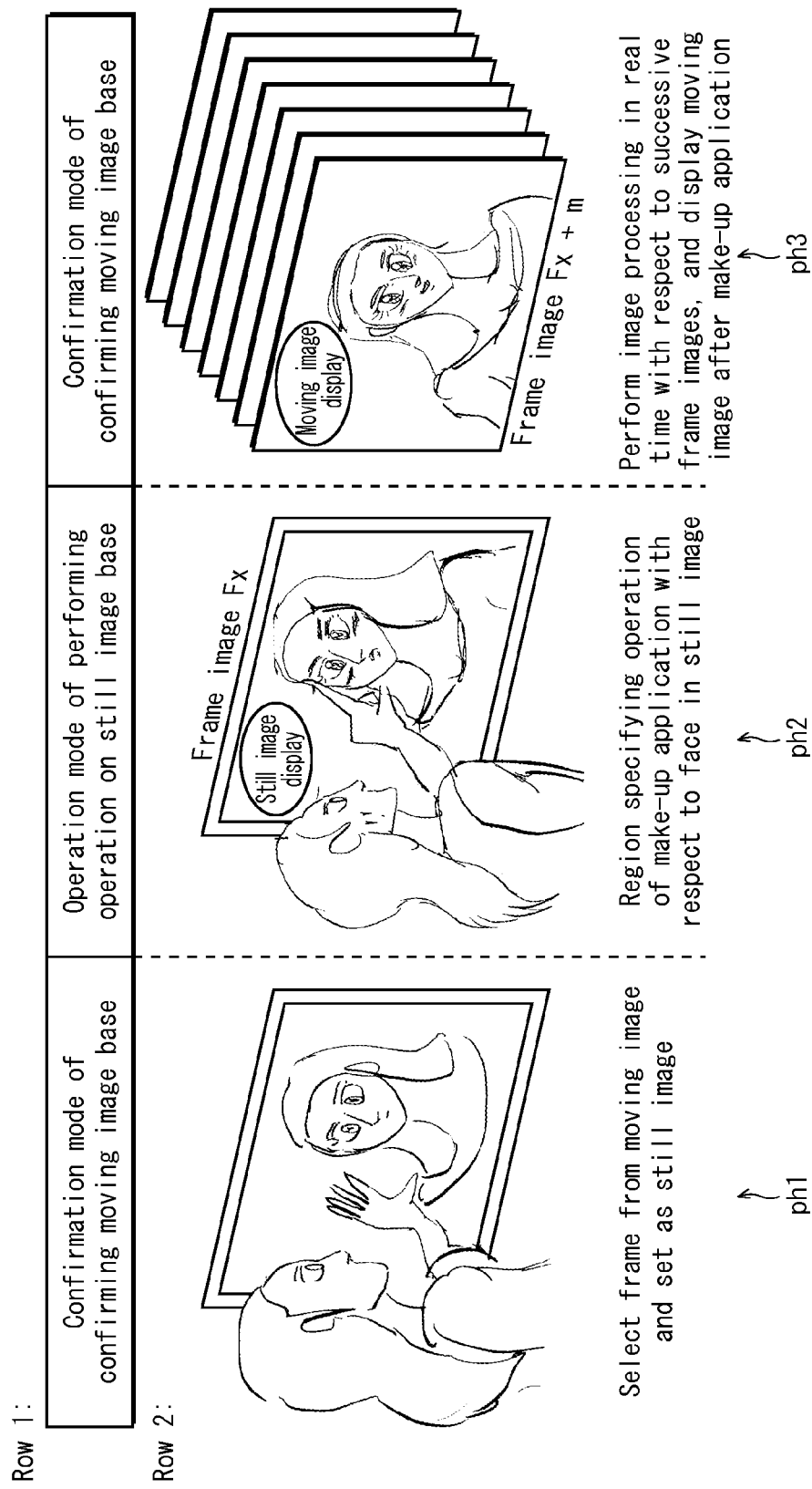
FIG. 28 illustrates three phases according to mode switching.

Third, a subject of pixel value conversion is different. Pixel value conversion in embodiment 1 uses a lip region specified via feature points as a subject. In contrast, pixel value conversion in the present embodiment uses a range received via a hand-painting operation as a subject. In the present embodiment, frame images composing a moving image are processing subjects, and therefore an operation mode and a confirmation mode are provided. The operation mode is for a make-up operation, and fixes one frame image out of the frame images as a still image, and the confirmation mode is for confirmation after make-up application and after each frame image is reproduced as a moving image. FIG. 28 illustrates three phases according to mode switching.

The left-side phase, ph1, is a phase of selecting a frame image to be a base for further operation, while viewing individual frame images of an inputted moving image. In this phase, as illustrated in row 1, the confirmation mode is active, and individual frame images composing the moving image are displayed in order on the touch panel. By touching the screen, one frame image is captured, determining the still image to be the subject of a make-up application operation.

The middle phase, ph2, is a phase of receiving a make-up application operation on the still image obtained by capture of a frame image as a base. Row 1 of ph2 illustrates that the operation mode is set. Row 2 illustrates a make-up application operation. A frame image Fx in row 2 is a frame image to be used as the still image, as the subject for the operation mode. In this state, the frame image Fx is displayed on the display, and the screen of the display is traced by a finger. According to finger-tracing operations, a hand-painted eyebrow image, a hand-painted blusher image, and a hand-painted lipstick image are composited with the still image.

The right-side phase, ph3, illustrates switching back to the confirmation mode after executing hand-painting operations in the operation mode. Here, a frame image Fx+m is any one of the frame images from the moving image displayed in the confirmation mode. In this phase, out of successive frames, the hand-painted eyebrow image, the hand-painted blusher image, and the hand-painted lipstick image are mapped to the corresponding regions of the eyebrows, cheeks, and lips.

In the present embodiment, when a cosmetic item is hand-painted, with respect to a representative color of the cosmetic item and a region where the hand-painting is performed, Lmin, Lmax, and aveLip are calculated and aveStick is calculated based on the cosmetic item selected by the hand-painting. Next, a ratio β is sought from aveLip and aveStick, and a color range of the cosmetic item applied by the hand-painting is mapped to pixel bit values at a region of the hand-painting.

Mapping of pertinent hand-painted images is performed with respect to successive frame images, and therefore the user can visually confirm the make-up application by viewing their own figure in motion.

The mapping of the hand-painted image is achieved by extracting feature points defining an outline of each region from each frame, and a feature point group present in the frame images is calculated via a conversion matrix for converting the feature points for each frame image.

From the frame image Fx and the frame image Fx+m, a feature point group is calculated composed of a plurality of feature points. Such feature points determine an outline of a region of a subject. The image processing device performs linking between feature points by performing a corresponding point search between the frame image Fx and the frame image Fx+m. The corresponding point search between frame images involves calculating relative values based on luminance values, etc., with respect to each pixel, and detecting a pixel having a highest relative value. When performing a make-up application operation by hand-painting with-respect to any region of the still image, a region in a successive frame that is linked to the region pertaining to the operation by the corresponding point search is mapped to the hand-painted image pertaining to the operation.

Figure 29A:
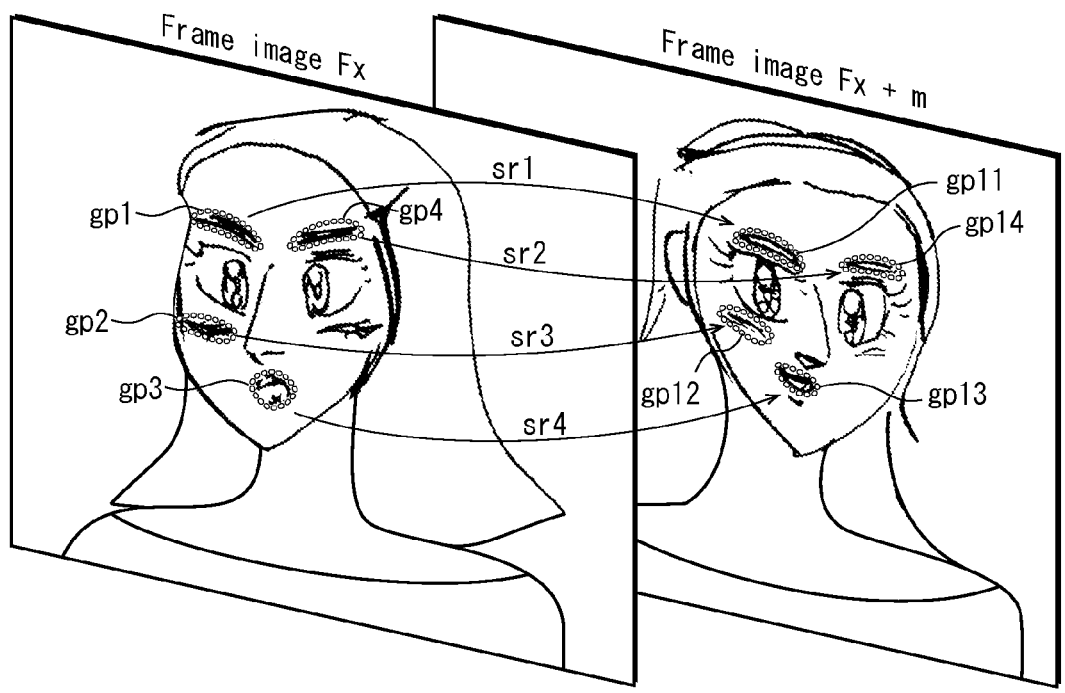
FIG. 29A illustrates a feature point group detected in a frame image Fx and a frame image Fx+m.

FIG. 29A illustrates a feature point group detected in the frame image Fx and the frame image Fx+m.

Feature point groups gp1, gp2, gp3, and gp4 in FIG. 29A surround representative regions (eyebrows, lips, cheeks) of a face image in frame image Fx, and define an outline of the regions. Feature point groups gp11, gp12, gp13, and gp14 in the illustration surround representative regions of a face image in frame image Fx+m, and define and outline of the regions. Arrows sr1, sr2, sr3, and sr4 schematically indicate a process of the corresponding point search between the feature points in the frame image Fx and the feature points in the frame image Fx+m. According to the corresponding point search, a relationship is defined between the feature point group defining an eyebrow in the frame image Fx and the feature point group defining the eyebrow in the frame image Fx+m.

Figure 29B:
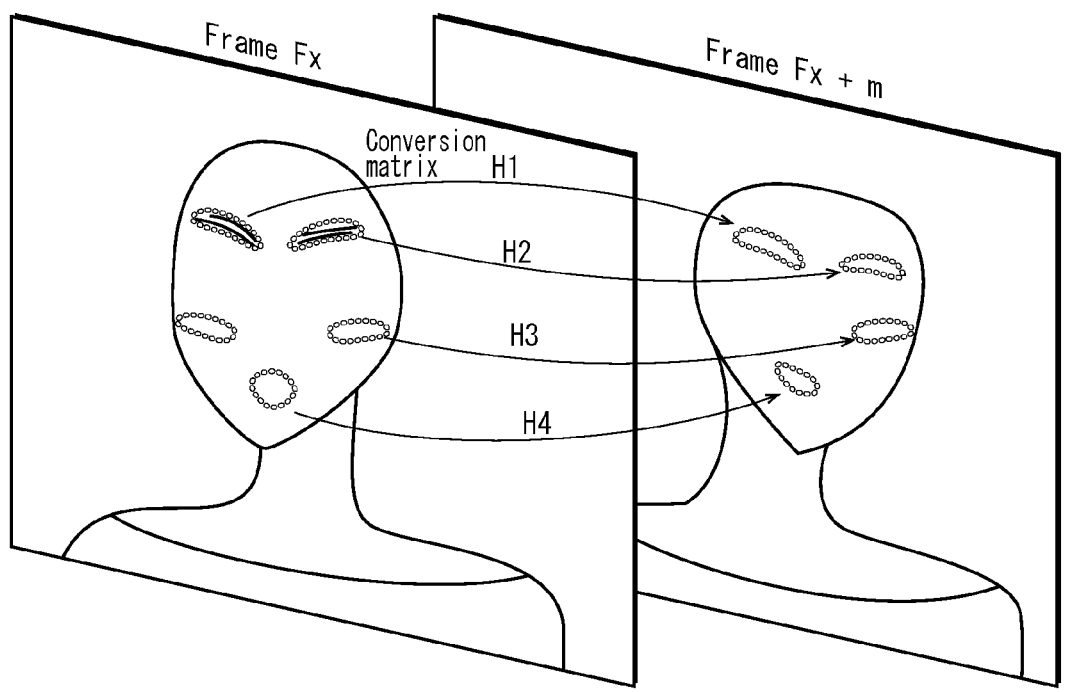
FIG. 29B illustrates conversion matrices defining conversion of feature points between the frame image Fx and the frame image Fx+m.

FIG. 29B illustrates conversion matrices defining conversion of feature points between the frame image Fx and the frame image Fx+m. H1, H2, H3, and H4 in FIG. 29B illustrate conversion matrices defining conversion of feature points between corresponding regions. Using such conversion matrices, a hand-painted image obtained by a hand-painting operation with respect to the frame image Fx is mapped to the frame image Fx+m. In this way, the hand-painted image is converted and displayed according to how feature points indicated by the frame image Fx+m take shape.

FIG. 30A illustrates feature points in the frame image Fx and the frame image Fx+m.

Feature points i1, i2, i3, i4, . . . , i8 in a top-left side of FIG. 30A characterize a shape of eyebrows in a face image of the frame Fx. Feature points j1, j2, j3, j4, . . . , j8 in a top-right side of FIG. 30A characterize a shape of eyebrows in a face image of the frame Fx+m. FIG. 30B illustrates an example of a conversion matrix. A conversion matrix H in FIG. 30B is a matrix converting the feature points i1, i2, i3, i4, . . . , i8 in the frame image Fx to the feature points j1, j2, j3, j4, . . . , j8, and consists of 8×8 matrix components.

When a still image to be the base is decided, as well as extracting feature points of each region of a face from the still image, each time a successive frame becomes an image for processing, feature points of the new image for processing are extracted. Then, a conversion matrix is calculated that defines a relationship between the feature points of the still image and the feature points of the frame image that becomes the new image for processing, and the hand-painted image is mapped to each frame image according to the conversion matrix. In this way, make-up is applied with respect to successive frame images.

FIG. 30C illustrates a state in which a hand-painted image is being drawn with respect to the still image. In the illustration, trk1 is a track traced by a finger on a face drawn on the touch panel. The track is specified as a hand-painted image. A central arrow cv1 schematically indicates conversion of the hand-painted image using the conversion matrix illustrated in FIG. 30B. In the illustration a hand-painted image trk2 illustrates a hand-painted image converted using a pertinent conversion matrix and composited with the face image of the frame Fx+m. As above, by performing conversion using a conversion matrix, a hand-painted image obtained by tracing with a finger a face image in a still image is mapped to a frame image of a frame Fx+m.

Figure 31:
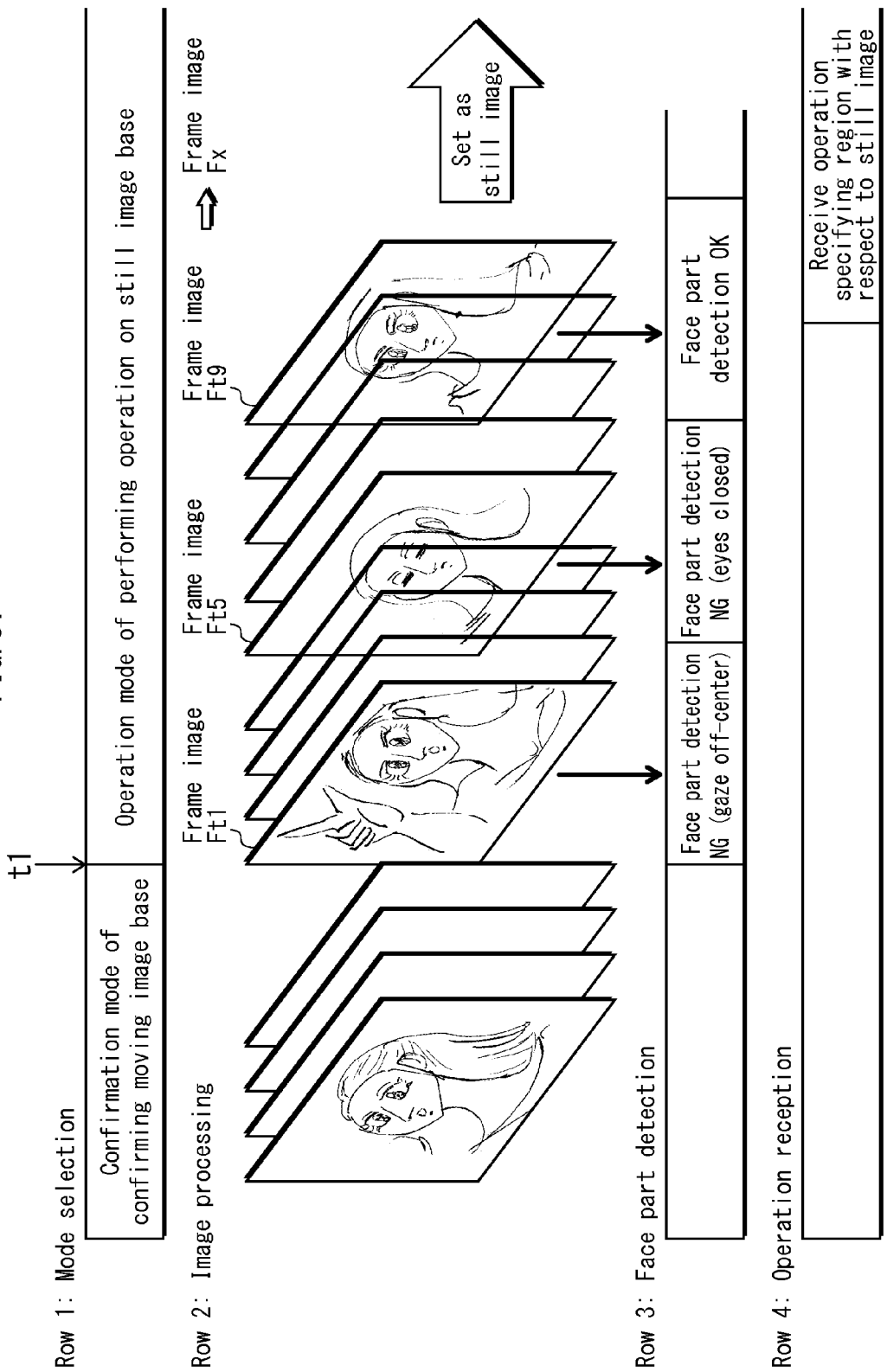
FIG. 31 illustrates a case in which the mode is switched from a confirmation mode to an operation mode until a still image that is a base of the confirmation mode is determined.

FIG. 31 illustrates a case in which the mode is switched from the confirmation mode to the operation mode until a still image that is a base of the confirmation mode is determined. Row 1 shows mode transitions, row 2 shows frame images inputted in real time from the camera 102, row 3 shows detection of face parts according to extraction of feature points, and row 4 shows an operation enabling reception with respect to the screen. A point in time t1 indicates a point in time at which the mode is switched from the confirmation mode to the operation mode.

A frame image Ft1 is a frame image captured at t1. The frame image captures a moment of a user operating the GUI, and therefore the user's gaze is off-centre, and the user's face is not facing forward. When a direction of the user's gaze is off-centre in feature point detection, a result of face part detection is "not good" (NG) in row 4.

A frame image Ft5 is a frame image captured at a moment when the user closes their eyes. When the user's eyes are found to be closed by the feature point detection, a result of face part detection is NG in row 3.

A frame image Ft9 is a frame image captured when the user is facing the camera. When the extraction of feature points finds that user is facing forwards and the user's eyes are open, a result of the fact part detection is OK, and the frame image Ft7 becomes a base for the operation mode, able to receive a hand-painting operation by the user.

Figure 32:
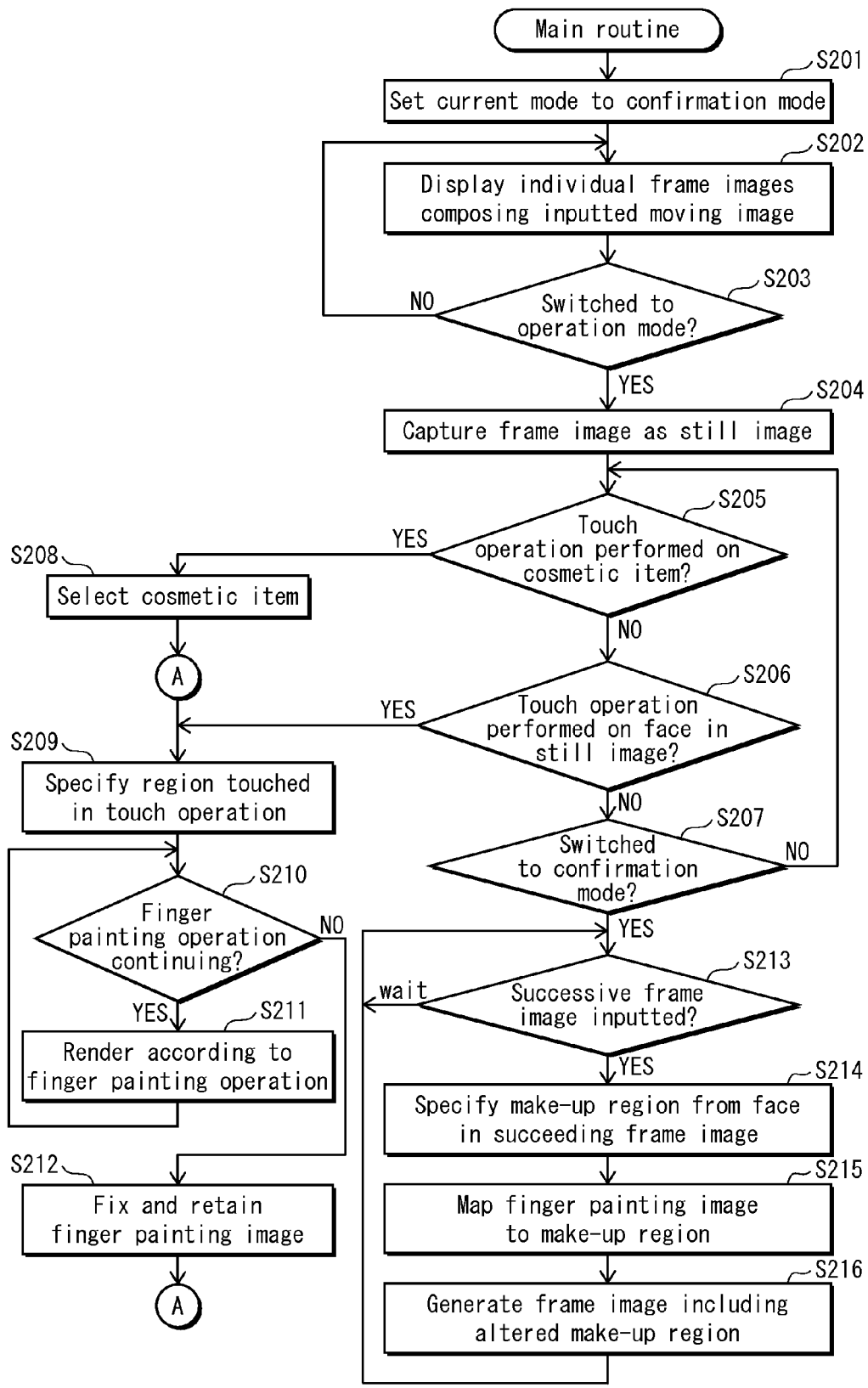
FIG. 32 is a flowchart showing a process of make-up application with respect to a moving image.

FIG. 32 is a flowchart showing a process of make-up application with respect to a moving image. A current mode is set to the confirmation mode (step S201), and processing transitions to a loop from step S202 to step S203. The loop displays individual frame images making up an inputted moving image (S202) and determines whether switching to the operation mode occurs (step S203). When mode switching occurs, a frame image is captured as the still image (step S204), and processing transitions to a loop composed of step S205 to step S207. The loop determines whether a touch operation occurs with respect to the cosmetic item (step S205), whether a touch operation occurs with respect to a face in the still image (step S206), and whether switching to the confirmation mode occurs (step S207). When step S205 returns a "Yes" result, a cosmetic item touched in step S208 is selected. When a touch operation occurs with respect to the face image, the touched region is specified (step S209), and whether or not a finger painting operation continues is determined (step S210). When the finger painting operation is continuing, drawing of the hand-painted image according to the finger painting operation continues (step S211). When the finger painting operation ends, the hand-painted image drawn by the operations is fixed and retained (step S212).

When the operation mode is switched to the confirmation mode, step S207 returns a "Yes" result, and processing transitions to step S213. Step S213 is waiting for input of a successive frame image (step S213). When inputted, feature points of a face are extracted from the succeeding frame image, and a mapping region is specified in the frame image according to the features points (step S214). Subsequently, the hand-painted image is mapped to the mapping region of the frame image (step S215). Finally, the frame image to which the hand-painted image is mapped is reproduced (step S216), and processing returns to step S213.

According to the present embodiment, a still image is selected as a base for make-up application from frame images composing a moving image, make-up application can be performed by hand-painting of a coating material with respect to the still image, and a hand-painted image obtained by the hand-painting is composited with successive frame images. A user can view their own moving image after make-up application, and therefore may feel prone to purchasing a make-up coating material in connection to sales promotion of a cosmetic item.

Embodiment 6

The present embodiment discloses an improvement using a single instruction multi data (SIMD) processor to calculate values of the range map and L'[i].

The SIMD processor includes n processing elements, and an n input n output selector. Each processing element includes an arithmetic operation unit and a register file.

The arithmetic operation unit is provided with a barrel shifter, a register, and a product-sum operator composed of a multiplier and an adder. Digital signal processing such as smoothing is performed at high speed due to the product-sum operator.

The n input n output selector simultaneously performs n inputs and n outputs. Each input and output of the n input n output selector is an input source of a register file in any one of the processing elements or an output destination of an arithmetic operation unit in any one of the processing elements, and therefore each input or output is defined as a single instruction. Each of the arithmetic operation units executes an operation as an operand of an element stored in a register file. Because each of the n processing elements includes an arithmetic operation unit, n operations can be executed in parallel.

Each register file in a processing element includes multiple registers. Because each register file is present in each of the n processing elements, when n is sixteen, in the image processing device a matrix composed of 16 by 16 elements is held in 16 by 16 registers.

the n input n output selector supplies pixel bit values of n pixels in a horizontal direction to the arithmetic operation unit or register file of any one of the n processing elements.

The operation according to the function min( ) in step S34 in FIG. 14A is an operation implemented by the SIMD processor selecting any two pixels in a lip image, comparing the L components of the two pixels, and storing the smaller value of the two as Lmin. Specifically, the selector supplies the L components of two pixels in input/output in the horizontal direction of a processing element to the arithmetic operation unit of one processing element, the arithmetic operation unit compares the L components, returning the smaller L component as Lmin to a register, and the same processing is repeated for the stored Lmin and the L component of another pixel.

The operation according to the function max( ) in step S34 in FIG. 14A is an operation implemented by the SIMD processor selecting any two pixels in a lip image, comparing the L components of the two pixels, and storing the larger value of the two as Lmax. Specifically, the selector supplies the L components of two pixels in input/output in the horizontal direction of a processing element to the arithmetic operation unit of one processing element, the arithmetic operation unit compares the L components, returning the larger L component as Lmax to a register, and the same processing is repeated for the stored Lmax and the L component of another pixel.

Because the n input n output selector supplies the L components of n pixels in the horizontal direction to one processing element, the L components of n pixels in the horizontal direction are supplied to the arithmetic operation unit of the one processing element and the arithmetic operation unit executes an arithmetic operation with respect to the L component of each pixel supplied. Thus, the SUM operation shown in step S35 of FIG. 14A is performed quickly. By dividing the sum by the number of pixels, calculation of aveLip, which is an average value of the lip region, can be performed quickly.

Calculation of L'[i], illustrated in the flowchart of FIG. 15B, is performed as follows. n processing elements included in the SIMD processor read pixel bit values of n pixels in the horizontal direction in the range map in parallel, and supply each value to the arithmetic units of the n processing elements. The arithmetic operation unit of each processing element performs multiplication and addition processing of multiplying the difference between L[i], which is a value of an i-th pixel of the original face image, and aveLip by β, and adding aveStick, and writing an operation result to memory as a pixel of a face image in which make-up is applied. In this way, the face image in which make-up is applied is obtained.

Calculation of rmap[i] shown in FIG. 14B involves reading in parallel the L components of n pixels in the horizontal direction in the original face image stored in the memory, and storing the L components in the register file of each processing element. The arithmetic element of a processing element subtracts Lmin from L[i], multiplies the subtraction result by 1 (Lmax−Lmin) and writes the multiplication result to the memory as a value of a pixel of the range map. In this way the range map is obtained.

Calculation of L'[i] using rmap[i] is performed as follows. n processing elements included in the SIMD processor read n rmap values in the horizontal direction in the range map in parallel, and supply each value to the arithmetic units of the n processing elements.

The arithmetic operation unit of each processing element performs multiplication and addition processing of multiplying rmap[i], which is an i-th value of the range map, by rangeL', and adding Lmin, and writing an operation result to memory as a pixel bit value of a face image in which make-up is applied. In this way, the face image in which make-up is applied is obtained.

<Notes>

The above is a description of the best embodiments contemplated by the applicant at the time of application. However, for the technical topics indicated below, it is possible to implement further improvements and modifications. Whether to implement each embodiment as illustrated, or with the following improvements and modifications, is up to the subjectivity of the person implementing the embodiment.

(Variation in Make-Up Coating Material)

The make-up coating material is not limited to virtualized cosmetics. The make-up coating material may be any of colored contacts, earrings, ear and nose piercings. The subject included in the region for make-up application is a person's face, but may be a hand. The make-up coating material may be a manicure. Further, the subject for make-up application may be a pet instead of a person. Furthermore, make-up according to the image processing device may be dressing-up of a vehicle.

(Color Variation Creation)

The make-up simulator may be provided with a function of creating color variations from a lipstick item. Such color variation involves, after selection of a lipstick tool, selection of a color sample, and replacing the H component and/or C component of application color of the lip item with the H component and/or C component of the color sample.

(Scope of Processing Subject)

The example internal components, flowcharts, and operations of the devices disclosed in each embodiment use "lips of a face of a person" as a subordinate concept of the term "region of a portion of a subject". In the same way, the example internal components, flowcharts, and operations of the devices disclosed in each embodiment use "lipstick" as a subordinate concept of the term "make-up coating material". However, other subordinate concepts included in the above terms may be processing subjects. The processing subjects being any of multiple subordinate concepts is no more than a difference in content of data material, and incurs no alterations in structure or processing of the device.

(Conversion by the Color Space Conversion Unit 2 and the Color Space Reversion Unit 7)

The color space conversion unit 2 and the color space reversion unit 7 are described as converting between RGB and HCL color spaces, but instead of the HCL color space, a color space having other hue, saturation, and luminance channels may be used, such as HSV, HSL, etc.

(Scope of Range Map)

The range map may use L[i]/Lave, a ratio of a current pixel value and an average value.

Embodiment 5 Variation

In the second embodiment, one frame image out of frame images composing a moving image is selected, and make-up application is performed thereto by hand-painting. However, make-up application may be implemented by automatically extracting from each frame image a region selected by the user in the initial screen, and repainting the region in each frame image with a cosmetic item.

(Implementation of the Operations Described in Math 1 to Math 5)

The functions in Math 1 to Math 5, rather than being mathematical concepts, are numerical operations executed on a computer, and therefore modifications required for execution by a computer may of course be made. For example, saturation arithmetic and positive value arithmetic may of course be implemented for handling numeric values as integers, fixed decimal point values and floating point values. Further, among operations based on equations shown in each embodiment, multiplication of constants may be implemented by a ROM multiplier using constant ROM. In constant ROM, a value of the product of a multiplicand and a constant are pre-calculated and stored. For example, when a multiplicand is 16 bits long the multiplicand is divided every four bits, and a product of a four bit portion and a constant, i.e. a multiple of a constant 0-15, is stored in the constant ROM. A product of the above-described divided up 4-bit and a 16-bit constant is 20 bits long, and because the above-described four constants are stored at the same address, a 20×4=80 bit length is the bit length of one word. As described above, implementation of a ROM multiplier is possible, and therefore operations mentioned in the description are not limited only to pure arithmetic operations, and may include reading an operation result stored in storage media such as ROM according to a value of an operator.

(Application to Network)

The tablet and the image processing device may be connected via a network. In such a case, the image processing device receives the self-portrait (original image data) from the camera of the display device via the network, and performs make-up processing. Thus, an image resulting from make-up application is outputted to an external device and displayed.

(Multiple User Support)

The image processing device may implement image processing for make-up application with respect to portraits of multiple users obtained by image capture. In such a case, because processing must be performed for multiple users, the image processing device is preferably caused to operate by a cloud network server (cloud server) that can process face images of an indeterminate number of users as "big data". When a command to begin make-up application is received in the cloud network, a hypervisor boots a guest operating system (guest OS) in the cloud server. After booting the guest OS, an application program is loaded to the cloud server that causes the processing of the elements of the image processing device by an intra network inside a company. According to the loading of the application program, processing as described in the embodiments is executed with respect to big data.

Embodiment of Program Code

Each device described above is part of a computer system composed of a microprocessor, ROM, RAM, hard-disk unit, display unit, keyboard, mouse, etc. A computer program is stored on the RAM or hard-disk unit. The microprocessor operates according to the computer program, and each device achieves functions thereof. Here, the computer program, in order to achieve predefined functions, is composed of a plurality of instruction codes that indicate commands to the computer.

Embodiment of Integrated Circuit

All or part of the elements composing each of the above devices may be composed of a single system large scale integration (LSI). The system LSI is an ultra-multifunctional LSI manufactured by integrating multiple elements on one chip, and specifically a computer system including a microprocessor, ROM, RAM, etc. A computer program is stored on the RAM. The microprocessor operates according to the computer program, and the system LSI achieves functions thereof. Architecture of the integrated circuit is composed of: (1) a front-end processing circuit executing general stream processing composed of a preprogrammed DMA mask circuit, etc.; (2) a signal processing circuit executing general signal processing composed of a SIMD processor, etc.; (3) a back-end circuit executing general AV output processing such as image processing, image superimposition, resizing, and image format conversion; (4) a media interface circuit interfacing with a drive and a network; and (5) a memory controller circuit, which is a slave circuit for accessing memory, implementing reading and writing of packets and data according to requests from the front-end, signal processing, and back-end circuits. Here, particular package types of system LSI are a quad flat package (QFP) and pin grid array (PGA). QFP is a system LSI package having pins extending from each of four sides. PGA is a system LSI package in which a large number of pins extend from an underside of the package.

(Implementation as a Single Module)

All or part of the elements composing each of the above devices may be composed of a removable IC card or an individual module. The IC card or the module is a computer system composed of a microprocessor, ROM, RAM, etc. The IC card or the module may include the above-mentioned ultra-functional LSI. The microprocessor operates according to the computer program, and the IC card or the module achieves functions thereof. The IC card or the module may be rendered tamper resistant.

(Implementation as a Program)

An aspect of the present invention may be the method described above. Further, the method may be a computer program implemented by a computer, or may be a digital signal composed of the computer program. Further, an aspect of the present invention may be the computer program or the digital signal stored on a computer readable storage medium, such as, for example, a flexible disk, hard disk, CD-ROM, MO, DVD, DVD-ROM, DVD-RAM, Blu-Ray Disc (BD) (registered trademark), semi-conductor memory, etc. Further, the aspect of the present invention may be the digital signal recorded on the storage medium.

Further, an aspect of the present invention may be the computer program or the digital signal transmitted via telecommunication lines, wired or wireless communication, a network such as the internet, a data broadcast, etc.

Further, when an aspect of the present invention is the computer system including a microprocessor and memory, and the memory stores the above-described computer program, the microprocessor may operate according to the computer program, and may be implemented as another independent computer system by transferring the program or the digital signal to the storage medium, or by transferring the program or the digital signal via the network, etc.

Processing illustrated in FIGS. 12-16 and processing illustrated in FIGS. 17-23, as program code executed by a computer, can be created in the following way. First, a software developer uses programming language to describe a source program implementing each flowchart and functional element. In such language, the software developer, in accordance with programming language syntax, and using class structures, variables, array variables, and calls to external functions, implements a software program implementing each flowchart and functional element.

Such a source program is provided with a compiler as a file. The compiler generates an object program by translating the source program.

Translation by the compiler consists of processes such as syntax analysis, optimization, resource allocation, and code generation. In syntax analysis, lexical analysis, parsing, and semantic analysis of the source program is performed, and the source program is transformed to an intermediate program. In optimization, tasks are performed with respect to the intermediate program, such as transformation to fundamental blocks, control flow analysis, and data flow analysis. In resource allocation, in order to comply with an instruction set of the target processor, functions in the intermediate program are allocated to registers or memory that the target processor has. In code generation, each intermediate instruction in the intermediate program is transformed to program code, obtaining the object program.

Here, the generated object program is composed of one or more program codes, implemented by a computer, that perform individual processes of each step of the flowcharts and functional elements in each embodiment. Here, the program code is of various types of code such as native code of a processor and JAVA (registered trademark) byte code. Implementation of each step by program code has various aspects. When using an external function to implement each step, a call calling the external function is the program code. Further, program code that implements a single step may be attributed to other object programs. In a RISC processor in which types of instruction are limited, each step of a flowchart may be implemented by combinations of arithmetic operation instructions, logical operation instructions, branch instructions, etc. When the object program is generated, the programmer activates a linker. The linker allocates memory space to object programs and related library programs, links said programs, and generates a load module. A load module generated in this way is readable by the computer, and causes the computer to execute processing illustrated in each flowchart and processing of functional elements. Such a computer program may be provided to the user stored on a non-transitory computer readable storage medium.

(Combination)

The above embodiments and modifications may be combined.

(Systematization of Technical Ideas)

Creation of technical ideas extracted from specific aspects of the image processing device illustrated in embodiment 1 to embodiment 6 forms a system composed of the following aspects 1, 2, 3, 4, . . . . In the system, 1 is a fundamental aspect that is the core of the system, and 2, 3, and onwards are derivative aspects thereof.

(1. Fundamental Aspect)

The image processing device that is the core of the system mentioned above comprises: a specification unit that specifies a part of the subject to which the make-up coating material is to be applied; a generation unit that generates a coating material application layer for the specified part, the coating material application layer being composed from a plurality of pixels having a color range represented by a sample color of the make-up coating material; and a compositing unit that composites the coating material application layer and the specified part of the source image.

The color range of the pixels of the coating material application layer is obtained by expanding a color range of a plurality of pixels composing the specified part according to a ratio of a value of the sample color to a representative value of the pixels composing the specified part, and the generation unit obtains values of the pixels of the coating material application layer by mapping values of pixels composing the source image to the color range of the coating material application layer.

Because the color range of the coating material application layer is obtained by expanding the color range of the original image and pixel bit values of the coating material application layer are obtained by mapping pixel bit values of the original image to the expanded color range, the pixel bit values of the pixels composing the coating material application layer cause contrast in line with the part of the subject in the source image to be emphasized in the coating material application layer. Because of the contrast emphasis, a state in which make-up coating material having optical properties is applied to the part of the subject and illuminated by ambient light can be realistically reproduced.

Here, the part to which the make-up coating material is applied can be a part of a surface of a building, organism, vehicle, still life, or person.

In a case in which the subject is a person, the make-up coating material may be lipstick, hairspray, a manicure, eye-shadow, a temporary tattoo, etc. In cases in which the subject is a building, vehicle, or still life, the make-up coating material may be paint, spray paint, fluorescent paint, etc. Mentioning such subordinate concepts in the embodiment makes description complicated, and is therefore undesirable. Thus, in the description in the embodiments, the subject is a person's lips, and the make-up coating material is lipstick.

(2. Subordinate Concept of Part to which the Coating Material is Applied)

Further, in the fundamental aspect described above, in order eliminate unnaturalness in connections between highlighted areas, shadowed areas, and other areas, the image may be as follows.

This is the selection of the representative color in embodiment 1 in general terms. Specifically, in the source image, the specified part includes highlighted pixels due to lighting by ambient light and shadowed pixels due to interruption of the ambient light, and the representative value of the pixels composing the specified part is calculated by performing statistical processing with respect to the highlighted pixels and the shadowed pixels.

In the background art disclosed in Patent Literature 1, overwriting highlighted and shadowed portions is stopped. In contrast, in the image processing device of the above aspect, highlighted and shadowed portions also have their pixel bit values overwritten by expansion of the color range, and therefore in the present invention, connections between highlighted and shadowed areas and other areas do not appear unnatural. Further, determining the representative color does not exclude highlights and shadows and involves statistical processing with respect to pixel groups including highlights and shadows, and therefore the coating material application layer brings about an even more natural contrast transformation. Here, the statistical processing broadly includes average calculation, weighted average calculation, variance calculation, deviation calculation, etc.

(3. Specifics of Mapping)

Mapping by the generation unit may be described more specifically. This is a generalization of a function using the range map in embodiment 1 (Math 5). Specifically, the image processing device further acquires a distribution map indicating how values of pixels are distributed in a plane coordinate system corresponding to the source image, and the mapping by the generation unit includes weighting the color range of the coating material application layer using the values of the pixels in the distribution map as weighted coefficients, and applying an offset to values obtained after the weighting.

The distribution map indicates distribution of pixels in the image after application of the make-up coating material, and determination of pixel bit values of the coating material application layer is governed by the distribution map. Thus, distribution of brightness in the coating material application layer is represented more realistically.

(4. Specifics of Weighted Value and Offset)

The weighted values and offset indicated by the distribution map may be described more specifically. The weighted values and offset are limited by rmap[i] x rangeL', L'min as indicated in embodiment 1.

Specifically, each of the values indicated in the distribution map is a normalized difference between values of pixels composing the specified part and a minimum value of colors of the pixels composing the specified part, the normalization being performed using the color range of the pixels composing the specified part, and the offset is a minimum value of a color range of a replacement color. Values of the distribution map are normalized differences between pixel bit values and the color range, and therefore by multiplying the normalized differences by a color range length, luminance distribution of the coating material application layer is closer to the real luminance distribution. In this way, a make-up simulation that can be Mistaken for the Real Thing Becomes Possible.

(5. Method of Acquiring Distribution Map)

How the distribution map is acquired may be described more specifically. This is by acquiring the range map as a sample file.

Specifically, a sample file is stored in a storage medium that the image processing device accesses, the sample file being a distribution sample of how values of pixels are distributed in a plane, and the generation unit acquires the distribution map by reading the sample file from the storage medium. Patterns of planar distribution of how pixel bit values are distributed in a plane are sampled and stored on the storage medium in sample files, and the image processing device reads a sample file according to aspects of desired make-up and thereby a variety of make-up can be enjoyed.

(6. Specifics of Operation Expressions) Transformation of pixel bit values may be described more specifically using bit operations. This is a generalization of Math 6 in embodiment 1. Specifically, the mapping by the generation unit includes multiplying relative values by a predefined coefficient and adding an offset, each relative value indicating what proportion of the color range of pixels composing the specified part is occupied by a corresponding one of the pixels of the source image. Processing of multiplication by the weighted coefficient and adding the offset can be implemented by hardware by, for example, a product-sum operation circuit using a shift register. By hardware implementation, processing with respect to multiple pixels can be parallelized and pipelined.

(7. Specifics of Relative Values, Weighted Coefficient, and Offset)

The relative values, weighted coefficient, and offset in aspect 6 may be described in more detail. As per the limitations of (L[i]−Lave), β, and L'ave in Math 6, each of the relative values is a normalized difference between a value of a pixel having a color representative of pixels composing the specified part and a value of a pixel in the specified part, the normalization being performed using a length of the color range of the pixels composing the specified part, the predefined coefficient is the length of the color range of the pixels composing the specified part, and the offset is a lower limit of the color range of color in the pixels composing the specified part. Each relative value indicates how much a pixel bit value of a subject pixel differs from the representative color of the original image. Thus, by mapping a relative value to the color range of the coating material application layer, and adding the lowest value of the color range of the coating material application layer, the specified part in the coating material application layer is reproduced with a realistic texture that does not lose lighting effects of lighting in the original image.

(8. Generalization of Lower and Upper Limit of Color Range)

Here, the lower and upper limits of the color range of the coating material application layer may be described as a subordinate concept. The subordinate concept is a limitation according to Lmin and Lmax in embodiment 1, and specifically: an upper limit of the color range of the coating material application layer is calculated by multiplying a length of the color range of the coating material application layer by a ratio and adding a value of a pixel of a sample color of the make-up coating material, in which the ratio is a ratio of (i) a difference between a representative value of the pixels composing the specified part and an upper limit of the color range of the pixels composing the specified part to (ii) a length of the color range of the pixels composing the specified part, and a lower limit of the color range of the coating material application layer is calculated by subtracting a length of the color range of the coating material application layer from the upper limit of the color range of the coating material application layer. The upper limit of the color range of the coating material application layer is determined by multiplying the length of the color range of the coating material application layer by the ratio of (i) the difference between the representative color of the original image and the upper limit of the original image to (ii) the length of the color range of the original image. Thus, the difference between the original image and the representative color is appropriately reflected in the color range of the coating material application layer. Further, the lower limit of the color range of the coating material application layer is determined by subtracting the length of the color range of the coating material application layer from the upper limit. Thus, darkening of dark portions is also reflected by the ratio of the representative color of the original image to the representative color of the coating material application layer. In this way, the face of a user that is image captured can be realistically reproduced in a state in which a make-up coating material is applied.

(9. Image Components that are Subject to Image Processing)

The color range may be further described as a subordinate concept. The subordinate concept is a generalization of the color range to separate definitions of HCL. Specifically, the color range of the pixels composing the specified part is a numerical range of a specific type of pixel components among a plurality of types included in the pixels composing the specified part, the source image includes a plurality of channel images, and the values of the pixels of the coating material application layer are obtained by mapping each value of a channel image composed of a specific type of pixel component to the color range of the coating material application layer. Among pixel components composing pixels, the color range is calculated for specific components, and therefore when transformation of a specific component is not desired, the specific component can be excluded from processing, thereby maintaining uniformity with the original image.

(10. Compositing Aspect)

A method of compositing by the compositing unit may be described as a subordinate concept. The subordinate concept is a generalization of the concept that compositing parameters are defined for each component of HCL. Specifically, the image processing device has a compositing parameter for each component type, and the compositing by the compositing unit includes weighting and summing the pixel component of the specific type among the channel images included in the coating material application layer and the pixel component of the specific type among the channel images included in the source image, in which the weighting is weighting using a compositing parameter corresponding to the specific type. Each weighting coefficient to be allocated to pixels of the original image and pixels of the coating material application layer is transformed per pixel component, and therefore, for example, a coating material application layer can be obtained in which chroma and luminance are enhanced out of hue, chroma, and luminance.

(11. Specifics of Pixel Components)

Types of pixel component may be described as a subordinate concept. The subordinate concept is that the types of pixel component are hue, chroma, and luminance, and the specific type of pixel component is one or a combination of two or more of hue, chroma, and luminance. Among the hue component, chroma component, and luminance component, the chroma component and the luminance component are subjects for color range generation, and for mapping and compositing, and therefore a make-up image is obtained having a natural aspect in which uniformity of the hue component is maintained.

(12. Additional Elements)

Optional elements may be added to the image processing device. Specifically, the image processing device may include a first conversion unit that converts a first, a second, and a third pixel component of each pixel composing the specified part to a hue component, a chroma component, and a luminance component, respectively; and a second conversion unit that converts the hue component, the chroma component, and the luminance component of pixels composing the specified part composited with the coating material application layer to the first, the second, and the third pixel component, respectively. An original face image composed of RGB pixel components and an original image composed of YCrCb pixel components may be subjects of make-up application, and therefore image input from various types of camera may be used as subjects of make-up application.

(13. Areas of Low Weighting)

Areas to be assigned a low weight may be specified further. A subordinate concept, is generalized as weighting of corners of the mouth. Specifically, the specified part to which the make-up coating material is to be applied is lips of the subject, the specification unit generates an outline defining the lips when specifying the specified part, and the generation unit, in determining the color range of the pixels of the coating material application layer, specifies a mouth corner defining a shape of a corner portion of the lips from the outline defining the lips, and assigns a low value to pixels in a vicinity of the mouth corner from among pixels composing the lips. The corners of the mouth and boundary between the upper and lower lips are set to a low weighting coefficient, shadowing said areas, and therefore the outline of the lips stands out and appearance is improved.

(14. Overcoming Barriers as an Image Processing Method)

When implemented as a method aspect of the invention, the method of the aspect of the invention is an image processing method of a computer system that performs image processing with respect to a source image including a subject and thereby obtains a make-up image showing the subject in a state in which make-up coating material is applied, the image processing method comprising: specifying a part of the subject to which the make-up coating material is to be applied; and generating a coating material application layer for the specified part, the coating material application layer being composed from a plurality of pixels having a color range represented by a sample color of the make-up coating material, wherein the coating material application layer is an image that is composited with the source image, the color range of the pixels of the coating material application layer is obtained by expanding a color range of a plurality of pixels composing the specified part according to a ratio of a value of the sample color to a representative value of the pixels composing the specified part, and values of the pixels of the coating material application layer are obtained by mapping values of pixels composing the source image to the color range of the coating material application layer. This method aspect may be subject to the above-described improvements 2 to 13. According to the image processing method, a user in a company or an end user may use the method in various locations, and therefore application of the method is widened within the technical scope of the present application.

The computer system broadly includes a computer system composed of a client computer and a server computer, a cloud network computer system that loads applications to a cloud server, a computer system in which computers are connected pair-to-pair, and a grid computer system that performs distributed processing. "Terminal device" broadly includes a laptop computer, notebook, smartphone, tablet terminal, and cash register terminal, operated by a pointing device such as a mouse, keypad, etc. Mentioning all such subordinate concepts in the embodiments makes description complicated, and is therefore undesirable. Thus, in embodiment 1, the tablet terminal is described as a terminal device.

(15. Overcoming Barriers as a Program)

When implemented as an aspect of the invention executing a program, the program of the aspect of the invention is a program executed by a computer that causes the computer to perform image processing with respect to a source image including a subject and thereby obtain a make-up image showing the subject in a state in which make-up coating material is applied, the program comprising program code causing the computer to: specify a part of the subject to which the make-up coating material is to be applied; and generate a coating material application layer for the specified part, the coating material application layer being composed from a plurality of pixels having a color range represented by a sample color of the make-up coating material, wherein the coating material application layer is an image that is composited with the source image, the color range of the pixels of the coating material application layer is obtained by expanding a color range of a plurality of pixels composing the specified part according to a ratio of a value of the sample color to a representative value of the pixels composing the specified part, and values of the pixels of the coating material application layer are obtained by mapping values of pixels composing the source image to the color range of the coating material application layer. This program aspect may be subject to the above-described improvements 2 to 13. The program may be distributed via a network provider server or any kind of storage medium, and therefore application of the present invention is widened to the industries of general computer software and online services.

INDUSTRIAL APPLICABILITY

The present invention is related to the field of image processing of face images, and therefore is particularly applicable as an image processing device for make-up simulation of applying lipstick to a face image using color information.

REFERENCE SIGNS LIST 11 lip region extraction unit
12 color space conversion unit
13 temporary memory
14 lip color range calculation unit
15 lipstick application layer generation unit
16 compositing processing unit
17 color space reversion unit

The invention claimed is:

1. An image processing device that performs image processing with respect to a source image including a subject and thereby obtains a make-up image showing the subject in a state in which make-up coating material is applied, the image processing device comprising:

a processor; and
a non-transitory, computer-readable medium storing executable instructions that, when executed by the processor, makes the image processing device function as:
a specification unit that specifies a part of the subject to which the make-up coating material is to be applied;
a generation unit that generates a coating material application layer for the specified part, the coating material application layer being composed from a plurality of pixels having a color range represented by a sample color of the make-up coating material; and a compositing unit that composites the coating material application layer and the specified part of the source image, obtaining the make-up image, wherein the color range of the pixels of the coating material application layer is obtained by expanding a color range of a plurality of pixels composing the specified part according to a ratio of a value of the sample color to a representative value of the pixels composing the specified part, and the generation unit obtains values of the pixels of the coating material application layer by mapping values of pixels composing the source image to the color range of the coating material application layer, wherein an upper limit of the color range of the coating material application layer is calculated by multiplying a length of the color range of the coating material application layer by a ratio and adding a value of a pixel of a sample color of the make-up coating material, in which the ratio is a ratio of (i) a difference between a representative value of the pixels composing the specified part and an upper limit of the color range of the pixels composing the specified part to (ii) a length of the color range of the pixels composing the specified part, and a lower limit of the color range of the coating material application layer is calculated by subtracting a length of the color range of the coating material application layer from the upper limit of the color range of the coating material application layer.

2. The image processing device of claim 1, wherein in the source image, the specified part includes highlighted pixels due to lighting by ambient light and shadowed pixels due to interruption of the ambient light, and the representative value of the pixels composing the specified part is calculated by performing statistical processing with respect to the highlighted pixels and the shadowed pixels.

3. The image processing device of claim 1, wherein the image processing device further acquires a distribution map indicating how values of pixels are distributed in a plane coordinate system corresponding to the source image, and the mapping by the generation unit includes weighting the color range of the coating material application layer using the values of the pixels in the distribution map as weighted coefficients, and applying an offset to values obtained after the weighting.

4. The image processing device of claim 3, wherein each of the values indicated in the distribution map is a normalized difference between values of pixels composing the specified part and a minimum value of colors of the pixels composing the specified part, the normalization being performed using the color range of the pixels composing the specified part, and the offset is a minimum value of a color range of a replacement color.

5. The image processing device of claim 3, wherein a sample file is stored in a storage medium that the image processing device accesses, the sample file being a distribution sample of how values of pixels are distributed in a plane, and the generation unit acquires the distribution map by reading the sample file from the storage medium.

6. The image processing device of claim 1, wherein the mapping by the generation unit includes multiplying relative values by a predefined coefficient and adding an offset, each relative value indicating what proportion of the color range of pixels composing the specified part is occupied by a corresponding one of the pixels of the source image.

7. The image processing device of claim 6, wherein each of the relative values is a normalized difference between a value of a pixel having a color representative of pixels composing the specified part and a value of a pixel in the specified part, the normalization being performed using a length of the color range of the pixels composing the specified part, the predefined coefficient is the length of the color range of the pixels composing the specified part, and the offset is a lower limit of the color range of color in the pixels composing the specified part.

8. The image processing device of claim 1, wherein the color range of the pixels composing the specified part is a numerical range of a specific type of pixel components among a plurality of types included in the pixels composing the specified part, the source image includes a plurality of channel images, and the values of the pixels of the coating material application layer are obtained by mapping each value of a channel image composed of a specific type of pixel component to the color range of the coating material application layer.

9. The image processing device of claim 8, wherein the image processing device has a compositing parameter for each component type, and the compositing by the compositing unit includes weighting and summing the pixel component of the specific type among the channel images included in the coating material application layer and the pixel component of the specific type among the channel images included in the source image, in which the weighting is weighting using a compositing parameter corresponding to the specific type.

10. The image processing device of claim 8, wherein the types of pixel component are hue, chroma, and luminance, and the specific type of pixel component is one or a combination of two or more of hue, chroma, and luminance.

11. The image processing device of claim 1, further comprising:

a first conversion unit that converts a first, a second, and a third pixel component of each pixel composing the specified part to a hue component, a chroma component, and a luminance component, respectively; and a second conversion unit that converts the hue component, the chroma component, and the luminance component of pixels composing the specified part composited with the coating material application layer to the first, the second, and the third pixel component, respectively.

12. The image processing device of claim 1, wherein the specified part to which the make-up coating material is to be applied is lips of the subject, the specification unit generates an outline defining the lips when specifying the specified part, and the generation unit, in determining the color range of the pixels of the coating material application layer, specifies a mouth corner defining a shape of a corner portion of the lips from the outline defining the lips, and assigns a low value to pixels in a vicinity of the mouth corner from among pixels composing the lips.

13. An image processing method of a computer system that performs image processing with respect to a source image including a subject and thereby obtains a make-up image showing the subject in a state in which make-up coating material is applied, the image processing method comprising:

specifying, by a processor of the computer system, a part of the subject to which the make-up coating material is to be applied; and generating, by the processor, a coating material application layer for the specified part, the coating material application layer being composed from a plurality of pixels having a color range represented by a sample color of the make-up coating material, wherein the coating material application layer is an image that is composited with the source image, the color range of the pixels of the coating material application layer is obtained by expanding a color range of a plurality of pixels composing the specified part according to a ratio of a value of the sample color to a representative value of the pixels composing the specified part, and values of the pixels of the coating material application layer are obtained by mapping values of pixels composing the source image to the color range of the coating material application layer, and wherein an upper limit of the color range of the coating material application layer is calculated by multiplying a length of the color range of the coating material application layer by a ratio and adding a value of a pixel of a sample color of the make-up coating material, in which the ratio is a ratio of (i) a difference between a representative value of the pixels composing the specified part and an upper limit of the color range of the pixels composing the specified part to (ii) a length of the color range of the pixels composing the specified part, and a lower limit of the color range of the coating material application layer is calculated by subtracting a length of the color range of the coating material application layer from the upper limit of the color range of the coating material application layer.

14. A non-transitory, computer-readable medium on which is stored a program executed by a computer that causes the computer to perform image processing with respect to a source image including a subject and thereby obtain a make-up image showing the subject in a state in which make-up coating material is applied, the program comprising program code causing the computer to:

specify a part of the subject to which the make-up coating material is to be applied; and generate a coating material application layer for the specified part, the coating material application layer being composed from a plurality of pixels having a color range represented by a sample color of the make-up coating material, wherein the coating material application layer is an image that is composited with the source image, the color range of the pixels of the coating material application layer is obtained by expanding a color range of a plurality of pixels composing the specified part according to a ratio of a value of the sample color to a representative value of the pixels composing the specified part, and values of the pixels of the coating material application layer are obtained by mapping values of pixels composing the source image to the color range of the coating material application layer, wherein an upper limit of the color range of the coating material application layer is calculated by multiplying a length of the color range of the coating material application layer by a ratio and adding a value of a pixel of a sample color of the make-up coating material, in which the ratio is a ratio of (i) a difference between a representative value of the pixels composing the specified part and an upper limit of the color range of the pixels composing the specified part to (ii) a length of the color range of the pixels composing the specified part, and a lower limit of the color range of the coating material application layer is calculated by subtracting a length of the color range of the coating material application layer from the upper limit of the color range of the coating material application layer.

* * * * *